(12) United States Patent
Neilley et al.

(10) Patent No.: US 7,558,674 B1
(45) Date of Patent: Jul. 7, 2009

(54) WEATHER SEVERITY AND CHARACTERIZATION SYSTEM

(75) Inventors: Peter Paul Neilley, Hollis, NH (US); Todd Michael Crawford, Hudson, NH (US); Paul Joseph Bayer, Arlington, MA (US); Ron Alan Harris, Bedford, NH (US); Masha Kozinets, Newton, MA (US); William Joseph Callahan, Medway, MA (US); Michael Robert Kleist, Nashua, NH (US)

(73) Assignee: WSI, Corporation, Andover, MA (US)

( * ) Notice: Subject to any disclaimer, the term of this patent is extended or adjusted under 35 U.S.C. 154(b) by 0 days.

(21) Appl. No.: 11/789,148

(22) Filed: Apr. 24, 2007

Related U.S. Application Data

(60) Provisional application No. 60/794,373, filed on Apr. 24, 2006.

(51) Int. Cl.
*G06F 19/00* (2006.01)
(52) U.S. Cl. .......................................................... 702/3
(58) Field of Classification Search .................... 702/3, 702/4, 5, 6, 14
See application file for complete search history.

(56) References Cited

U.S. PATENT DOCUMENTS

| 5,654,886 | A | 8/1997 | Zereski |
| 6,496,780 | B1 | 12/2002 | Harris |
| 6,670,908 | B2 | 12/2003 | Wilson et al. |
| 6,683,609 | B1 | 1/2004 | Baron, Sr. et al. |
| 7,062,066 | B2 * | 6/2006 | Wolfson et al. ............. 382/100 |

\* cited by examiner

*Primary Examiner*—Edward Raymond
(74) *Attorney, Agent, or Firm*—Carlineo, Spicer & Kee, LLC

(57) ABSTRACT

A method of presenting weather phenomenon information including receiving weather data. At least one weather phenomenon represented by the weather data is identified. A plurality of current parameters related to the current state of the at least one weather phenomenon is determined. A plurality of historical parameters corresponding to one or more previous states of the at least one weather phenomenon is associated with the current state of the at least one weather phenomenon if at least one previous state of the at least one weather phenomenon has been identified. A plurality of forecasted parameters for the at least one weather phenomenon is calculated. Characteristics of the at least one weather phenomenon based on at least a first subset of the current parameters, the historical parameters, and the forecasted parameters are displayed.

32 Claims, 38 Drawing Sheets
(17 of 38 Drawing Sheet(s) Filed in Color)

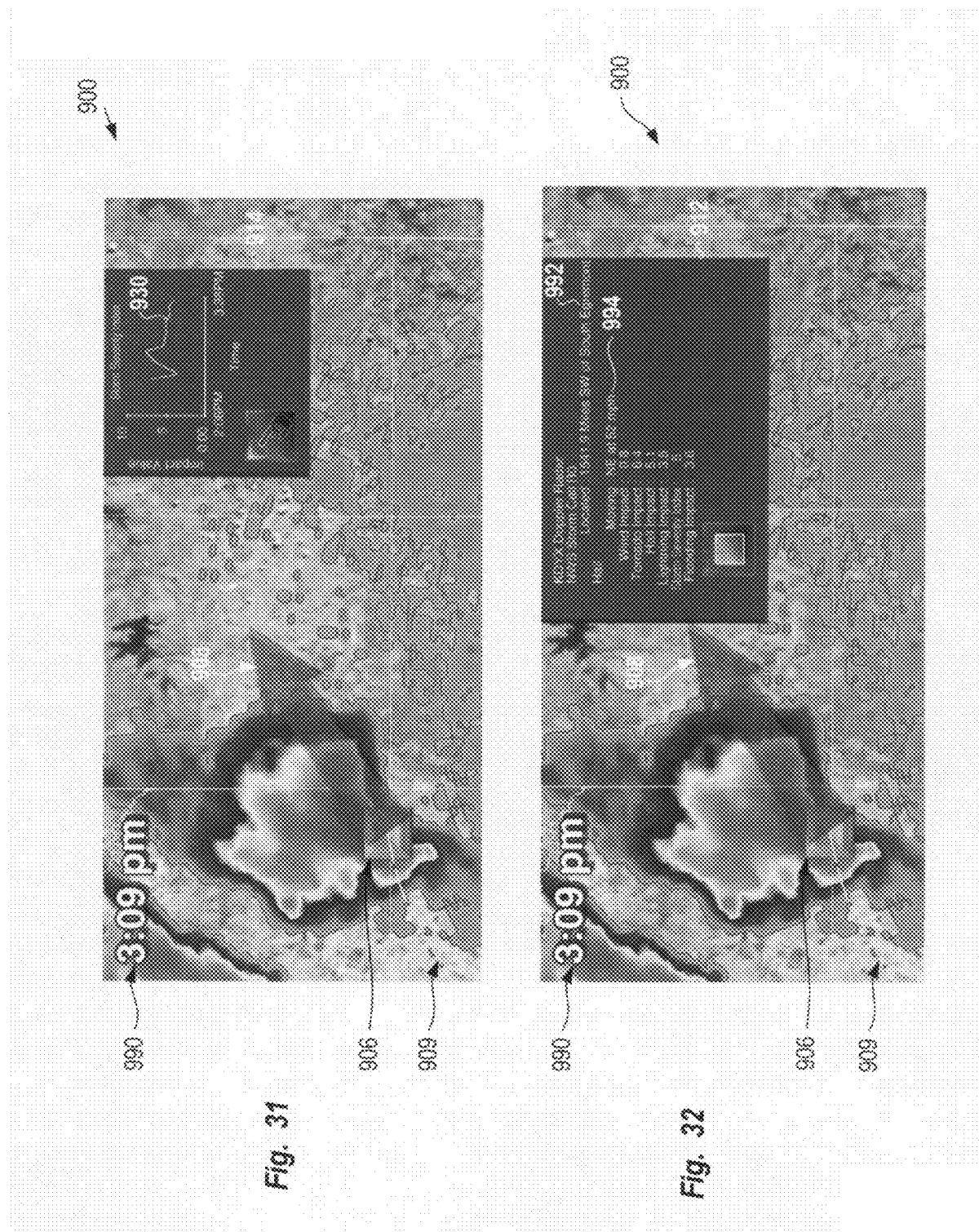

WEATHER SEVERITY AND CHARACTERIZATION SYSTEM

CROSS REFERENCE TO RELATED APPLICATIONS

This application claims the benefit of U.S. Provisional Patent Application No. 60/794,373, entitled Weather Severity and Characterization System, filed Apr. 24, 2006, the entire disclosure of which is incorporated herein by reference.

This application is related to U.S. patent application Ser. No. 11/404,627, entitled Intelligent Broadcast Presentation System and Method, filed Apr. 14, 2006, the entire disclosure of which is incorporated herein by reference.

COPYRIGHT NOTICE AND AUTHORIZATION

Portions of the documentation in this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

The patent or application file contains at least one drawing executed in color. Copies of this patent or patent application publication with color drawing(s) will be provided by the Office upon request and payment of the necessary fee.

In the Drawings:

FIG. 1 is a use case diagram for an intelligent broadcast system in accordance with one embodiment of the present invention;

FIG. 2 is an exemplary graphical presentation in accordance with the intelligent broadcast system of FIG. 1;

FIG. 3 is an exemplary graphical presentation in accordance with the intelligent broadcast system of FIG. 1;

FIG. 4 is an exemplary graphical presentation in accordance with the intelligent broadcast system of FIG. 1;

FIG. 5 is an exemplary graphical presentation in accordance with the intelligent broadcast system of FIG. 1;

FIG. 6 is an exemplary graphical presentation in accordance with the intelligent broadcast system of FIG. 1;

FIG. 7 is an exemplary graphical presentation in accordance with the intelligent broadcast system of FIG. 1;

FIG. 8 is an exemplary graphical presentation in accordance with the intelligent broadcast system of FIG. 1;

FIG. 9A shows a weather event hierarchy in accordance with one embodiment of the intelligent broadcast system;

FIG. 9B shows a traffic event hierarchy in accordance with one embodiment of the intelligent broadcast system;

FIGS. 9C and 9D depict navigation and traversal of the hierarchies of FIGS. 9A and 9B;

Figure 1:
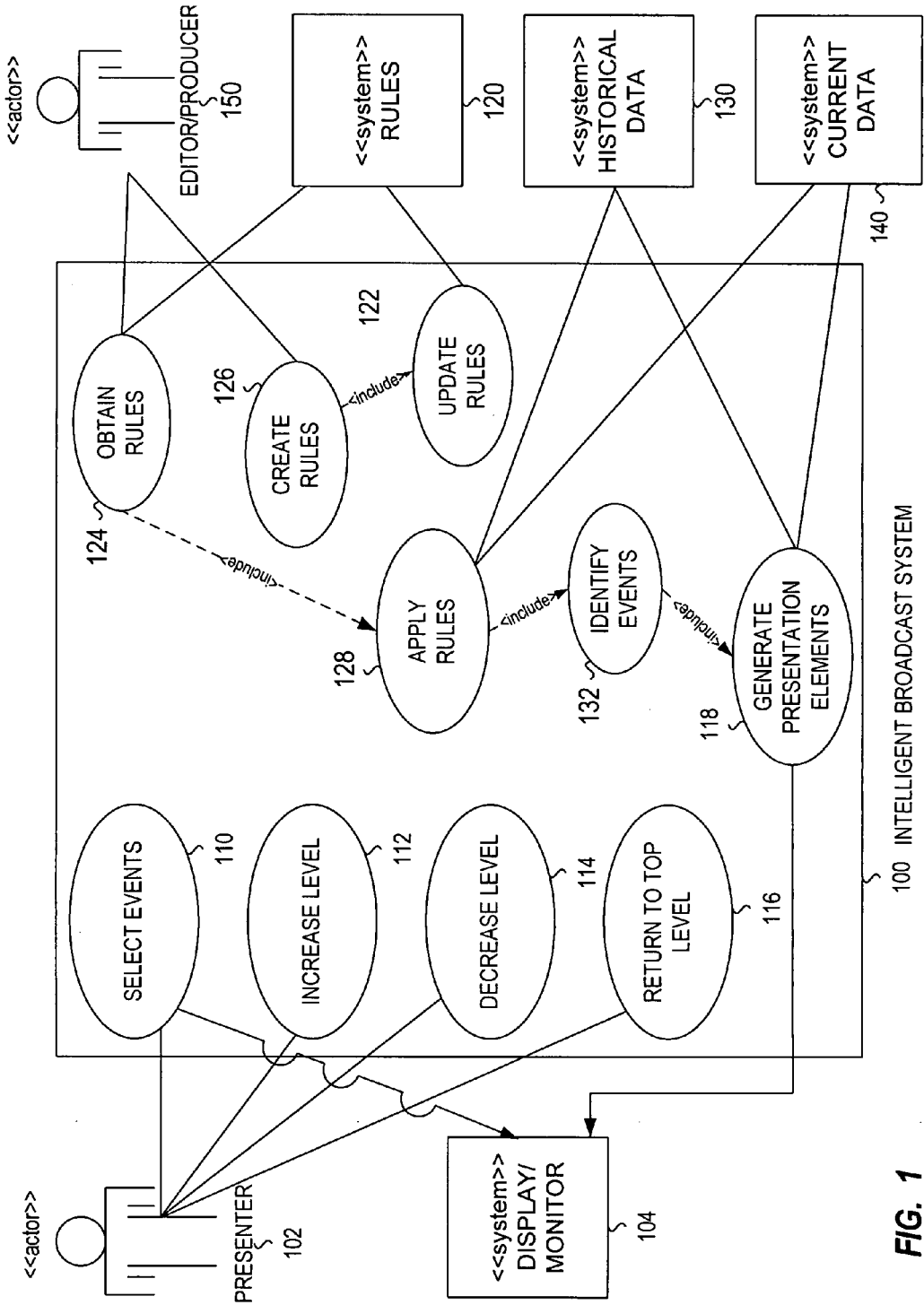
Figure 10A:
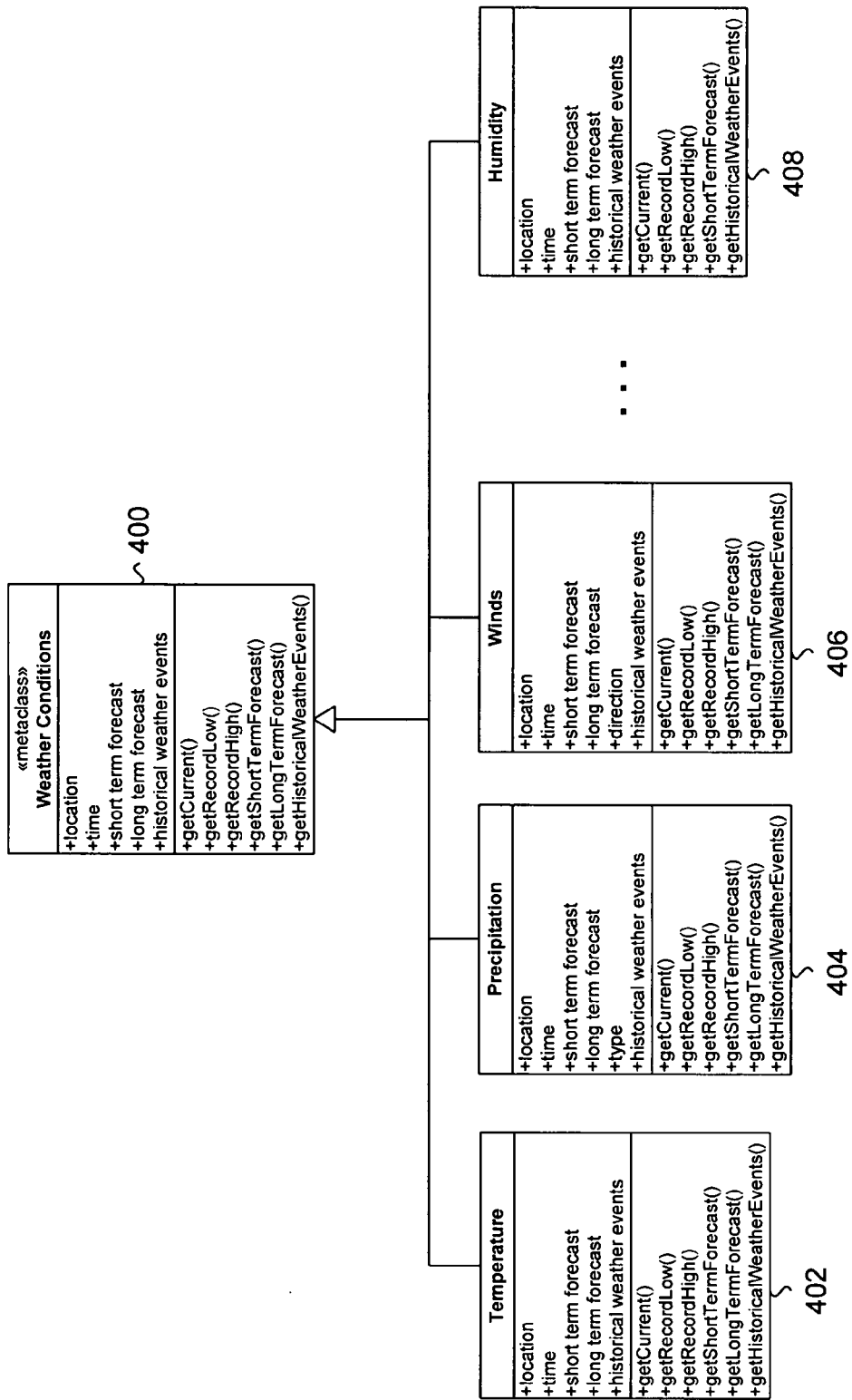
Figure 10B:
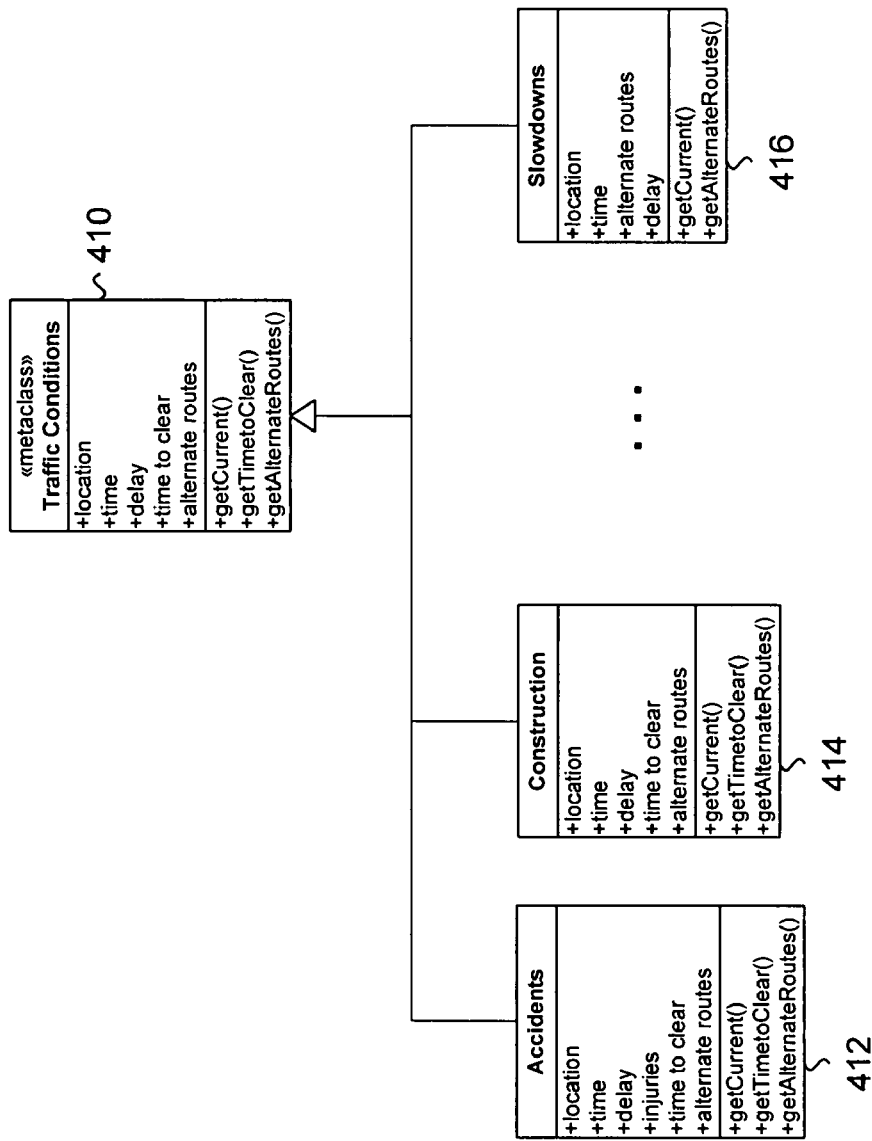
Figure 10C:
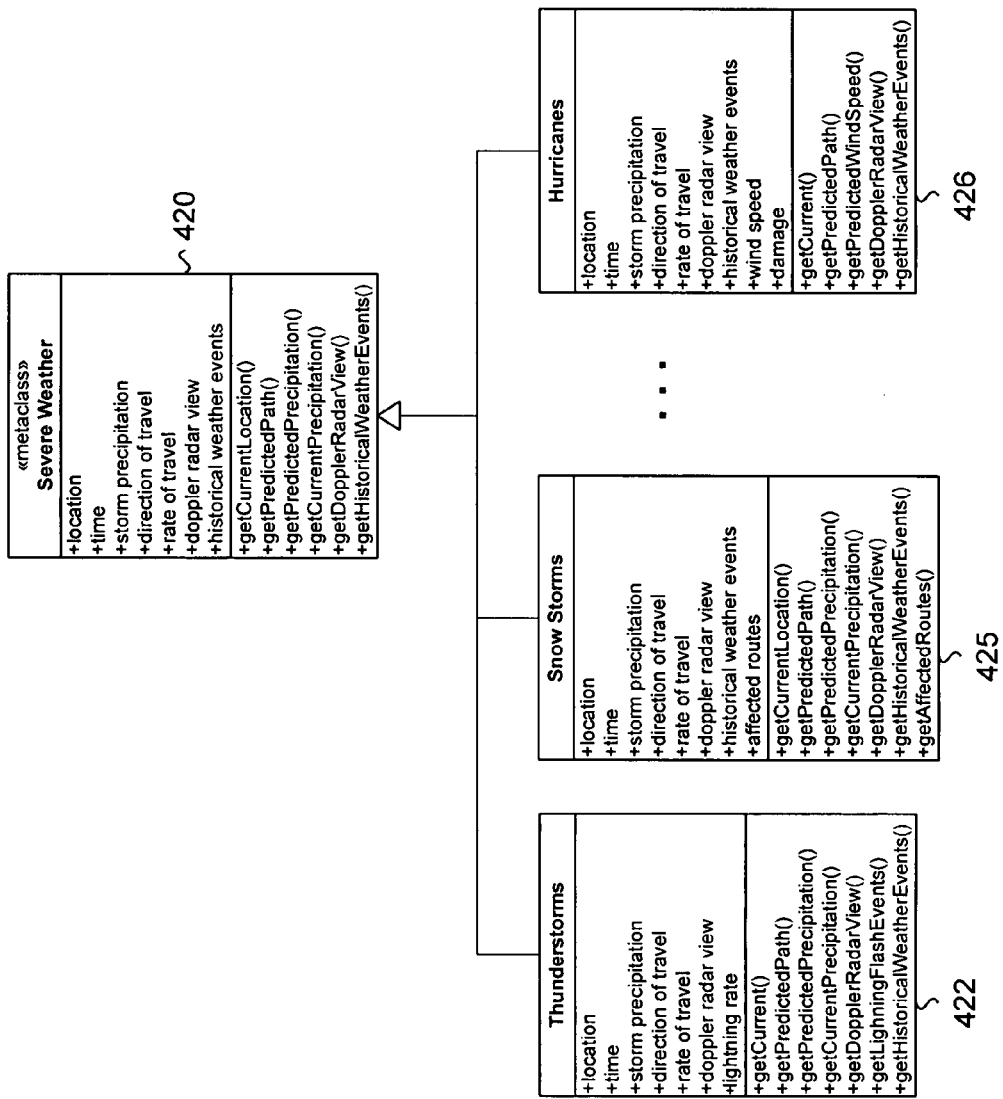
Figure 10D:
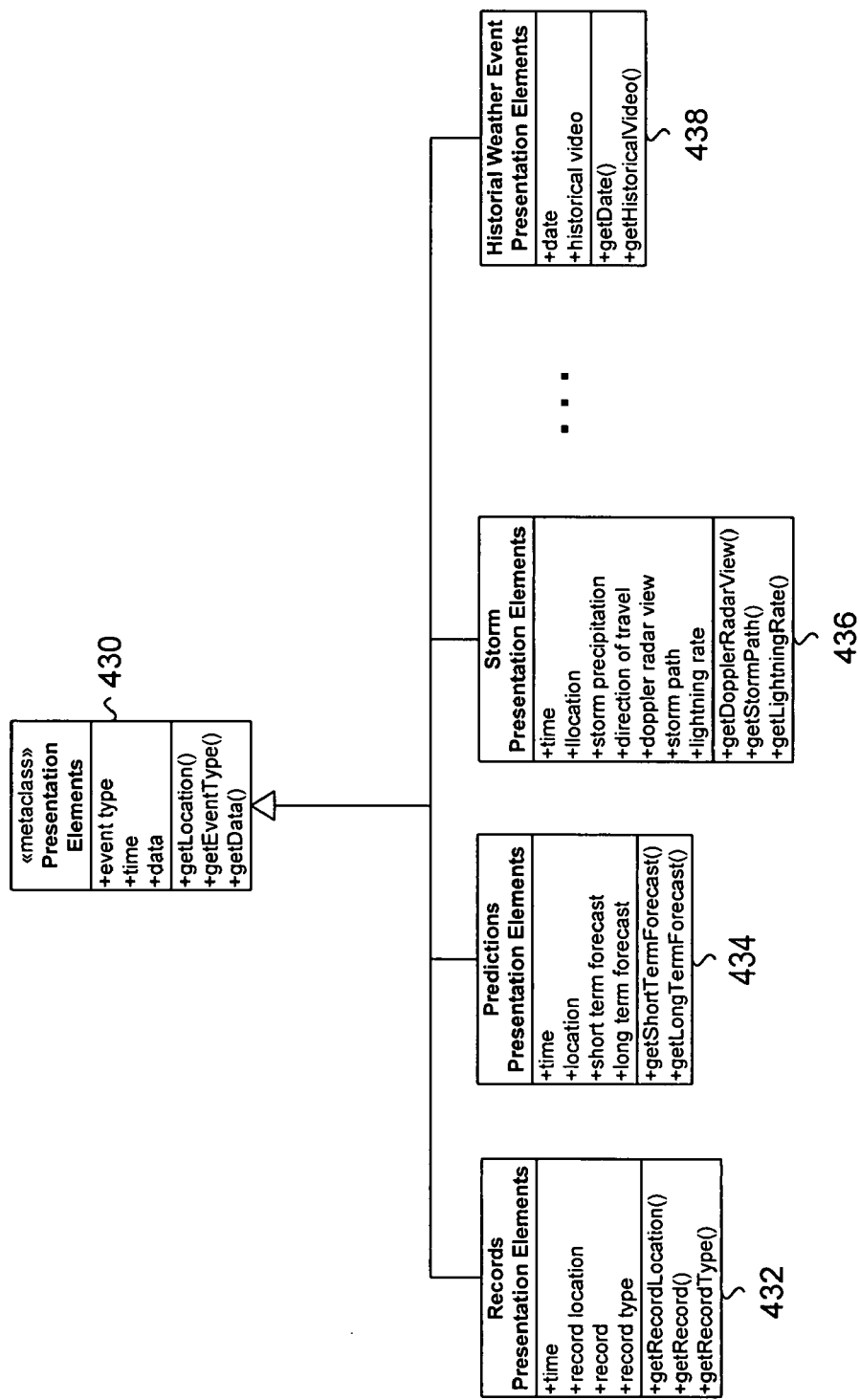
Figure 10E:
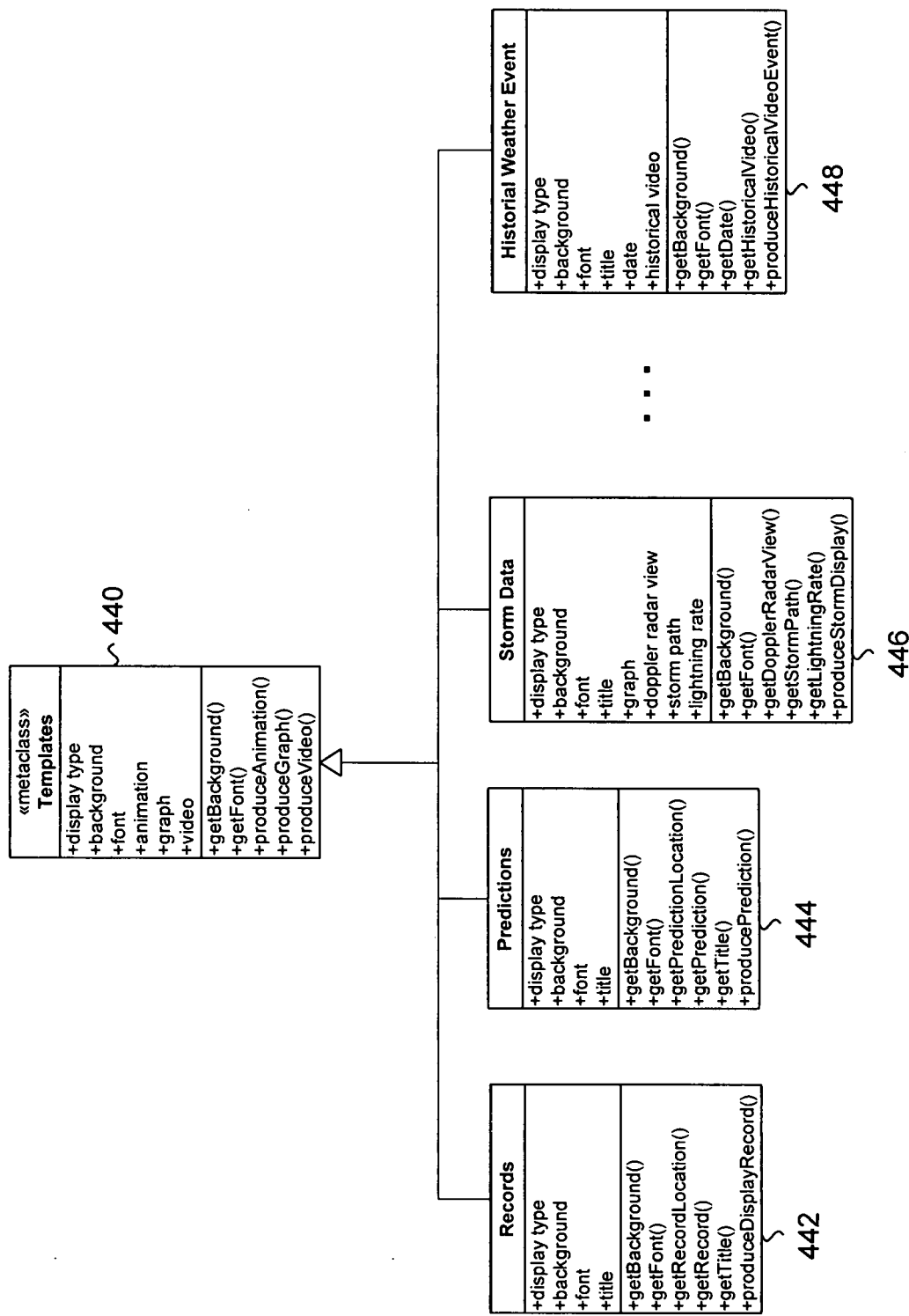
Figure 11:
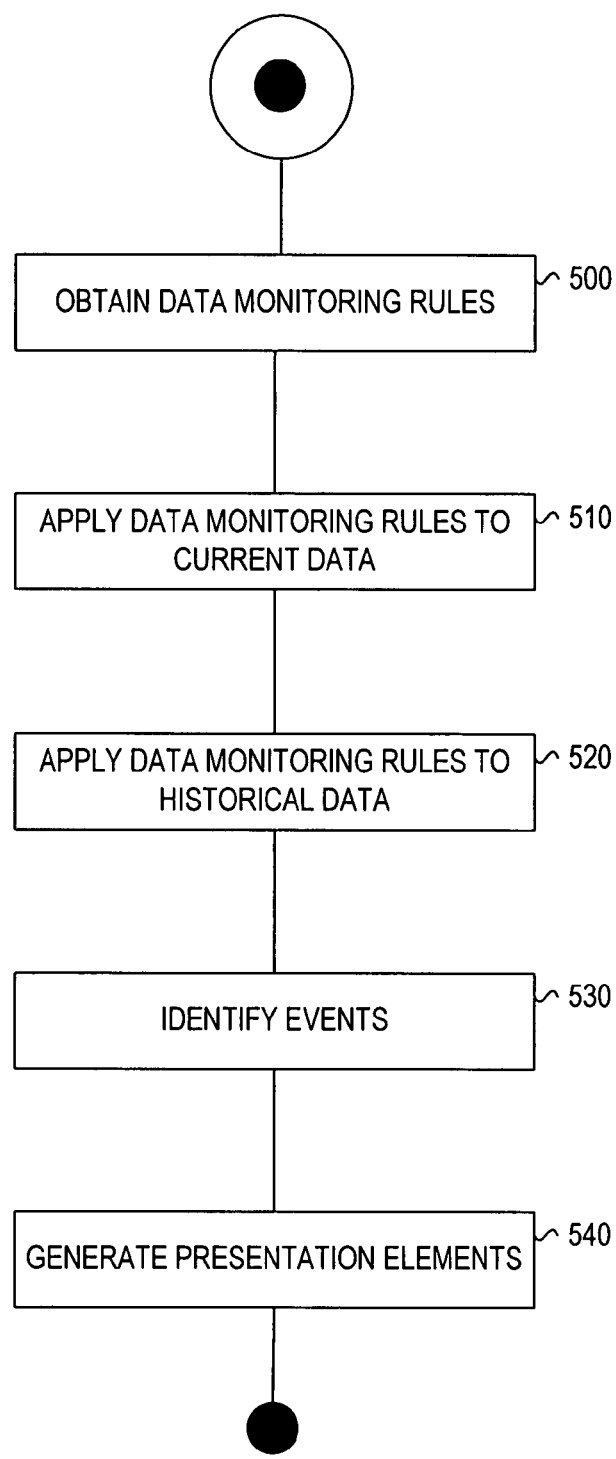
Figure 12:
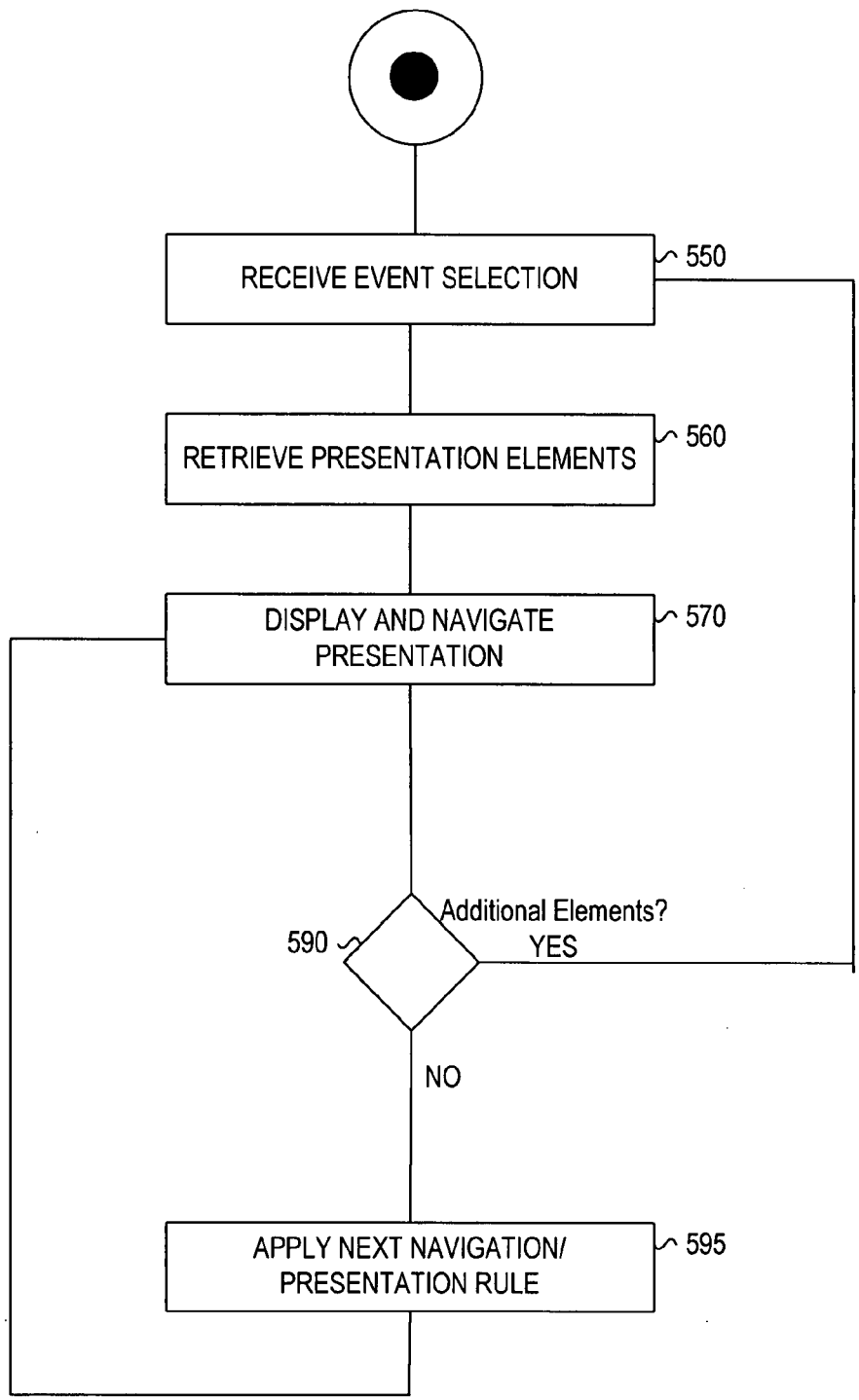
Figure 13:
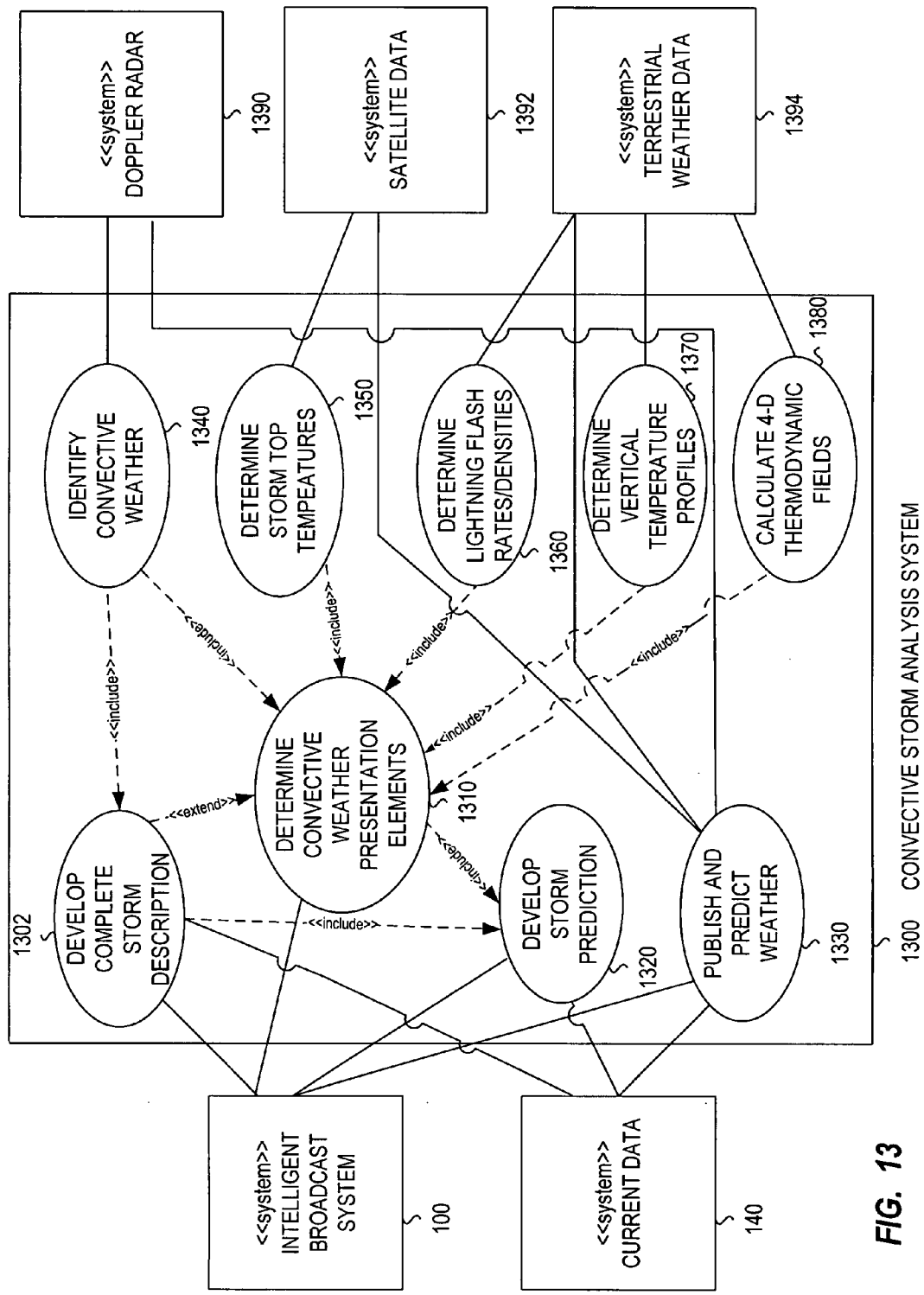
Figure 14:
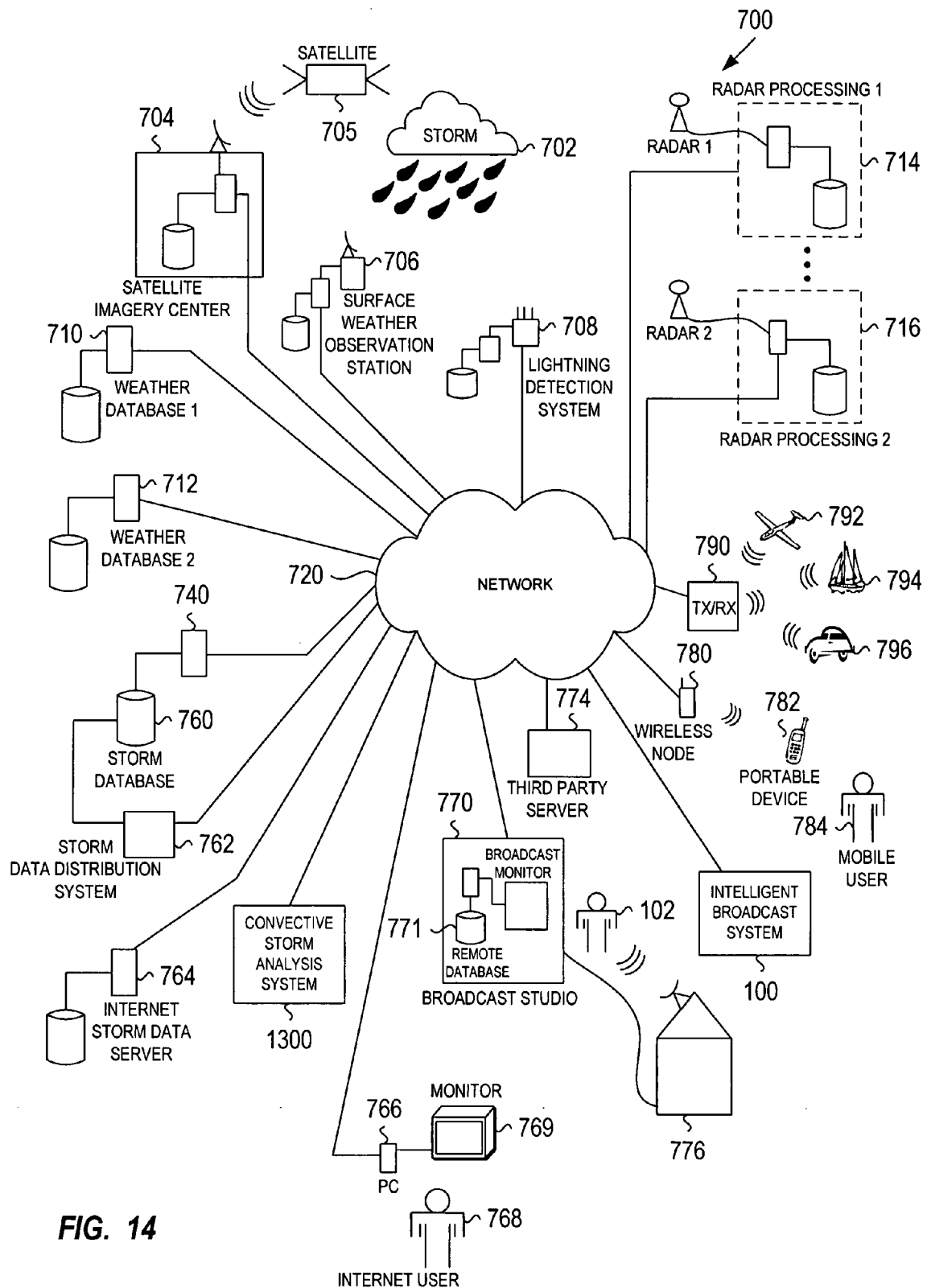
Figure 15:
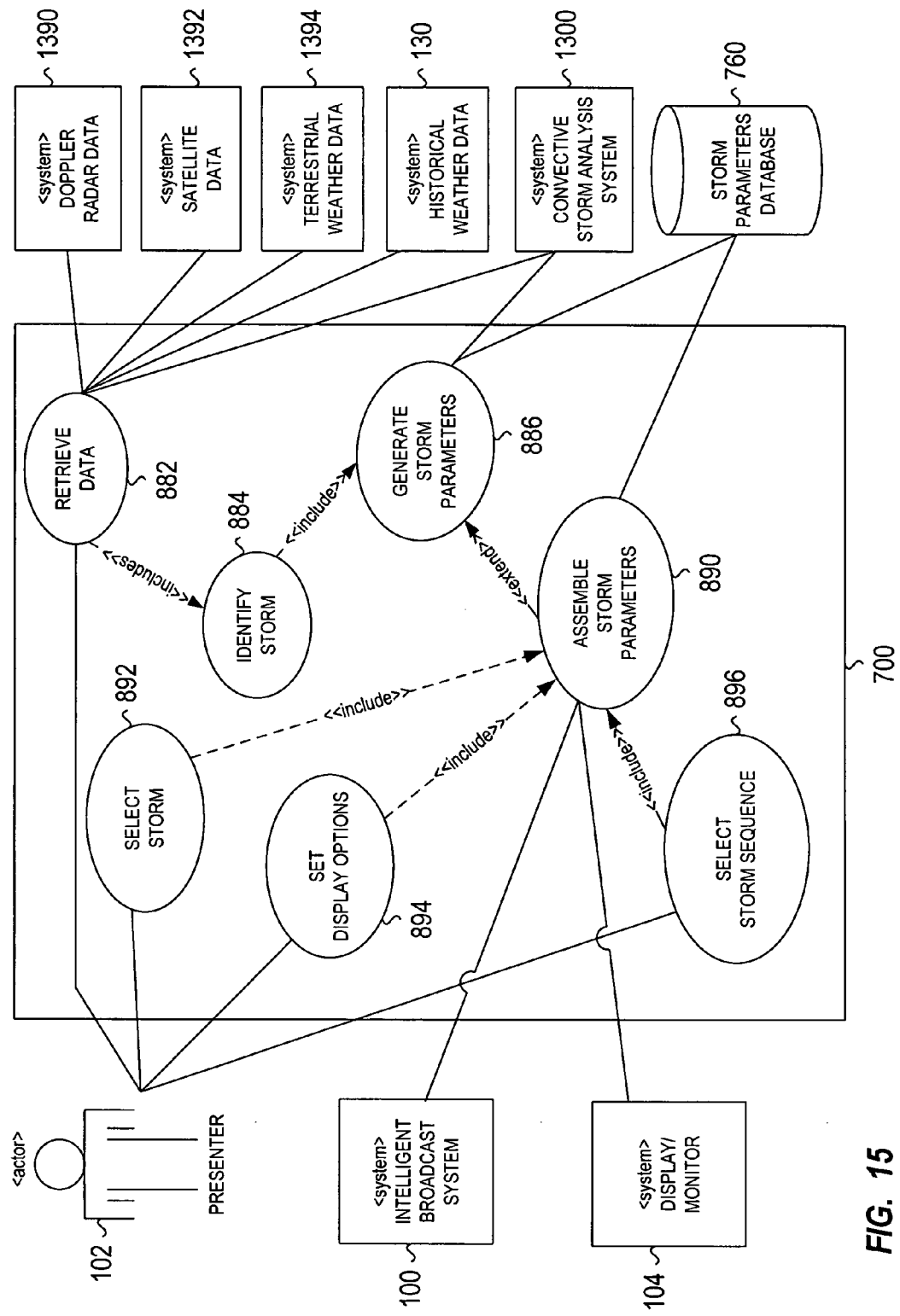
Figure 16:
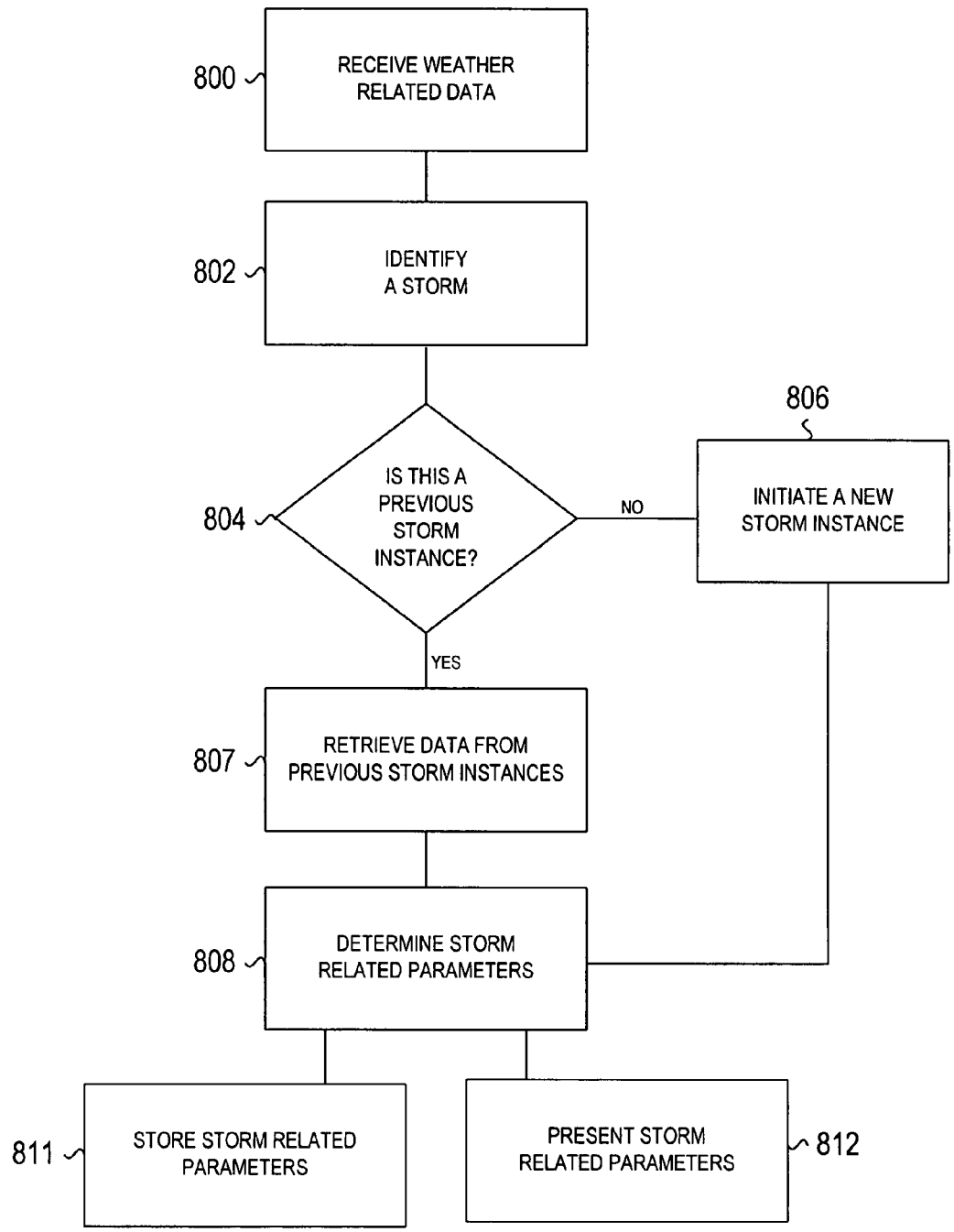
Figure 17:
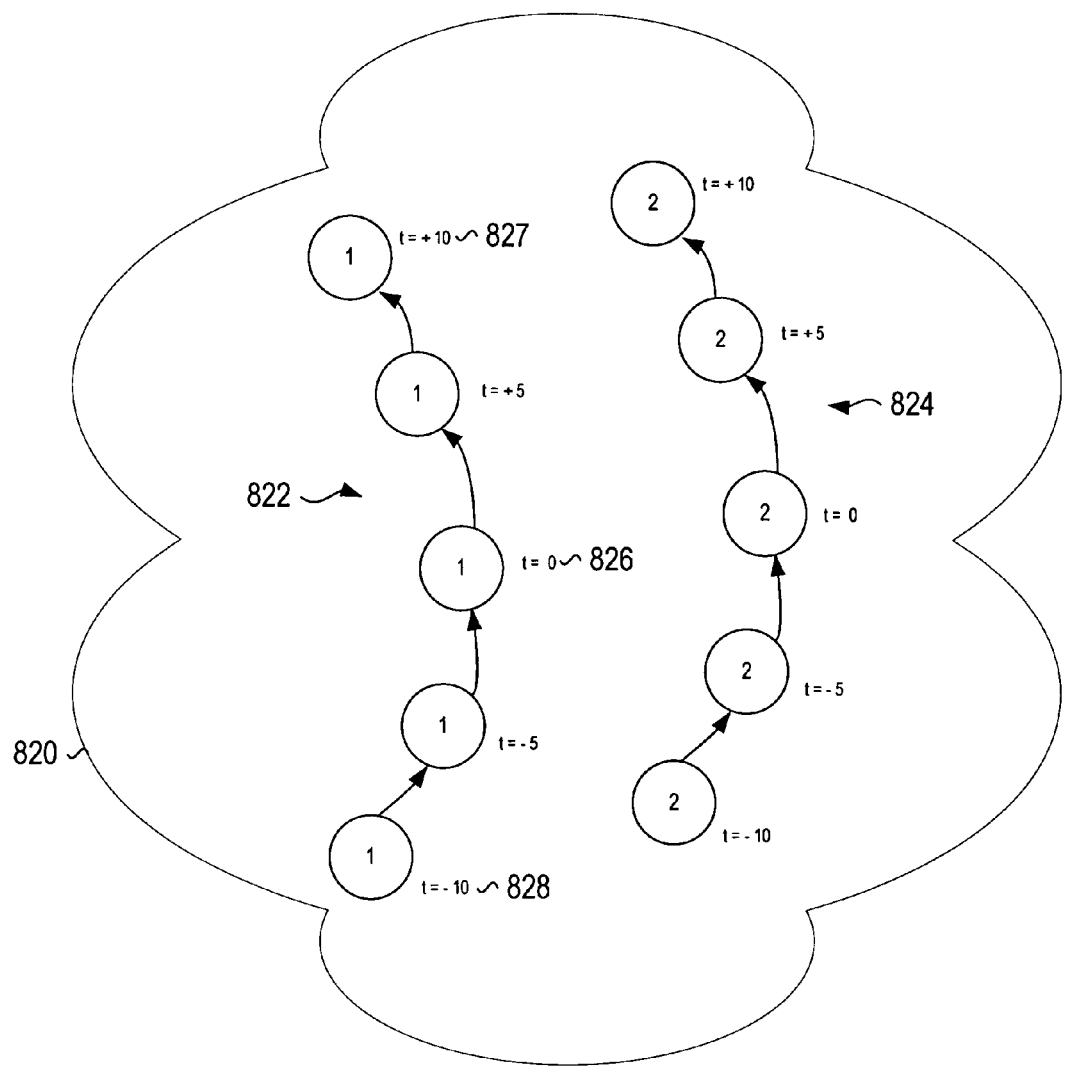
Figure 18:
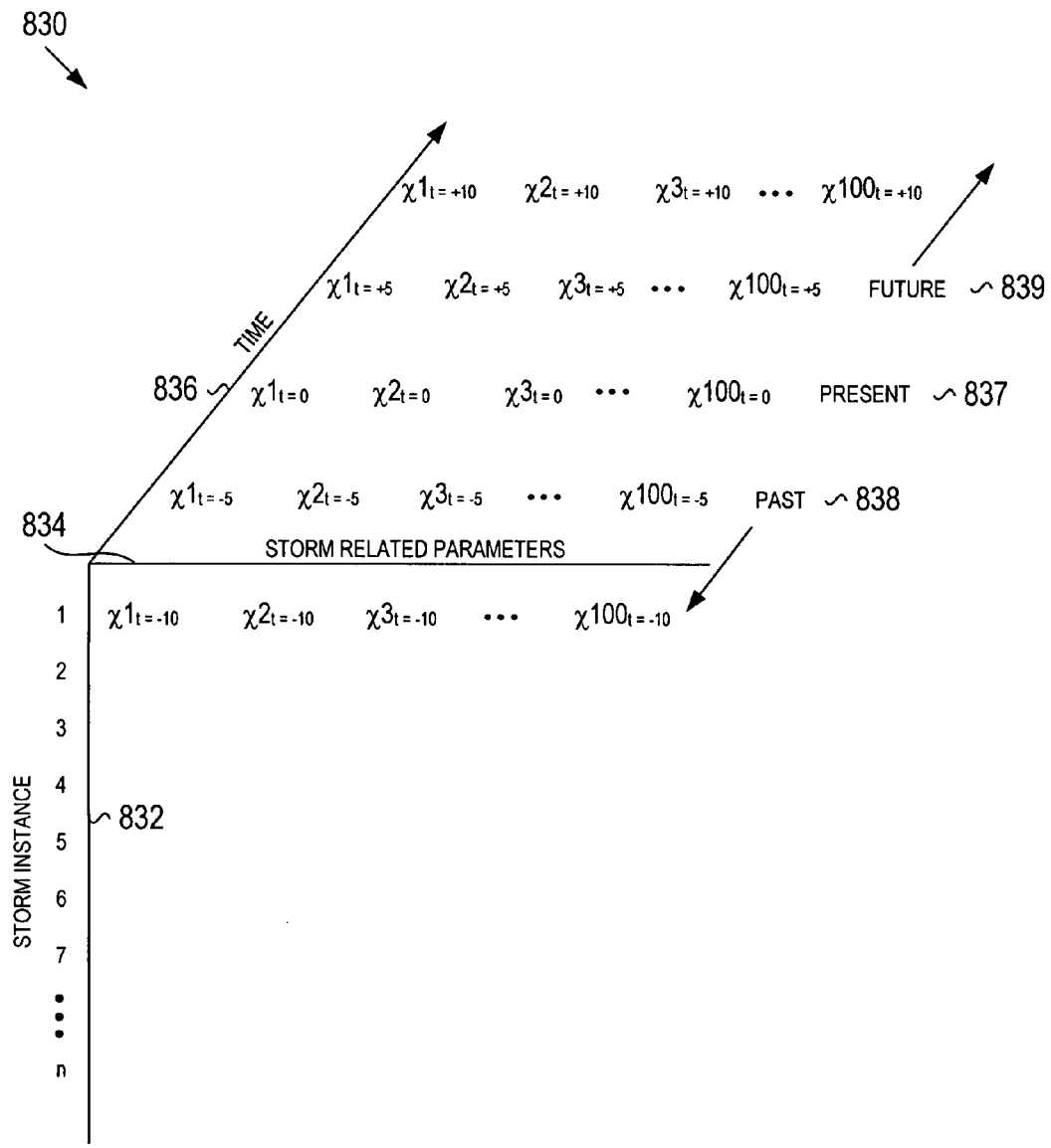
Figure 19:
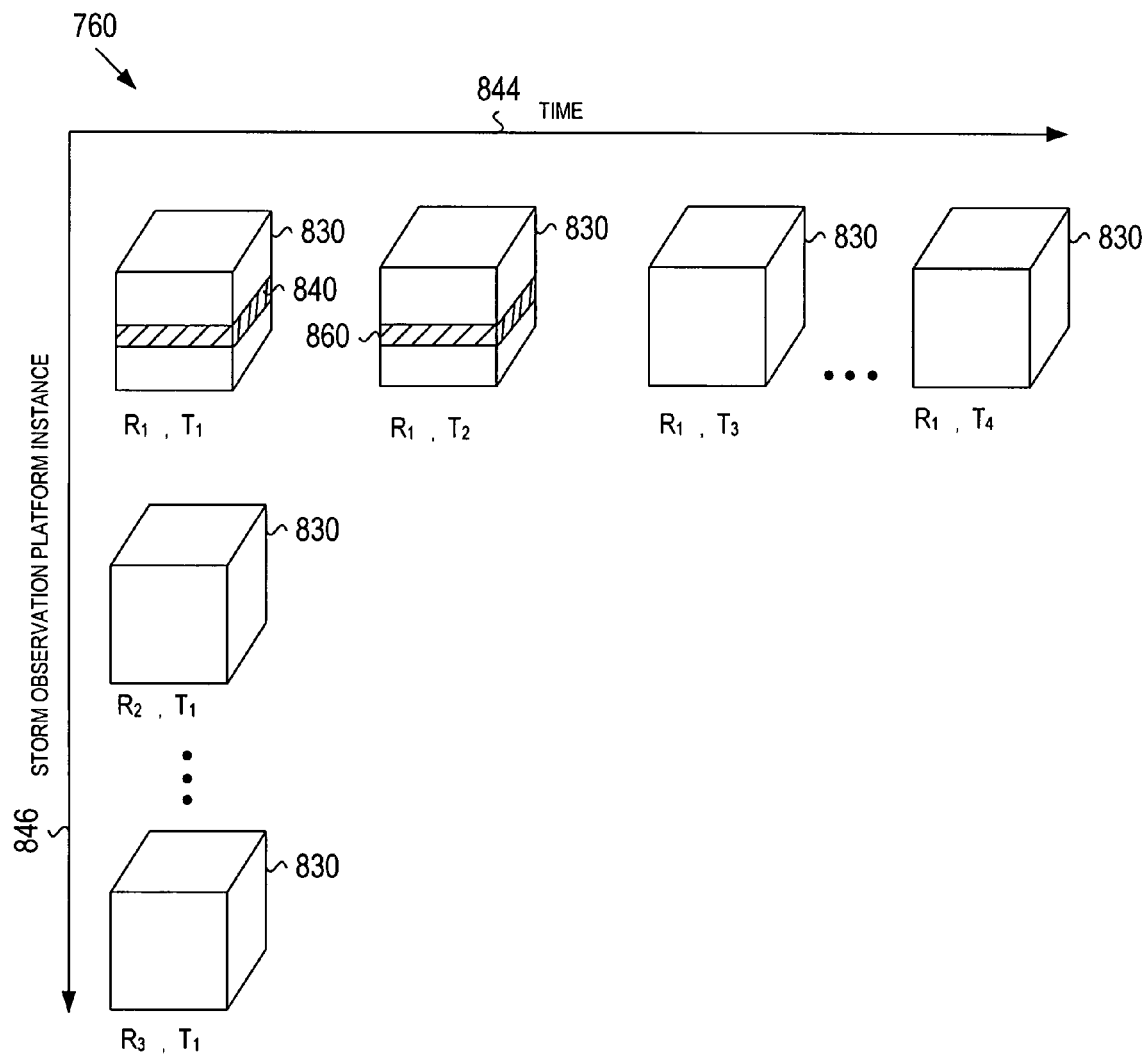
Figure 20:
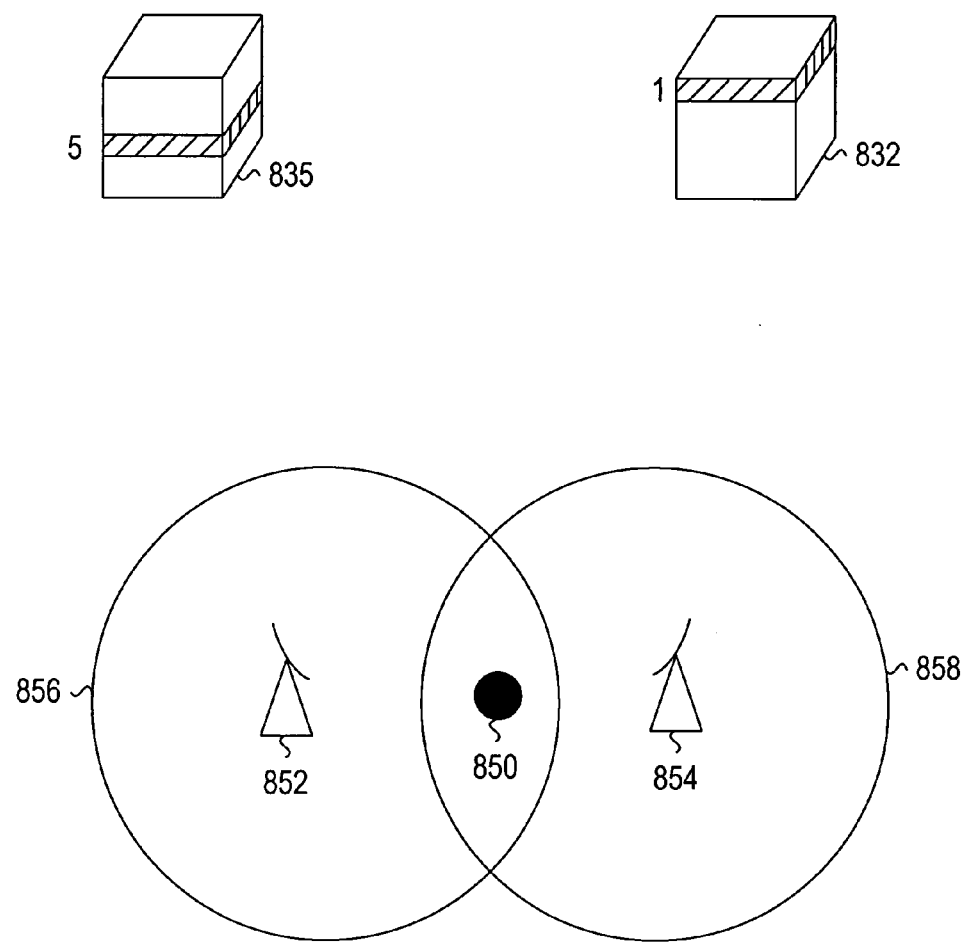
Figure 21:
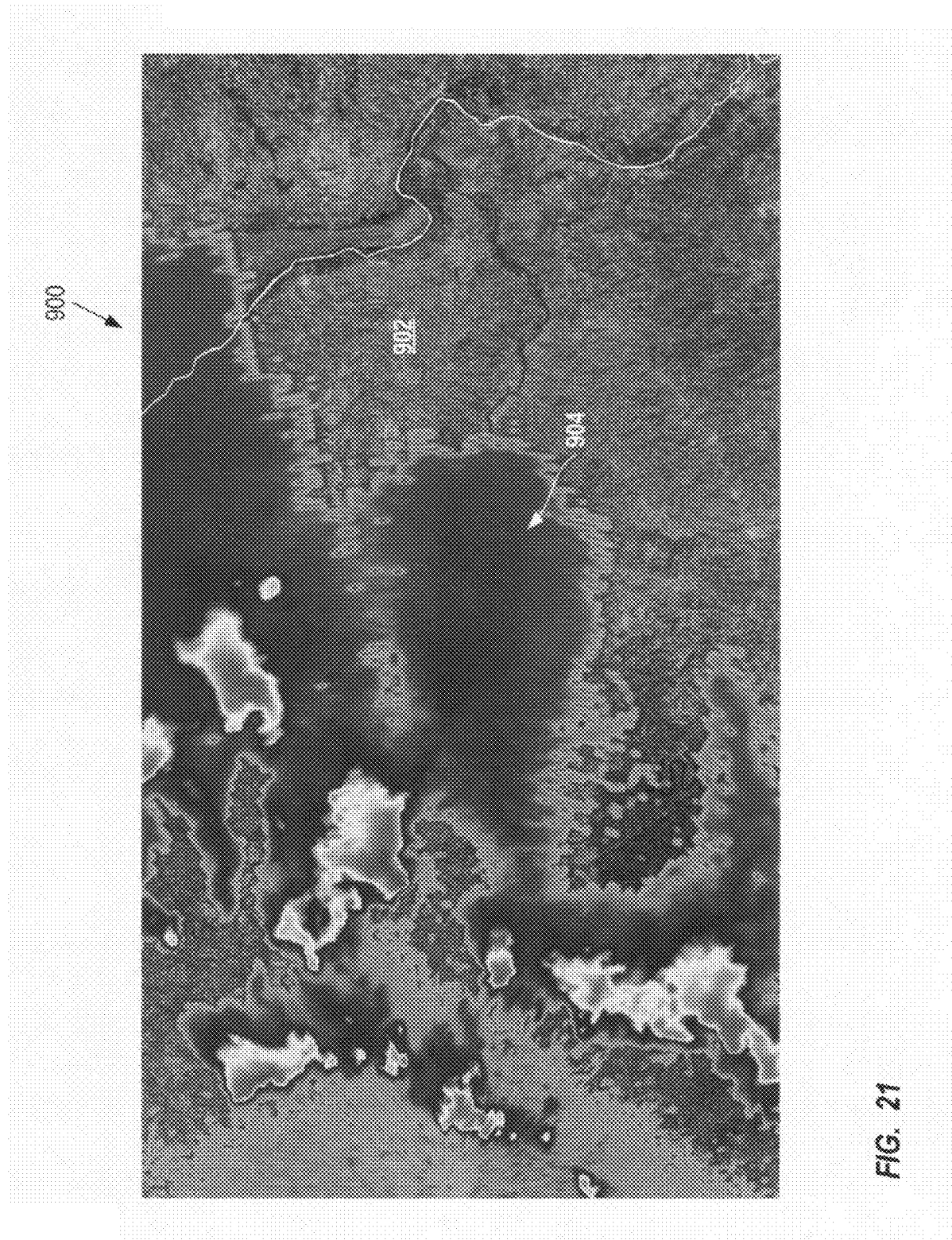
Figure 22:
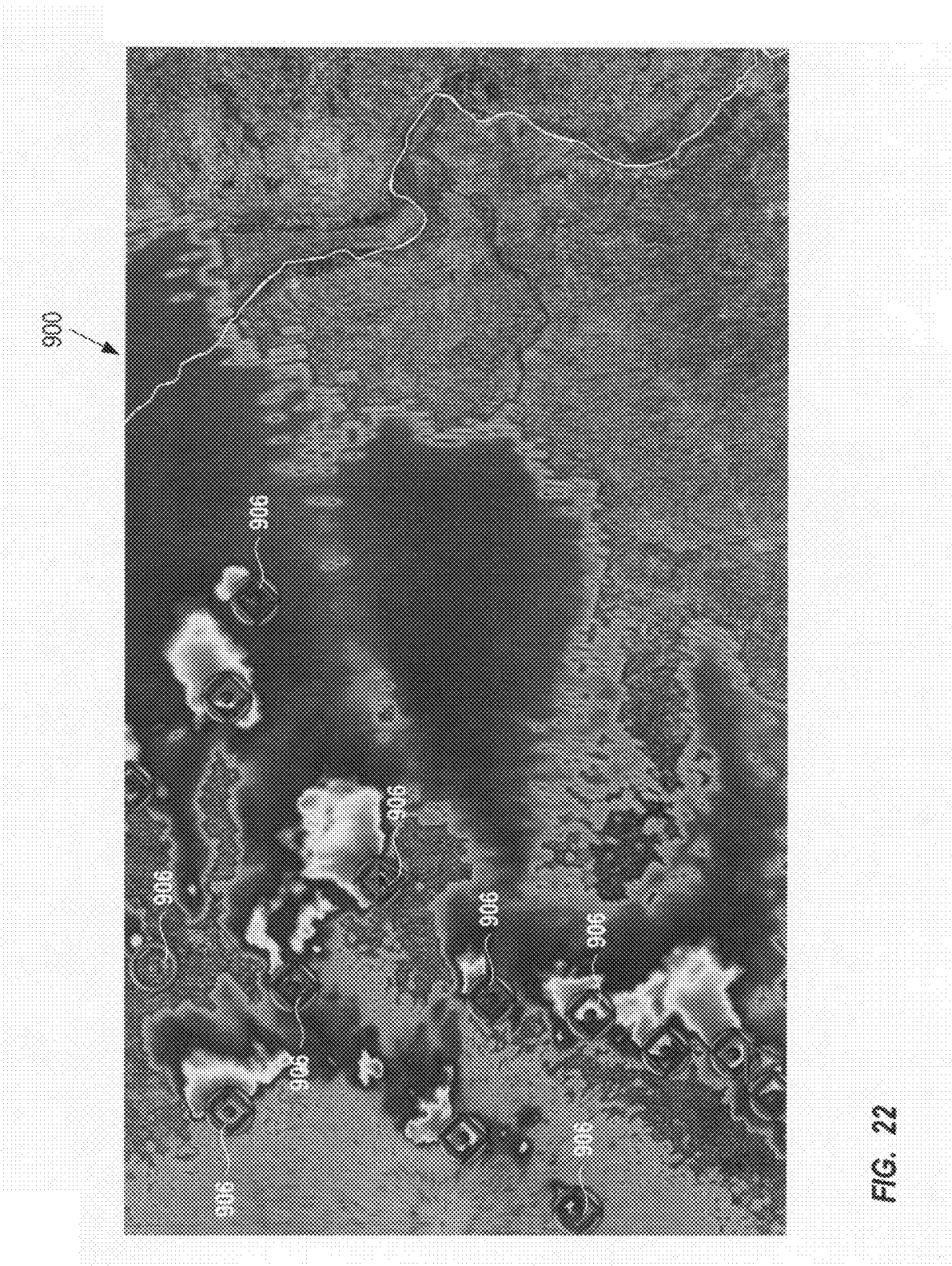
Figure 23:
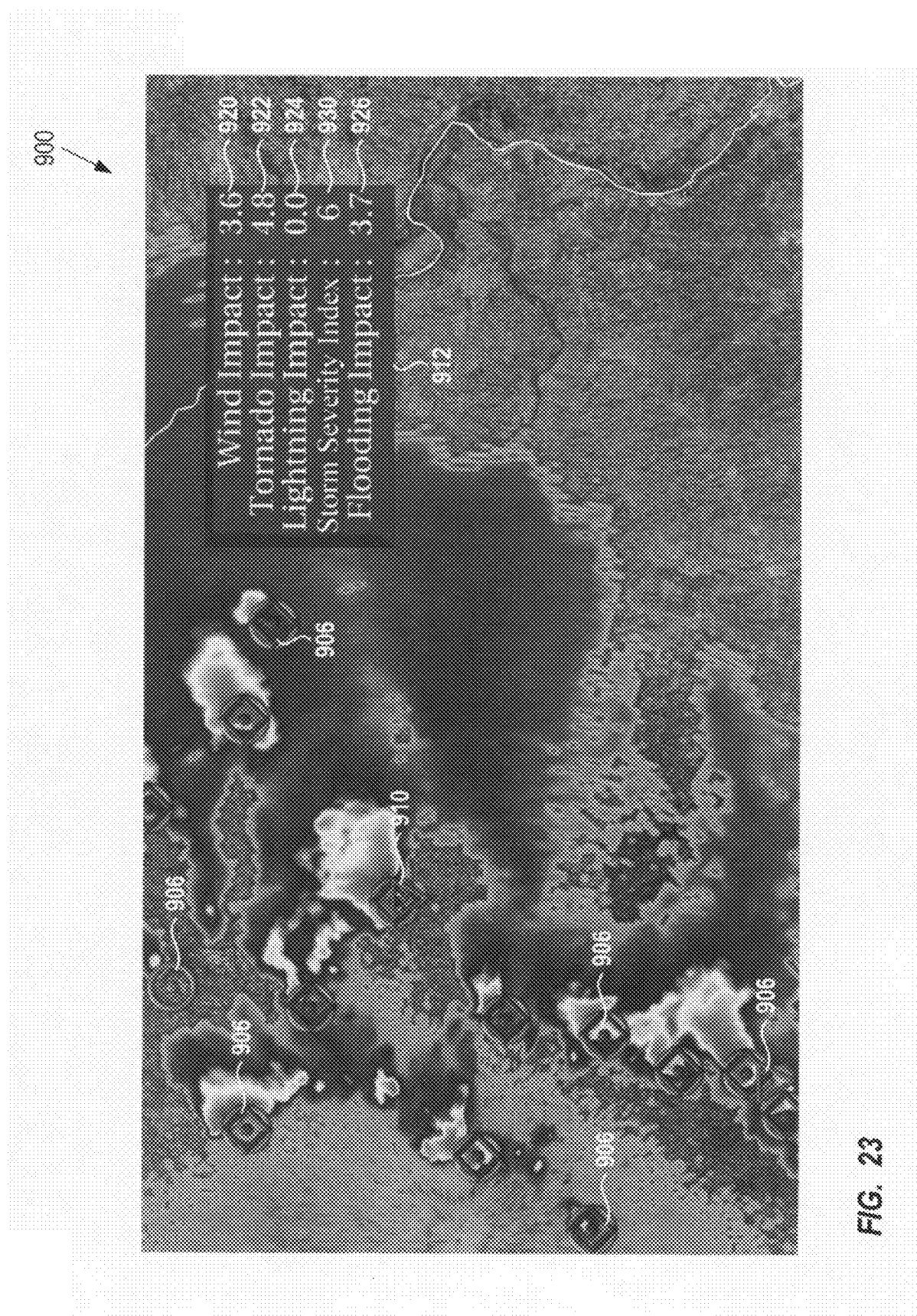
Figure 24:
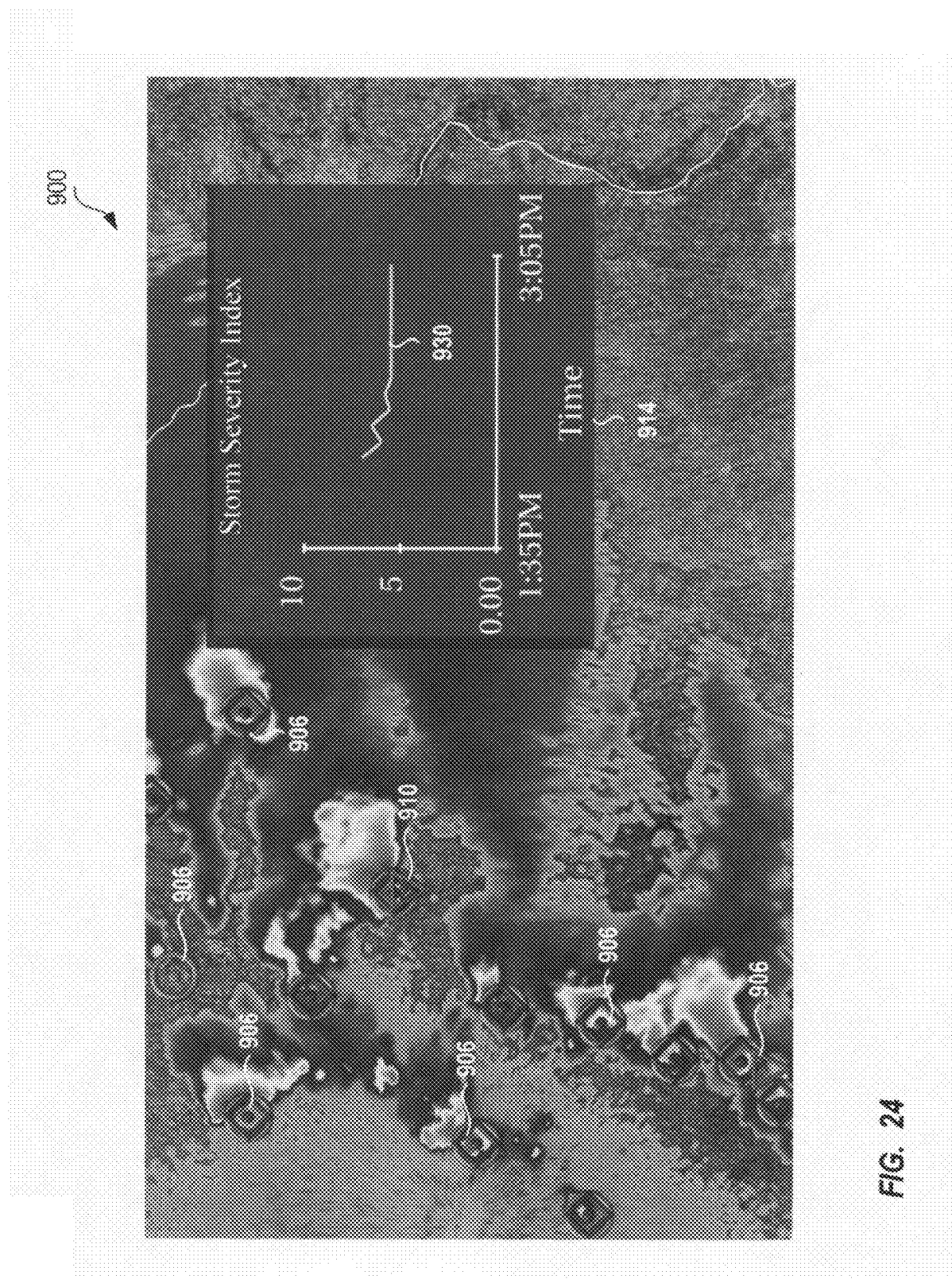
Figure 25:
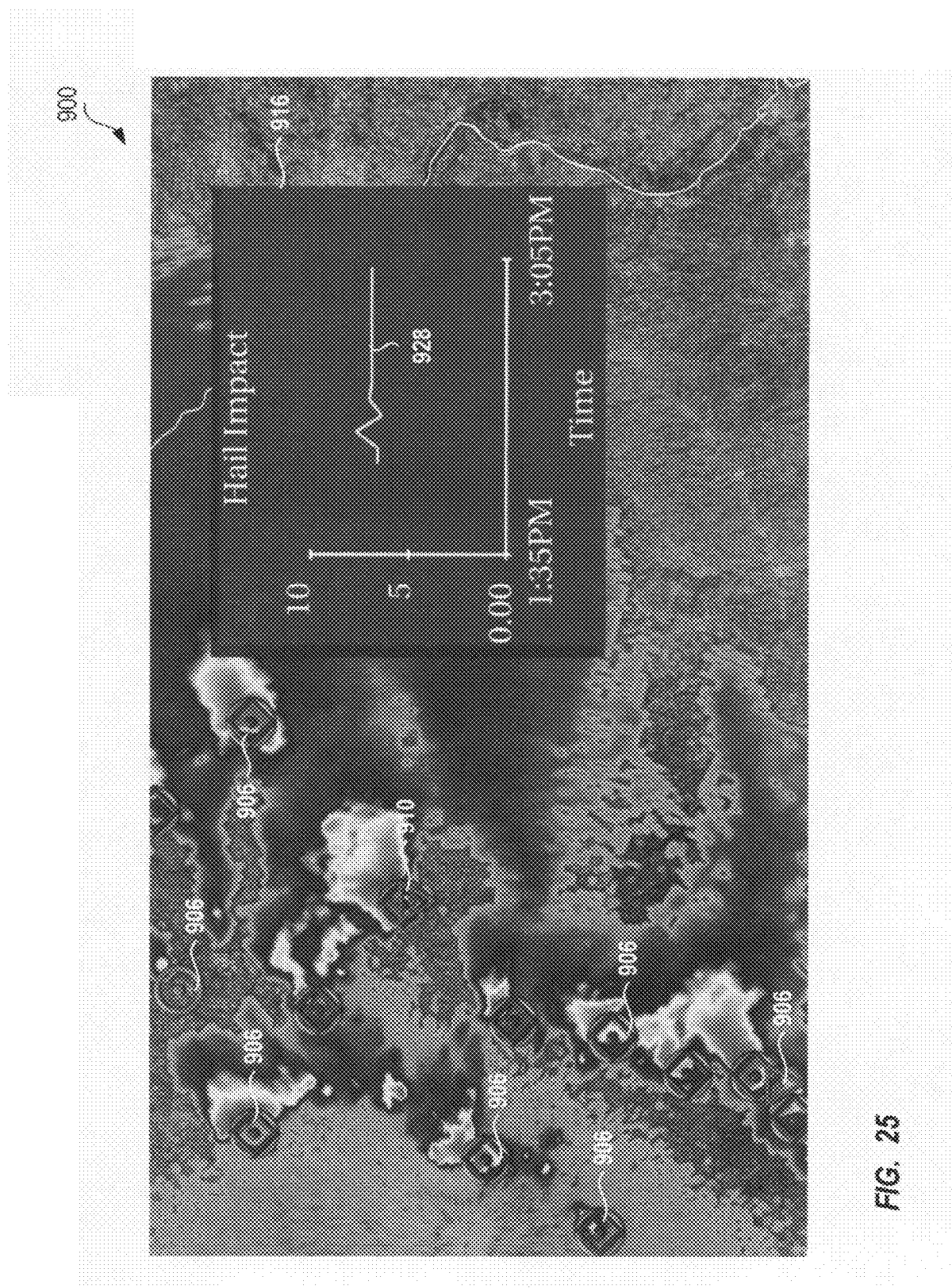
Figure 26:
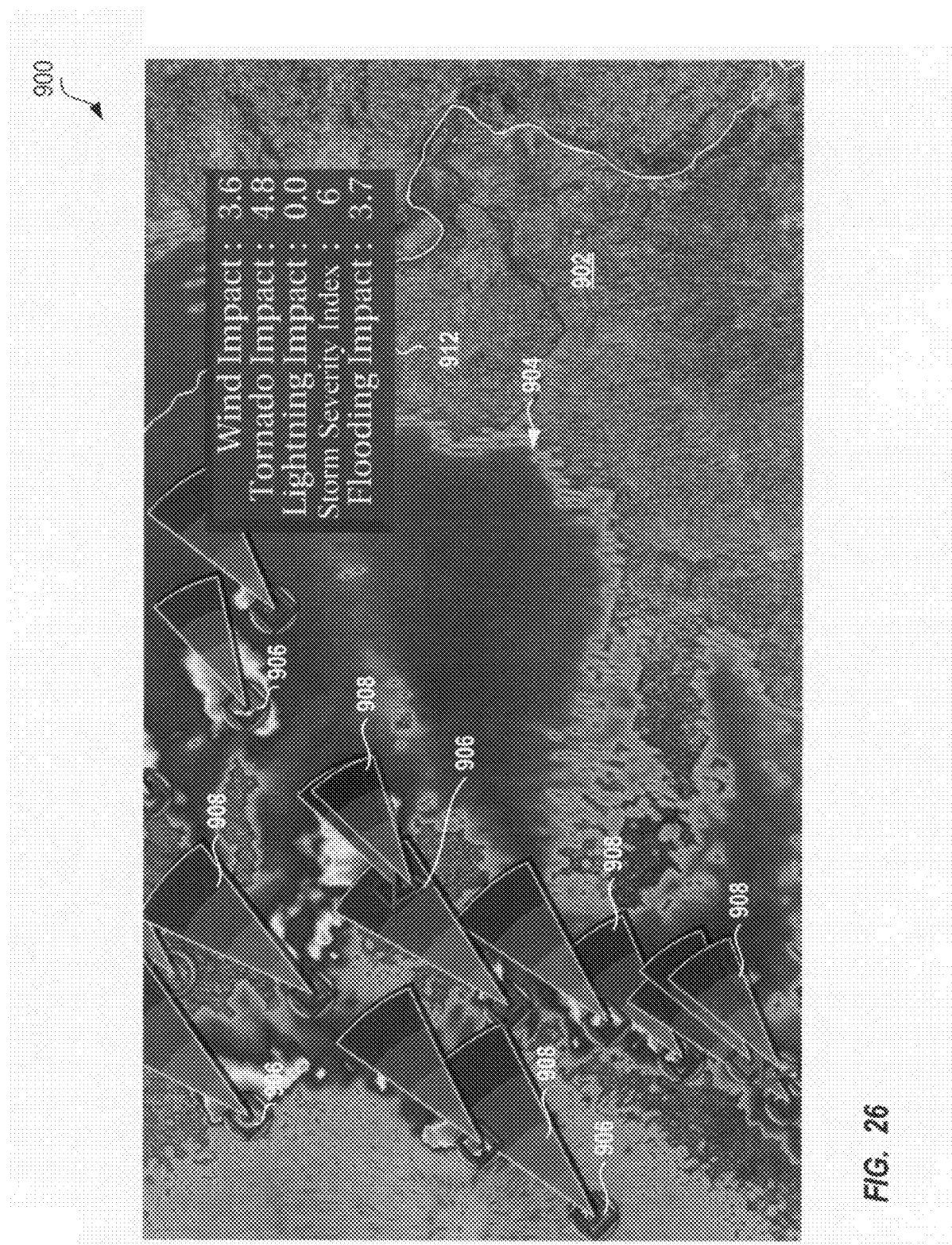
Figure 27:
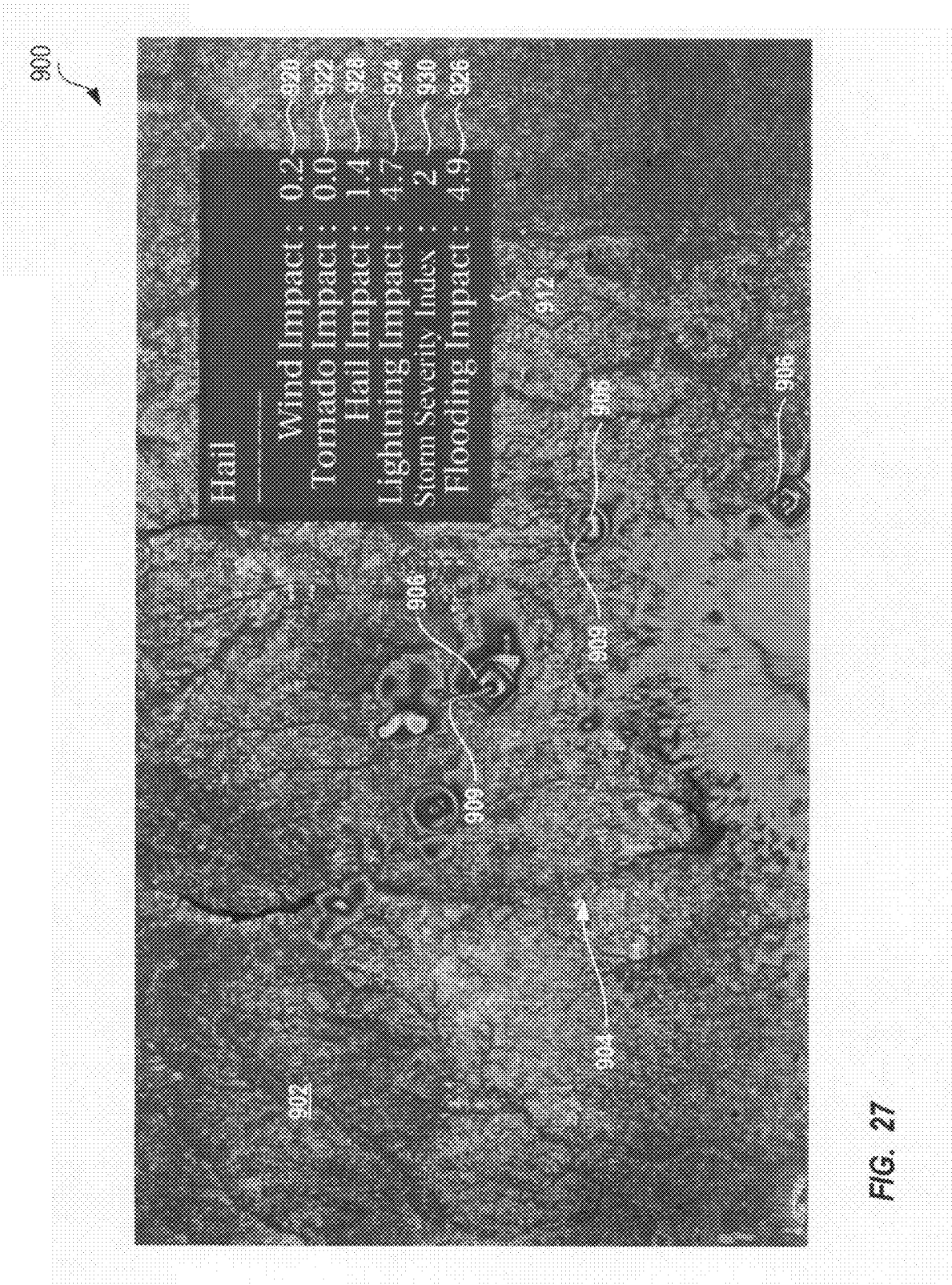
Figure 28:
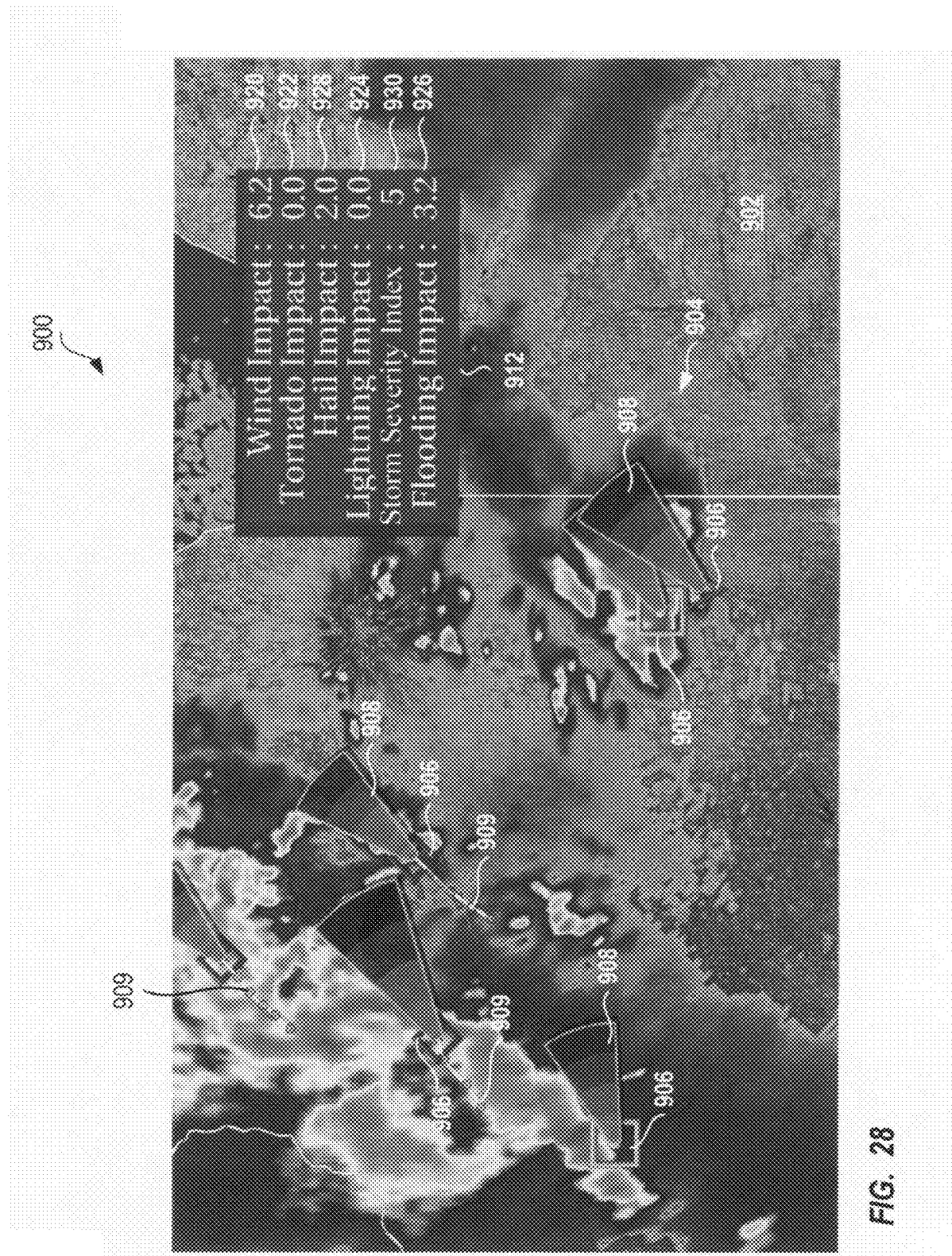
Figure 29:
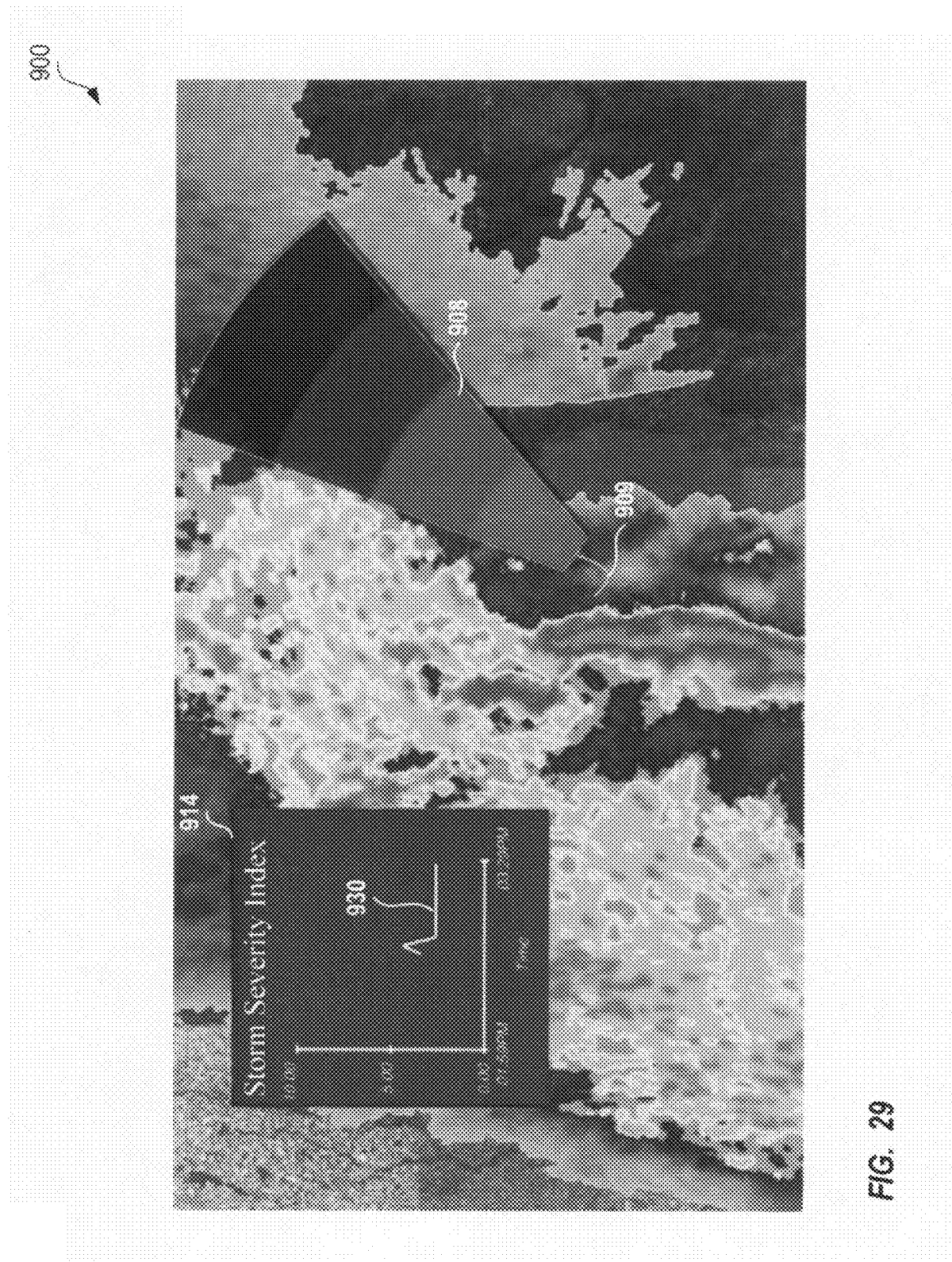
Figure 30:
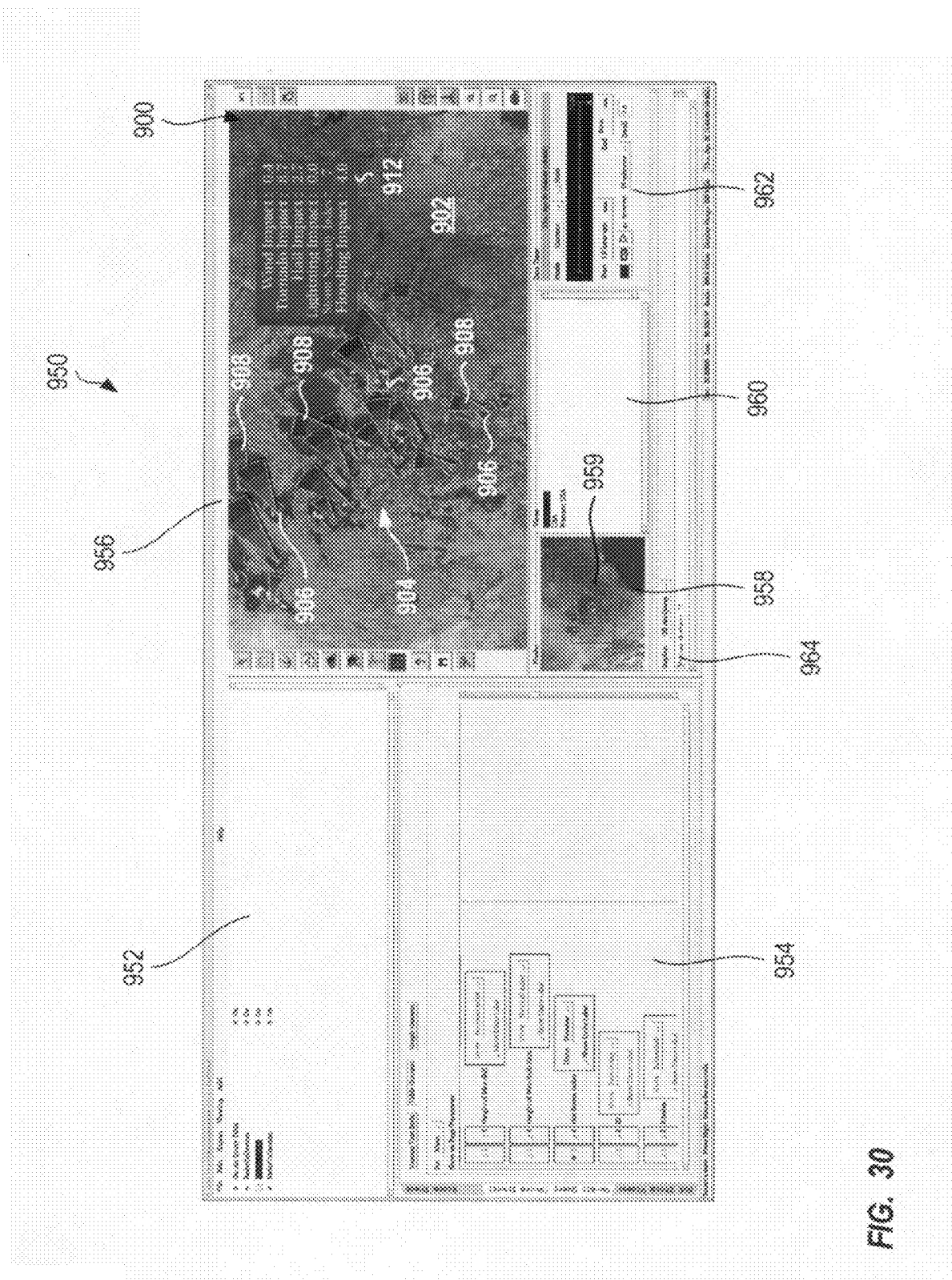
Figures 33, 34:
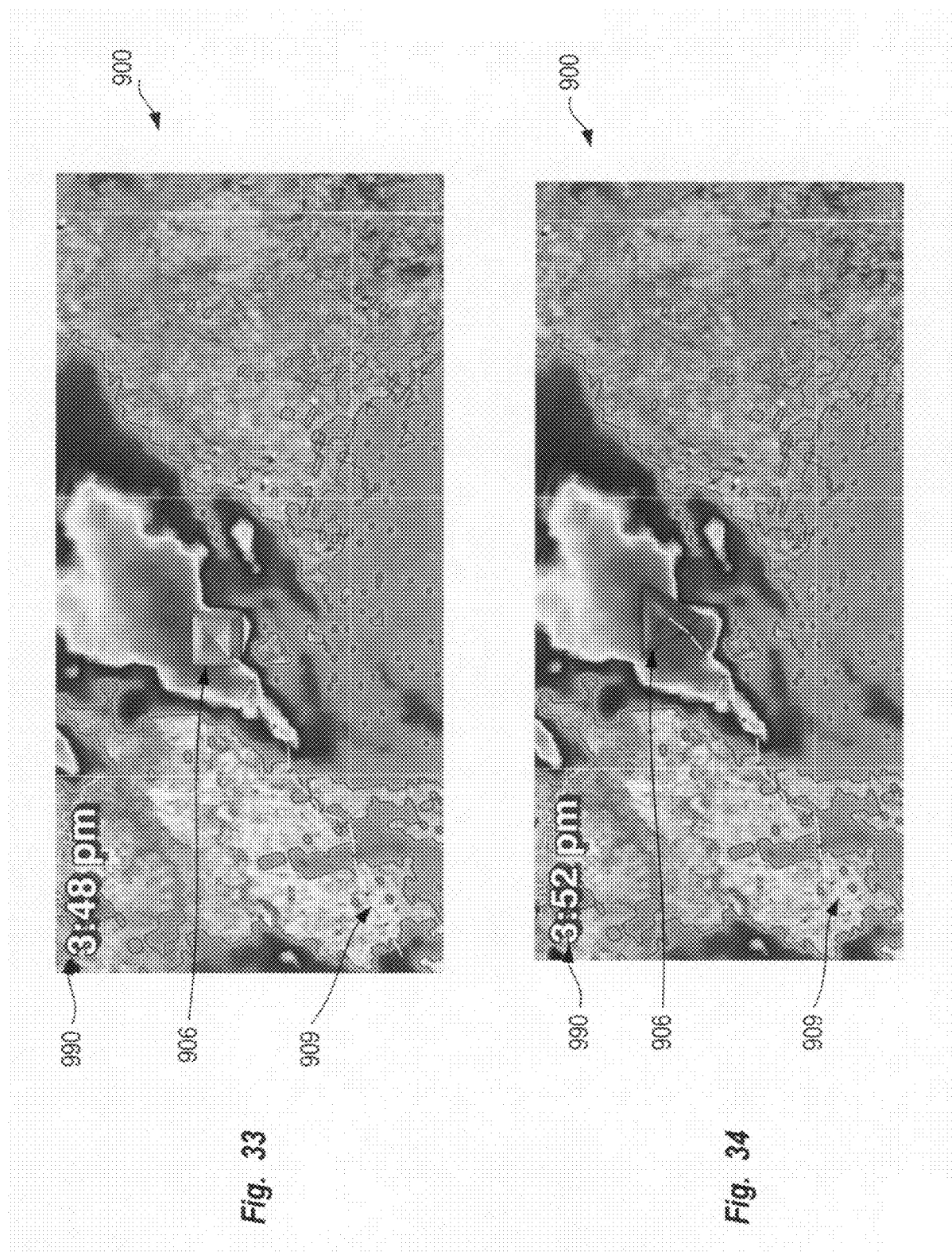
Figure 35:
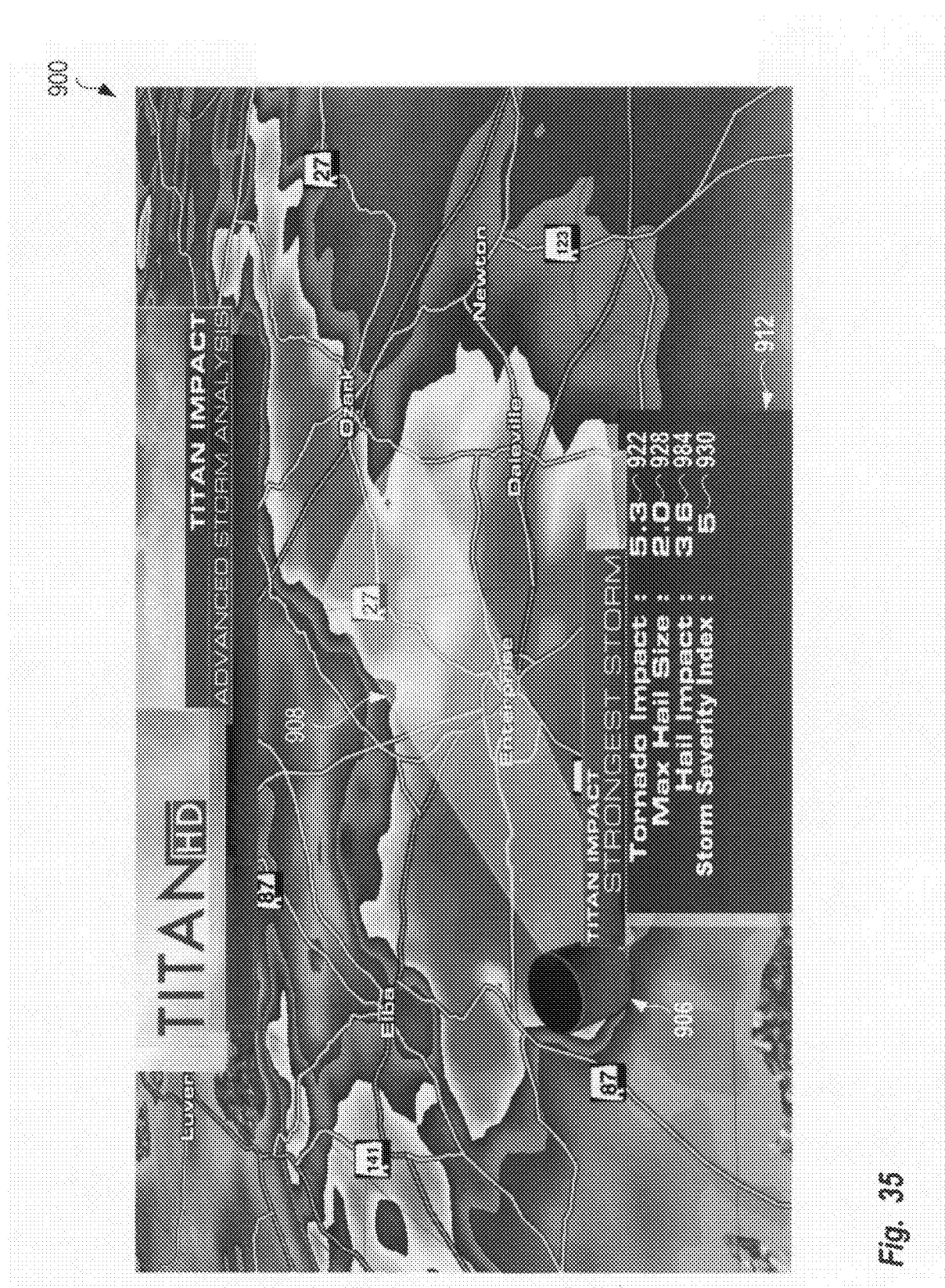
Figure 36:
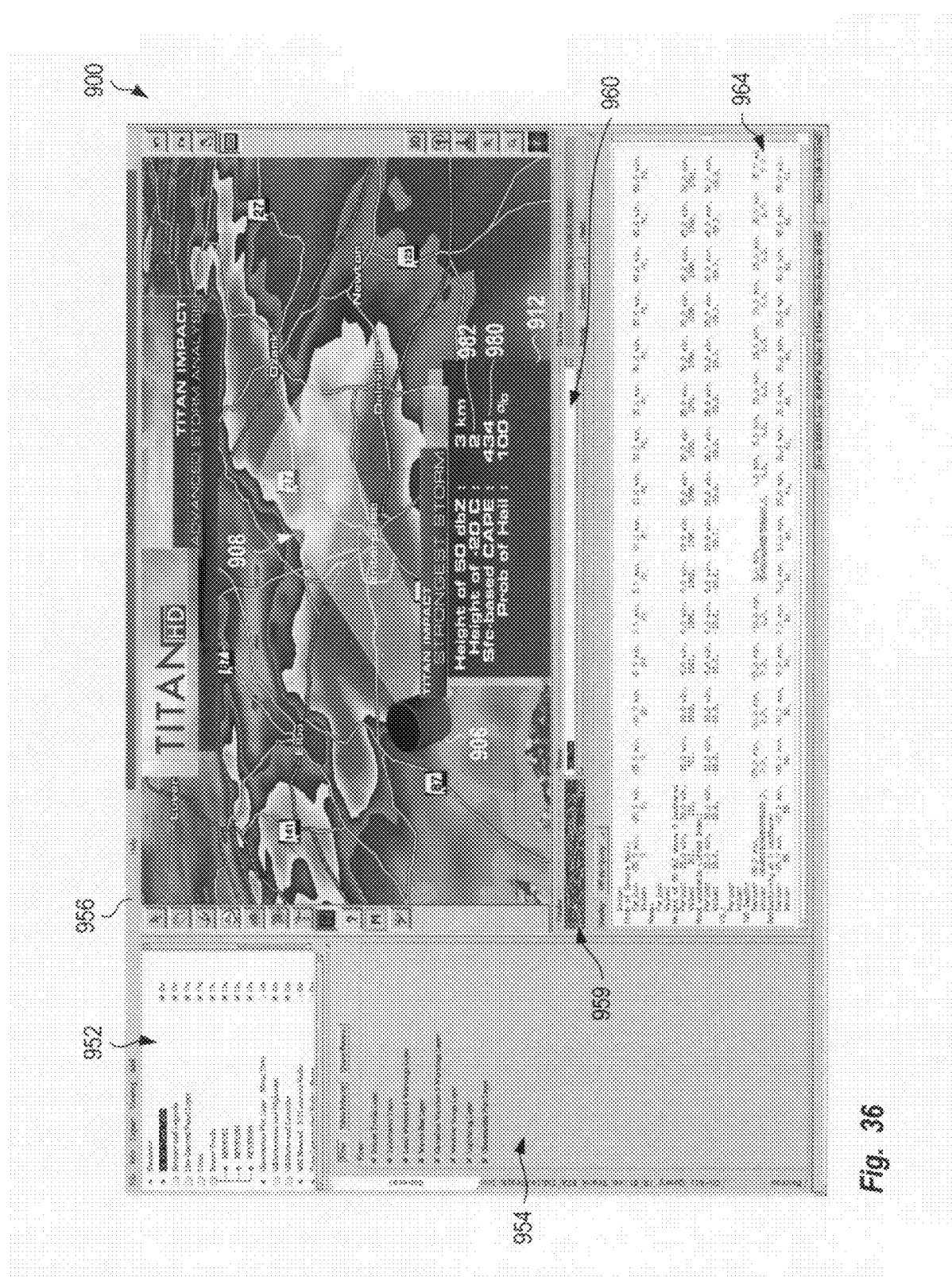
Figure 37:
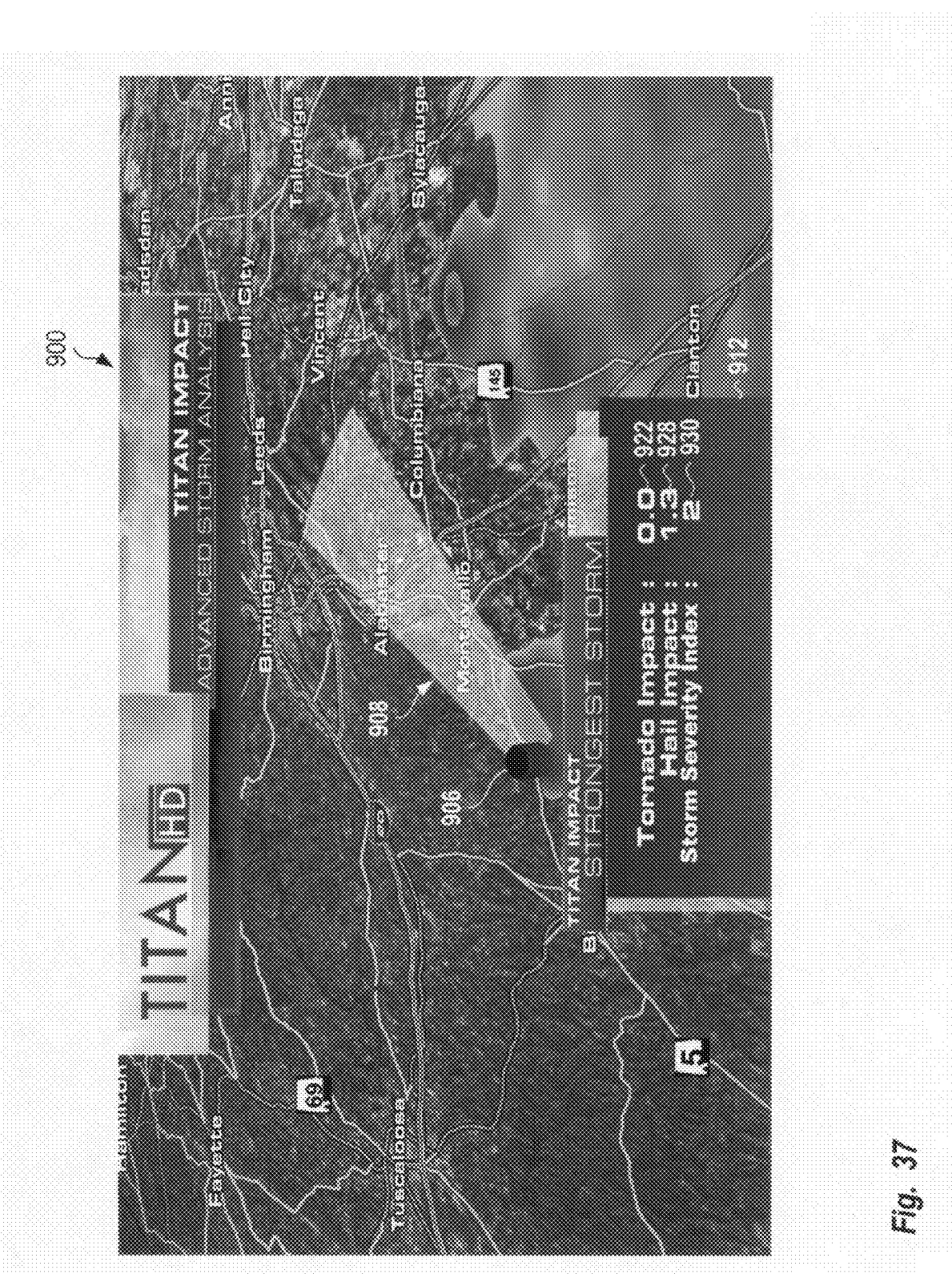

FIG. 10A is a class diagram for weather events in accordance with the intelligent broadcast system of FIG. 1;

FIG. 10B is a class diagram for traffic events in accordance with the intelligent broadcast system of FIG. 1;

FIG. 10C is a class diagram for weather events in accordance with the intelligent broadcast system of FIG. 1;

FIG. 10D is a class diagram for presentation elements in accordance with the intelligent broadcast system of FIG. 1;

FIG. 10E is a class diagram for templates in accordance with the intelligent broadcast system of FIG. 1;

FIG. 11 is an activity diagram for the identification of events and generation of corresponding datasets in accordance with the intelligent broadcast system of FIG. 1;

FIG. 12 is an activity diagram for the selection of events and navigation of presentations in accordance with the intelligent broadcast system of FIG. 1;

FIG. 13 is a use case diagram of a convective storm analysis system in accordance with one embodiment of the present method and system and that can be interfaced with the intelligent broadcast system of FIG. 1;

FIG. 14 is a system diagram for a weather severity and characterization system in accordance with one embodiment of the present invention;

FIG. 15 is a use case diagram in accordance with the weather severity and characterization system of FIG. 14;

FIG. 16 is a flow diagram in accordance with the weather severity and characterization system of FIG. 14;

FIG. 17 depicts the temporal evolution of two storms in accordance with the weather severity and characterization system of FIG. 14;

FIG. 18 shows a partial graphical representation of a multi-dimensional database in accordance with the weather severity and characterization system of FIG. 14;

FIG. 19 shows a partial graphical representation of a multi-dimensional database in accordance with the weather severity and characterization system of FIG. 14;

FIG. 20 demonstrates duplication of data from a single instance of a storm in the multi-dimensional database due to identification from multiple sources of weather data in accordance with the weather severity and characterization system of FIG. 14;

FIG. 21 is an exemplary graphical presentation in accordance with the weather severity and characterization system of FIG. 14;

FIG. 22 is an exemplary graphical presentation in accordance with the weather severity and characterization system of FIG. 14;

FIG. 23 is an exemplary graphical presentation in accordance with the weather severity and characterization system of FIG. 14;

FIG. 24 is an exemplary graphical presentation in accordance with the weather severity and characterization system of FIG. 14;

FIG. 25 is an exemplary graphical presentation in accordance with the weather severity and characterization system of FIG. 14;

FIG. 26 is an exemplary graphical presentation in accordance with the weather severity and characterization system of FIG. 14;

FIG. 27 is an exemplary graphical presentation in accordance with the weather severity and characterization system of FIG. 14;

FIG. 28 is an exemplary graphical presentation in accordance with the weather severity and characterization system of FIG. 14;

FIG. 29 is an exemplary graphical presentation in accordance with the weather severity and characterization system of FIG. 14;

FIG. 30 is an exemplary graphical user interface in accordance with the weather severity and characterization system of FIG. 14;

FIG. 31 is an exemplary graphical presentation in accordance with the weather severity and characterization system of FIG. 14;

FIG. 32 is an exemplary graphical presentation in accordance with the weather severity and characterization system of FIG. 14;

FIG. 33 is an exemplary graphical presentation in accordance with the weather severity and characterization system of FIG. 14;

FIG. 34 is an exemplary graphical presentation in accordance with the weather severity and characterization system of FIG. 14;

FIG. 35 is an exemplary graphical presentation in accordance with the weather severity and characterization system of FIG. 14;

FIG. 36 is an exemplary graphical user interface in accordance with the weather severity and characterization system of FIG. 14; and FIG. 37 is an exemplary graphical presentation in accordance with the weather severity and characterization system of FIG. 14.

DETAILED DESCRIPTION OF THE INVENTION

Certain terminology is used herein for convenience only and is not to be taken as a limitation on the present invention. In the drawings, the same reference letters are employed for designating the same elements throughout the several figures.

The words "right", "left", "lower" and "upper" designate directions in the drawings to which reference is made. The words "inwardly" and "outwardly" refer to directions toward and away from, respectively, the geometric center of the intelligent broadcast system 100 and designated parts thereof. The terminology includes the words above specifically mentioned, derivatives thereof and words of similar import.

The intelligent broadcast system 100 of the present invention permits a presenter, such as a weather or traffic broadcaster or reporter to automatically determine, isolate and present interesting aspects or events within a set of data. The interesting aspects or events may be determined according to the preferences of the reporter (e.g., what the reporter thinks is interesting), or may be determined according to pre-determined guidelines related to the data (e.g., a particular class or type of event that is generally considered interesting). Such events or aspects might include, for example, with respect to weather data, record high temperatures, eventful storms (e.g., thunderstorms, hurricanes, etc.), or significant historical events. With respect to traffic data, such events might include an accident, known congested areas or construction zones. Those skilled in the art will recognize that the aspects or events need not actually be significant occurrences to be identified as an aspect or event by the intelligent broadcast system 100. That is, the interesting aspects or events that are identified may, in fact, occur without the presence of a significant event. For example, with respect to weather data, on an average day when there are no thunderstorms, record temperatures, etc, in a geographic region of weather interest, the weather broadcaster may nonetheless be interested in presenting average aspects or events about the weather, even though there are no major events to display.

In one embodiment, the presenter 102 is able to assign a precedence or priority to events or types of events, such that the intelligent broadcast system 100 automatically prioritizes the events that are identified and/or identifies events that have a certain priority. For example, rules that identify severe weather in the immediate vicinity of the presenter's broadcast location may have a high priority, whereas rules that identify weather events for a remote location may have a lower priority. Alternatively, tornados (irrespective of geographic location) may have a higher priority than a non-eventful rainstorm.

In one embodiment, the presenter 102 may desire to display an event map that includes a maximum number X of events. However, if, according to the rules established by the editor 150 or the presenter 102, the intelligent broadcast system 100 identifies a number or events greater than X, then the system would only present for selection (i.e., display on a selection map or other graphical display) those X events having the highest assigned priority. Alternatively, the presenter 102 could establish a rule that identifies and/or displays events only of specific priorities. Those skilled in the art will recognize that the priority assigned to a particular event or event type could be assigned by the editor 150, presenter 102 or be a default priority assigned by the intelligent broadcast system 100.

In another embodiment, events are identified according to regional interests as determined by pre-defined default conditions and/or the presenter 102 or editor 150. For example, even though a particular event is identified by the system according to the rules generally, such an event may actually be applicable (e.g., relevant) to a particular region, city or group of people (e.g., people in Boston are likely not interested in record high temperatures in Phoenix, while they may be interested in the current snowfall in Philadelphia). Accordingly, even though an event is identified by the system, it may not actually be presented for selection depending on its regional or local relevance. Such a regional filter could be used in conjunction with the event priorities discussed above.

Once the intelligent broadcast system 100 has identified the events of interest, presentation elements corresponding to those events are generated by the intelligent broadcast system 100. Depending on the presenter's preferences or rules, the presentation elements include, for example, graphics, video, audio and/or text, etc., data about the identified events. The presentation elements may also include information or data related to associated events. The identified events are preferably displayed to the user in the form of markers, links or icons, such that the reporter is able to select a desired event. Selection of an event initiates a presentation comprising the presentation elements and according to the presenter's rules. The presenter has the ability to navigate through the presentation in an organized, hierarchical manner related to the selected event.

Thus, in the intelligent broadcast system 100, the user has the ability to determine what types of data (e.g., events) are interesting, determine what types of data related to the identified event(s) should be assembled and/or associated with certain other types of data for presentation purposes, and instruct the system to present that data in an interesting or particular manner. The intelligent broadcast system thus automatically finds such data and upon selection of interesting features, events or aspects of that data, displays and allows for the presenter to navigate through prepared presentations related to that data.

The intelligent broadcast system 100 is described herein primarily with reference to weather data and weather reporting and broadcasting. However, those skilled in the art will recognize that the intelligent broadcast system according to the present invention is applicable to other forms of data and presentation thereof, including traffic data, economic and business analyses, political news, environmental monitoring, transportation and logistics, military operations, and generally to any other form of data and/or reporting that can be referenced and reported in an organized manner.

FIG. 1 illustrates a Unified Modeling Language ("UML") use-case diagram for an intelligent broadcast system 100 and associated systems and actors in accordance with the present method and system. UML can be used to model and/or describe methods and systems and provide the basis for better understanding their functionality and internal operation as well as describing interfaces with external components, systems and people using standardized notation. When used herein, UML diagrams including, but not limited to, use case diagrams, class diagrams and activity diagrams, are meant to serve as an aid in describing the present method and system, but do not constrain its implementation to any particular hardware or software embodiments. Unless otherwise noted, the notation used with respect to the UML diagrams contained herein is consistent with UML 2.0 specification or variants thereof and is understood by those skilled in the art.

Referring to FIG. 1, a presenter 102 and/or an editor/producer 150 preferably interact with the intelligent broadcast system 100 through the use of a display/monitor system 104, and a human-machine interface (not shown). Display mechanisms and human-machine interfaces are generally known in the art, and a description thereof is omitted herein for convenience only, and should not be considered limiting. Those skilled in the art will further recognize that the presenter 102 and the editor/producer 150 may be the same or different person or groups of persons. Furthermore, the presenter 102 and/or the editor/producer 150 may be an entity or computer system or network designed to interact with the intelligent broadcast system 100.

Referring to the right hand side of FIG. 1, the intelligent broadcast system 100 includes an obtain rules use case 124 that the intelligent broadcast system 100 utilizes to retrieve and organize rules to be applied to the relevant data, such that the intelligent broadcast system 100 may determine relevant event(s) of interest, appropriate information or data to display corresponding to those events and the desired manner of such display(s).

The obtain rules use case 124 accesses and retrieves the desired rules to be applied to the relevant data through a create rules use case 126 and/or a rules database 120. The create rules use case 126 permits the editor/producer 150 to create specific or general rules relevant to the particular situation or type of presentation(s) that are desired or relevant to the type of data or situation that is going to be analyzed. The create rules use case 126 and the obtain rules use case 124 preferably include a human interface such as a text editor, Graphical User Interface (GUI), form based entry, or other data entry mechanism generally known to those skilled in the art, that enables the editor/producer 150 to interact with the intelligent broadcasts system 100 to create, update and/or select rules for creation of the desired presentation(s).

In an alternate embodiment, presenter 102 creates rules for use in conjunction with the presentation. Thus, those skilled in the art will understand that creation, editing and selection of the desired rules may be accomplished by one or a combination of people, and maybe undertaken at the site of the presenter 102, editor 150 and/or a remote location and transmitted to the presenter 102 or editor 150.

Similarly, the rules database 120 preferably includes rules that have been previously created and stored by the editor/producer 150 (or a different editor/producer 150). The rules in the rules database 120 may be reviewed and retrieved according to the desired presentation type or analysis. Thus, the obtain rules use case 124 permits the editor/producer 150 to select which pre-stored rules from the rules database 120 are to be utilized in generating the presentation(s) for the intelligent broadcast system 100. The update rules use case 122 enables rules that are created by the editor/producer 150 in the create rules use case 126 to be stored in the rules database 120 or updates the existing rules that have been previously stored in the database 120 for future use. Discussion and examples of the rules that may be created, updated and/or stored in the rules database 120 or obtained through the obtain rules use case 124 are discussed in greater detail below.

The intelligent broadcast system 100 further includes an apply rules use case 128, through which the rules obtained in obtain rules use case 124 are applied to the relevant data to be analyzed for presentation. The rules are preferably applied to current data provided by a current data system 140 and/or historical data provided by a historical data system 130. Examples of current and historical data include surface weather observations, radar imagery, lightening data, satellite imagery, climatological normals, record maximums and minimums or highs and lows (of various data types, such as temperature, precipitation, etc.) and other notable weather events. Those skilled in the art will recognize that the rules may also be applied to predicted or forecasted aspects of such data. The application of the rules to the relevant data permits events or aspects within that data that are of interest (as defined by the applied rules) to be determined or otherwise identified through the identify events/aspects use case 132.

A generate presentation elements use case 118 determines, obtains and generates data representations (data or sets of data) corresponding to the events or aspects identified by the identify events/aspects use case 132. That is, the generate presentation elements use case 118 accesses data relevant to the identified events and aspects (for example, from the current and historical data systems 130, 140) and, in accordance with the rules used in the apply rules use case 128, including those rules used to identify the aspects or events themselves, compiles the data representations presentation elements, information, and other data corresponding to the rules for the particular identified events or aspects. The presentation elements may be derived from any data or set of data (e.g. the data representations) in a variety of formats. The content and format of the presentation elements is defined by the applied rules, as discussed in greater detail below.

The generate presentations use case 118 also assembles presentations related to the identified events or aspects for selection and/or presentation by the presenter 102. The generated presentations include data representations and presentation elements corresponding to the identified events or aspects. That is, the data representations corresponding to the events identified by the identify events/aspects use case 132 are used to generate presentation elements related to those events in accordance with the rules. The presentation elements and presentations as defined by the rules may by any combination of graphics, video, text, audio or any other display or presentation mechanism or format generally known to those skilled in the art.

As described above, the rules used by the apply rules use case 128 facilitate the identification of events, formation of presentation elements, and production and navigation of presentations and presentation elements corresponding to the relevant current and historical data utilized by the intelligent broadcast system 100.

A number of functions can be defined which serve as the basis for expressions that serve as rules. With respect to the identification of events and formation of presentation elements, the following are representative functions that can be used to locate events of interest, identify those events, and form corresponding presentation elements:

DAMAGE(location, threshold)
EXTREMES(location, parameter type, lower limit, upper limit)
RECORD(location, date range)
STORM(location, time)
DELAY(location, delay)

The functions may include a location field that may be described through the use of standardized abbreviations such as city indicators (BOS), geographic region indicators (US), full city names (Boston), state abbreviations, or other predefined geographic indicators. Similarly, time can be indicated through traditional representations of date and time (Nov. 4, 2005, 12:00) as well as representations that encompass general time spans (a.m., p.m., today, current). In one embodiment, the representations that encompass general time spans are given explicit definitions and allow a human to use easily recognizable words such as "today" which will have a specific predefined meaning (e.g. within the last 12 hours). Other mechanisms for the representation of locations, time ranges, and other parameters generally known to those skilled in the art may be used. By predefining the particular mechanism for representing variables, the editor/producer 150 can use commonly recognizable language to identify specific locations, times, and other parameters associated with an applications such as weather and traffic.

The functions may be combined with Boolean operators, well known conditional statements such as IF . . . THEN, and search commands such as FIND, to produce rules or sets of rules applicable to data monitoring, formation of presentation elements and presentations and navigation thereof.

Preferably, data monitoring rules search current, historical and/or forecast data looking for and identifying events of interest (as defined by the rules, and thus the editor/producer 150). For example, a rule may search through current weather data for the entire United Sates looking for cities that have recorded a record high temperature for that day. Of course, such searching will also incorporate analysis of the historical weather day for that particular day, since previous record high temperatures must be ascertained to determine what the previous record is, as well as predicted or forecast data. In this case, the rules will identify cities that have recorded a record high temperature.

Once the data monitoring rules have identified an event of interest (e.g., record high temperature), data representations, presentation elements and other data corresponding to that event are generated according to the designated rule. That is, data representations can be determined based on the identified events. The data representations will contain information (or indices or pointers to information) that will allow corresponding presentation elements to be prepared if the event of interest is selected. For example, in the case of record high temperatures, corresponding presentation elements might include a listing of all of the other cities within a 50 mile radius that also have recorded record high temperatures.

A representative rule for monitoring record temperatures in the US, identifying those events in the database and on the current (today's) weather map, and creating presentation elements with relevant information regarding that event is:

IF Temperature(US, today)>PastHighTemperature(US, today)
OR
IF Temperature(US, today)<PastLowTemperature(US, today),
THEN
    DECLARE_EVENT(US, today, record_temp, location)
AND
    FORM_PRESENTATION_ELEMENT(record_temp, location, records).

Other examples of rules for data monitoring, identification of events and generation of presentation elements include:

1. IF (daily rainfall at Logan Airport>0.2 inches for more than 5 {n} days),
THEN
    DECLARE_EVENT (Logan Airport, rainfall)
AND
    FORM_PRESENTATION_ELEMENT (Boston metro graphic that shows {n} day rainfall totals at 7 reporting stations in the Boston metro area).

2. IF (maximum temperature at Logan Airport today is at least 20 degrees warmer than yesterday),
THEN
    DECLARE_EVENT (Logan Airport, today, yesterday, max_temp)
AND
    FORM_PRESENTATION_ELEMENT (Boston metro graphic with contours of 24 hour temperature change)
AND
    FORM_PRESENTATION_ELEMENT (NE region 24 hour animation of frontal positions, highs, lows, and jetstream)

3. IF (hurricane center within 200 miles of US coastline),
THEN
    DECLARE_EVENT (hurricane, location)
AND
    FORM_PRESENTATION_ELEMENT (48 hour satellite loop centered on the hurricane center 12 hours ago)
AND
    FORM_PRESENTATION_ELEMENT (48 hour forecast hurricane track animation over a region centered two thirds of the way between current hurricane center and forecasted landfall)

In one embodiment, additional rules may be used to form presentation elements related to historical record temperatures, such as video footage of conditions related to previous historical records (e.g. footage of a drought, heat wave, etc.). An exemplary rule that would be appended to the above rule for monitoring record temperatures might be:

FORM_PRESENTATION_ELEMENT(record_temp, historical_weather_event).

Similarly, in another embodiment, a rule might be developed to monitor both weather and traffic conditions in a particular location or locations that naturally correspond to one another, for example, Boston and Cape Cod. Such a rule would be particularly useful for monitoring conditions that could lead to traffic slowdowns during heavy traffic times, such as on summer weekends. A representative rule might be:

IF Precipitation({BOS, Cape Cod}, {Friday AM, Sunday AM})>0.2 inches;
OR
IF ForecastPrecipitation({BOS, Cape Cod}, {Friday, Saturday, Sunday})>0.2 inches;
AND
IF TrafficConditionsDelay({BOS, Cape Cod}, {Friday, Saturday, Sunday})=TRUE;
THEN
    DECLARE_EVENT(BOS, today, traffic_advisory);
AND
    FORM_PRESENTATION_ELEMENT(traffic_advisory, traffic_conditions).

As will be understood by those skilled in the art, rules can be developed to monitor current conditions for events of interest and to relate those current events to past events or conditions. By automatically identifying events of interest, it is no longer necessary to have a human monitor all of the incoming events to determine what events are potentially of interest to the audience. That is, the events of interest are automatically determined according to the rules selected or created by the editor/producer 150 of the intelligent broadcast system 100.

In another embodiment the presenter 102 has the ability to manually identify a geographic region of interest. For example, the presenter 102 could select or highlight a geographic area of interest on a weather map that may or may not already include identified events. Based on pre-defined rules, the intelligent broadcast system 100 could then evaluate the data corresponding to the geographic area highlighted by the presenter 102 and identify events and generate presentation elements associated with that area, as described herein.

Similar to the data monitoring rules described above, the intelligent broadcast system 100 allows for functions or rules to be defined that govern the display, selection and presentation of identified events and the presentation of the presentation elements associated with a selected event. Such presentation/navigation rules may be incorporated with or separate from the data monitoring and event identification rules discussed above.

Examples of the types of functions utilized with the presentation/navigation rules include:

DISPLAY(presentation element, template, screen location, time, entrance, exit)

RETURN(presentation elements, return level)

SEQUENCE(presentation elements, templates, screen location, timing)

FORCE_LATERAL(presentation elements, timing)

AUTOMATIC_SEQUENCE(presentation elements, timing)

CUTOFF(presentation elements, cutoff time)

In one embodiment, once events of interest have been identified and corresponding presentation elements formed, the presenter 102 has the opportunity to select one or more of the identified events and have the presentation and/or additional materials related to that event displayed according to the rules that initially identified the event and its corresponding presentation element(s). The related materials may have already been prepared, in the sense that there is no additional searching or preparation of presentation elements involved. Alternatively, the materials to be presented may be prepared according to additional rules or input from the presenter 102.

In one embodiment, the events identified by the identify events use case 132 are identified as such for the presenter 102 on the display/monitor system 104. For example, the presenter 102 may view a display, such as a weather map or other graphical display of data, with identified events corresponding to that data (as identified by the applied rules) marked on the display. The identified events or aspects may be identified or marked with an icon, link or other graphical or text marking mechanism generally known in the art. Those skilled in the art will understand that the type of marker used to mark or present the identified events to the presenter 102 need not be representative of the actual event being marked. For example, a blinking dot could be used to denote active thunderstorms on a weather map instead of more traditional weather marking.

A select events use case 110 enables the presenter 102 to select or highlight a particular event of interest to receive an automatic presentation of materials related to that event. The desired event(s) may be selected any one or combination of selection methods generally known in the art, including, pointing and clicking, highlighting, voice, touch screen technology, keyboard entry, etc.

Selection of a particular event by the presenter 102 allows presentation elements produced by the generate presentations use case 118 to be presented on the display/monitor system 104. The presenter 102 may also utilize the display/monitor system 104 to view and navigate through the presentation elements. Exemplary rules for the presentation and navigation display of record temperatures associated with an identified event on the display indicating a record temperature in a particular city might be:

IF SELECT(record_temp, location)=TRUE
  THEN
    DISPLAY(presentation_materials, record_temp, location).

This rule would, upon selection of an identified record temperature event by the presenter 102, cause the presentation elements related to the selected record temperature to be displayed and/or navigated by the presenter 102.

The manner in which presentation elements are presented may also be specified to the intelligent broadcast system 100. For example, it may be desirable to have the presentation elements formatted according to the records template (e.g., as described in records template class 442), presented in the upper left portion of the display, time the presentation on command (e.g. mouse click or other command), and have the information associated with the selected event enter from the left and fade on command.

The presentation/navigation rules can be employed to allow the presenter 102 to navigate through a hierarchy of information associated with a selected event. That is, the presentation elements associated with an event may inherently or explicitly include a hierarchy of those presentation elements, such that some of those presentation elements are linked together and/or intended for display in a particular order relative to the other presentation elements associated with that event. Moreover, a hierarchy of presentation elements may also include presentation elements that are related to other, non-selected events or may include the option to select additional events.

Navigation through the presentation elements and their related data representations may include access to additional presentation elements and display of additional information related to the selected event, force the presenter through certain sequences of information related to the selected event or allow or force a return to the main display (i.e., not display any additional information). Alternatively, the presentation/navigation rules could enable or force the display of additional materials in the hierarchy. For example, selection of an initial event and presentation of material corresponding thereto, may lead to a display that presents other identified events of interest for selection. In such a case, the navigation rules may permit another identified event to be selected, such that subsequently presented information corresponds to the second selected event instead of the first selected event (although in substance the material may be related). Navigation rules may also limit the amount of time spent on any one portion or display within the presentation, or cause other actions to take place on an automated basis. Alternatively, navigation rules can be put in place allowing the user more flexibility in navigating the hierarchy with fewer constraints.

As an example, a set of navigation rules to control progression through a hierarchy of information (such as record temperatures) might be:

IF remaining_presentation_time<30s
   THEN
      RETURN(records, top).

This rule would, if the presentation time is less than 30 seconds, force the presenter to the top of the hierarchy upon completion of the description of the record temperature related information.

In one embodiment presentation/navigation rules are used to control the display and sequencing of the additional materials in the hierarchy. A different rule can be used to cause the auto-sequenced display of information related to traffic conditions:

IF traffic_advisory
   THEN
      AUTOSEQUENCE (alternate routes).

Figure 9A:
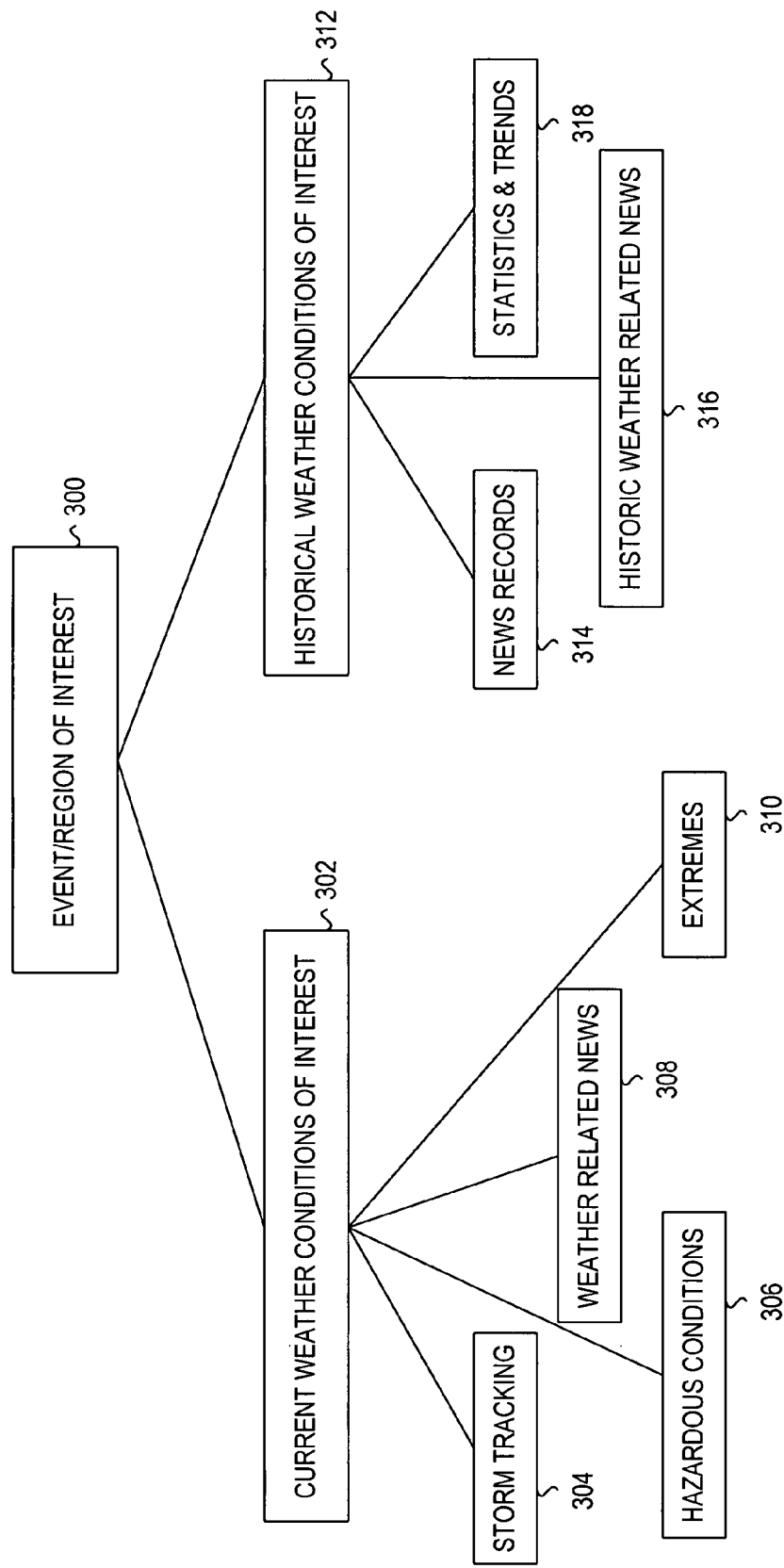
Figure 9B:
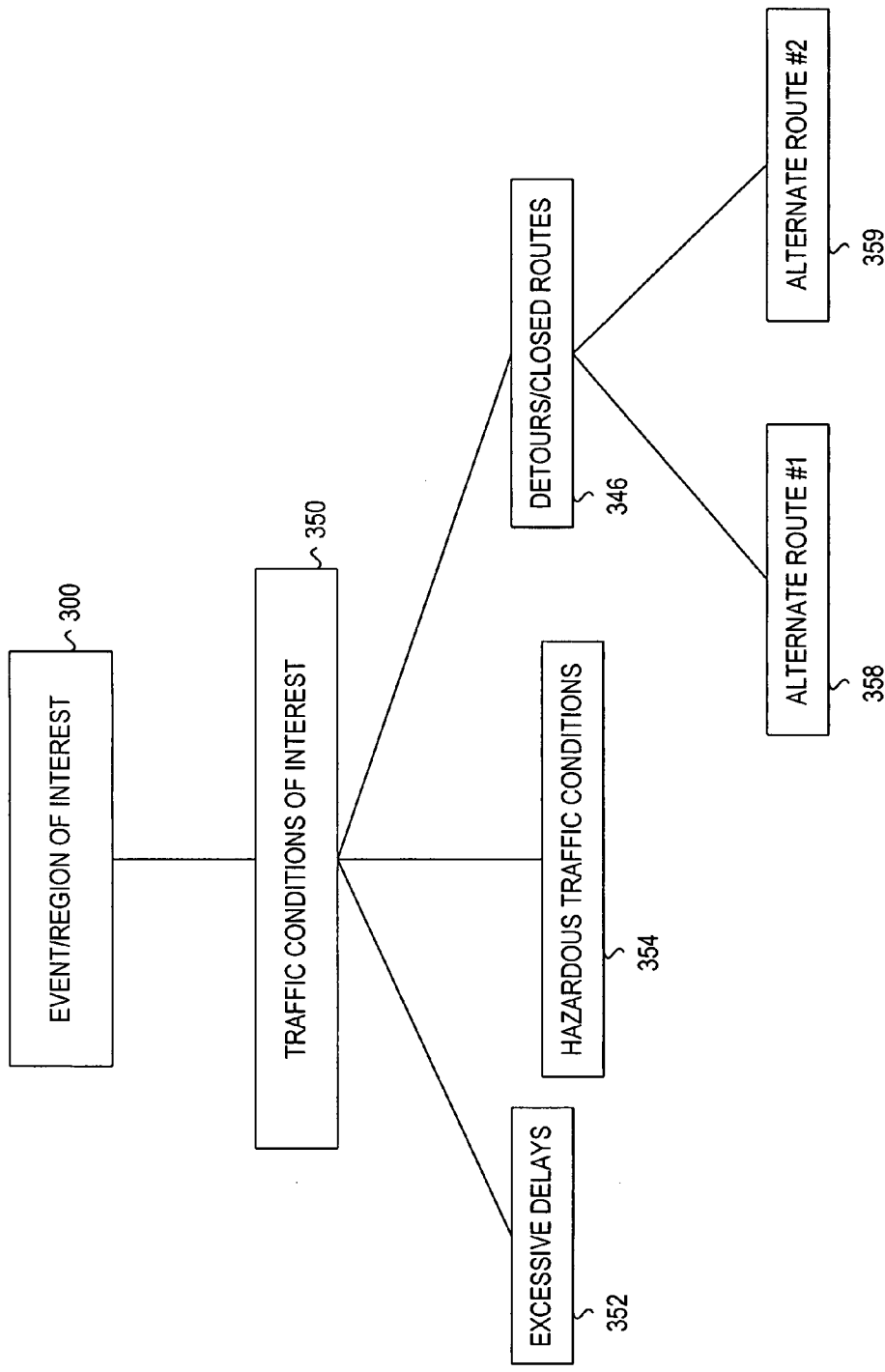
Figure 9C:
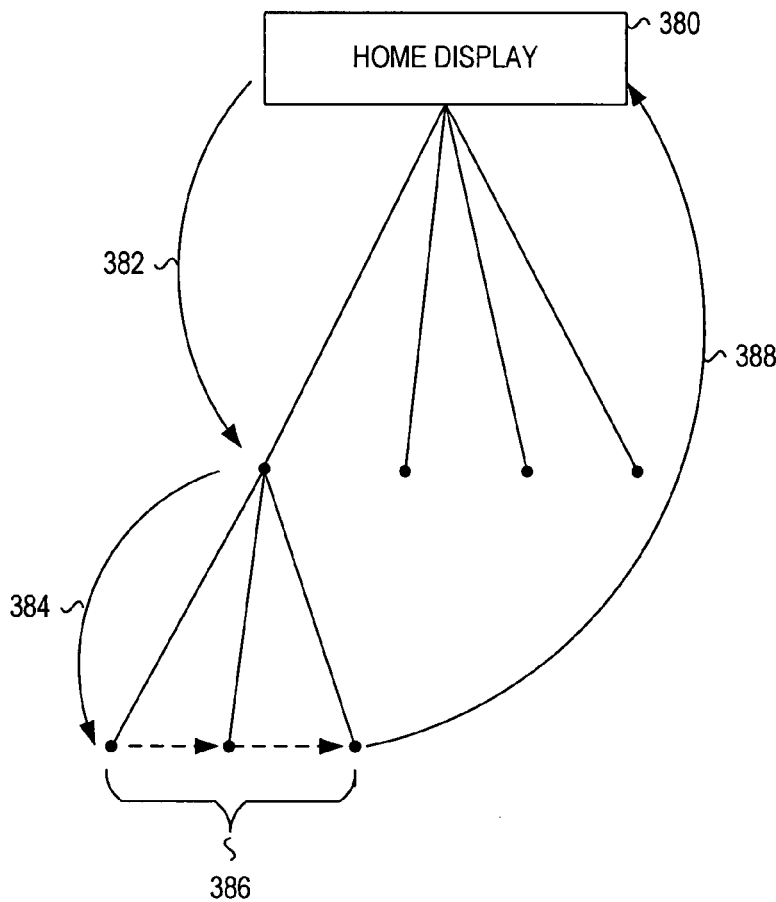

This rule would cause an automatic sequencing of the alternate routes to be displayed (as in autosequence 386 of FIG. 9C.)

Other presentation/navigation rules can be developed and implemented to control or constrain the flow of the presentation. In one embodiment the presentation/navigation rules are automatically modified based on one or more parameters including the number of events selected by the presenter, the depth of the hierarchy already explored, or the remaining time in the presentation. In this embodiment the modification of the navigation rules takes place based on the current conditions of the broadcast and events (selections) made during the broadcast, in addition to program constraints.

As noted above, individual rule sets can be created to accomplish data monitoring, formation of presentation elements, and creation and navigation of those presentation elements in accordance with the desires of the editor/producer 150 and/or the presenter 102. Alternatively, general sets of rules can be generated to accomplish the aforementioned tasks.

Presenter 102 may also navigate the a predefined hierarchy of presentation sequences or displays corresponding to the selected event using the increase level use case 112 and/or the decrease level use case 114. Similarly, the presenter 102 may return to the top level (e.g., the initial event selection display) through return to top level use case 116.

Figure 2:
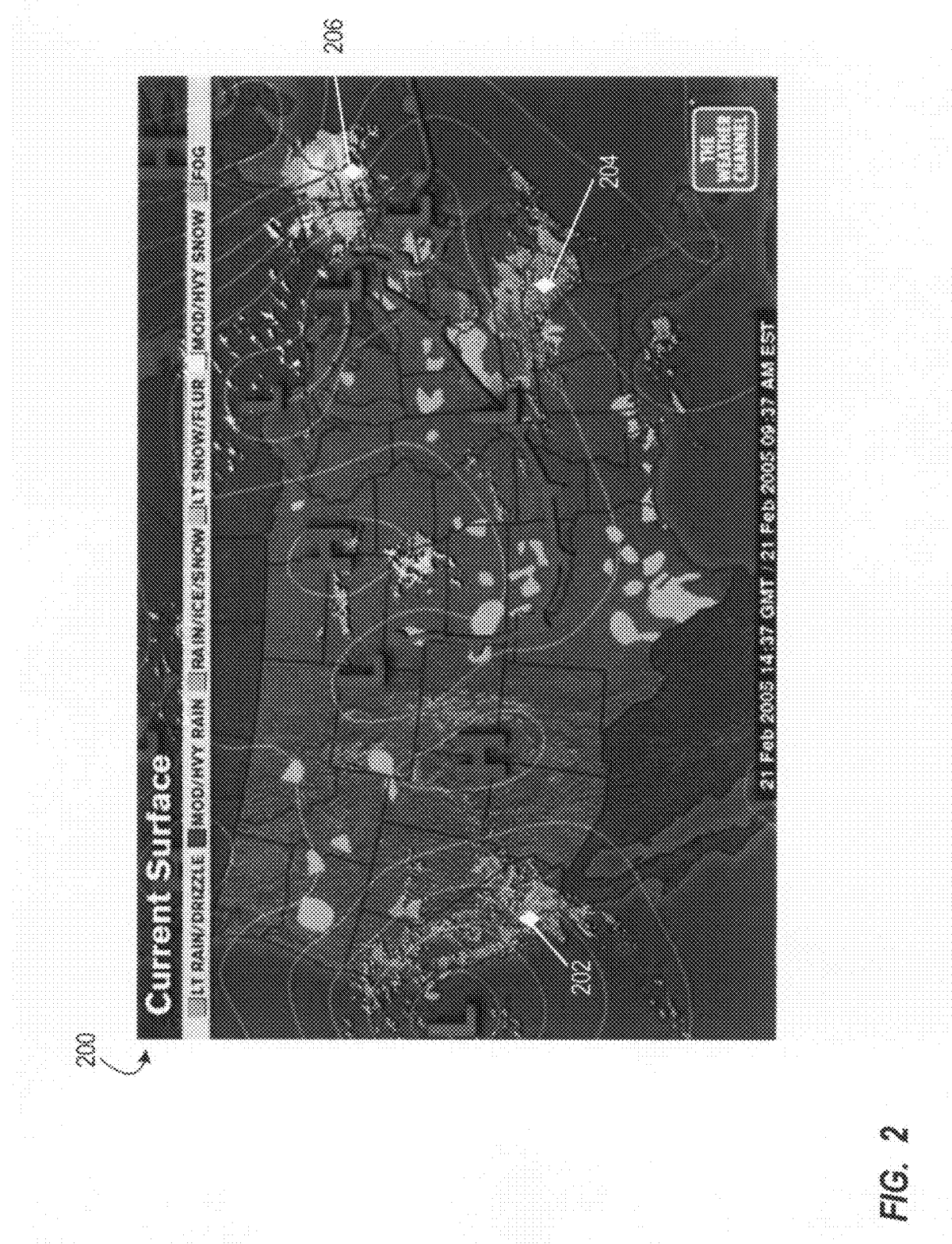

Referring to FIGS. 2-8, an exemplary presentation that may be presented by the intelligent broadcast system 100 is shown. FIG. 2 illustrates an example of a graphical display (in this case a typical map showing current weather conditions across the United States) 200 that includes identified events or aspects that are displayed to the presenter 102. In FIG. 2, the generate presentations use case 118, in conjunction with the identify events use case 132, has identified the weather conditions that meet the conditions set forth by the data monitoring rules obtained by the obtain rules use case 124. The identified events in FIG. 2 are denoted by markers or icons 202, 204, 206 that populate the graphical display 200. In this example, the graphical display 200 serves as the "home" display of the presentation, discussed in greater detail below. The markers 202, 204, 206 thus indicate geographic locations or regions where an aspect, event or region of interest exists, as determined by the applied rules. As described above, presentation elements may be associated with each of the markers 202, 204, 206, as generated by generate presentation element use case 118 in accordance with the rules. Similarly, presentation elements (or data representations corresponding to the presentation elements) may be available corresponding to the events represented by each of the markers 202, 204, 206. Those skilled in the art will recognize that presentation elements and corresponding presentations need not be available for each of the markers (i.e., aspects or events) identified on the graphical display 200. Rather, it may be the case that the editor/producer 150 defined rules to prepare presentations for only aspects or events that meet certain criteria, even though the data monitoring rules were defined to include other similar types of events. For example, it may be the case that the presenter 102 desires to identify the cities/regions having record high temperatures, but only needs a presentation for such identified events (cities/regions) in the eastern portion of the U.S.

In an alternative embodiment, the data sets and/or the presentation elements associated with a marker or identified event are dynamically formed and prepared upon selection of a particular marker.

A presenter 102 interacting with the graphic display 200 has the option to select any of the markers 202, 204, 206 through the select events use case 110. For example, selecting the marker 202, may retrieve a presentation that comprises sequential presentation elements such as those shown in FIGS. 3 and 4. Thus, selecting marker 202 displays an enlarged graphic 220 depicting Southern California. In this example, the marker 202 remains in the display 220, such that the user may select another action within the presentation. However, it is understood that the display 220 could include additional markers (e.g., events of interest) that did not appear on the initial display 200. Alternatively, the display 220 need not include any additional markers to events if the rules so define.

Figure 3:
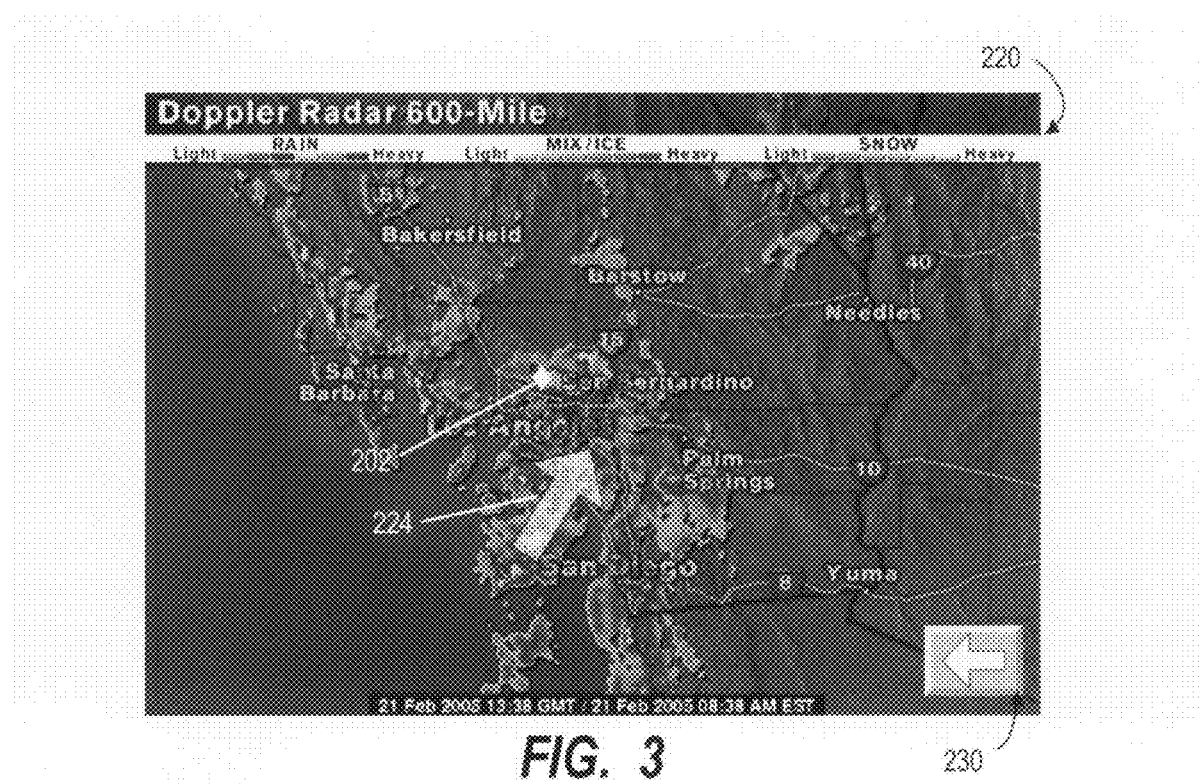
Figure 4:
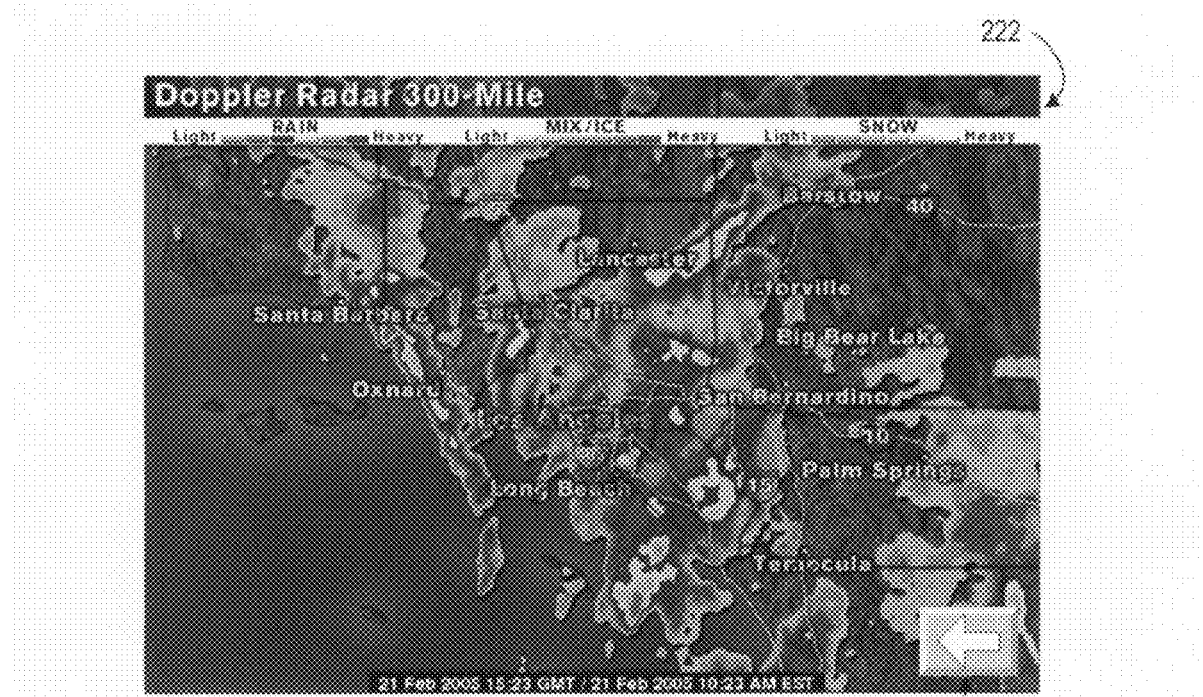
Figure 5:
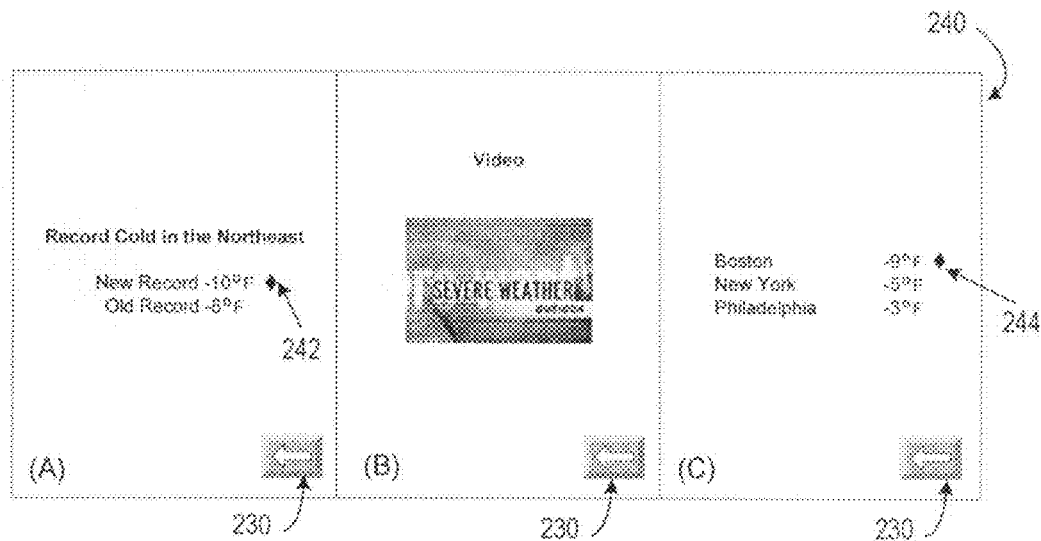

In the display 220 of FIG. 3, the exemplary template rules within the presentation element corresponding to event/marker 202 have defined that a storm track 224 is to be shown that illustrates the path of the storm from the Pacific Ocean toward Los Angeles. The display 220 further includes a return button 230 that allows the presenter 102 to exit the data set and return to the home graphic display 200 of FIG. 2. Similarly, selecting the marker 202 in FIG. 3 advances the presentation to a graphic display 222 in FIG. 4, showing a yet more detailed radar image of Los Angeles. Selecting the return button 230 in FIG. 4 returns the presentation to the graphic display 200 of FIG. 2.

Figure 6:
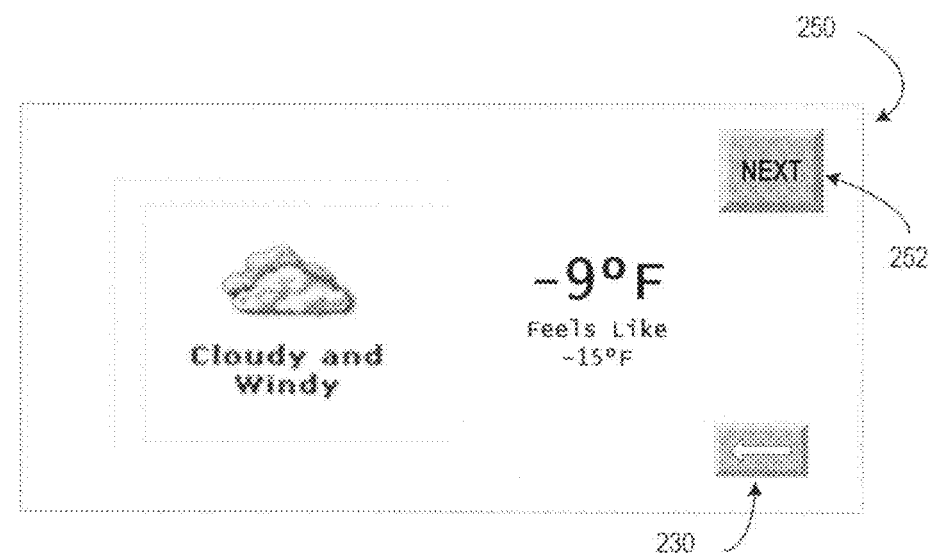
Figure 7:
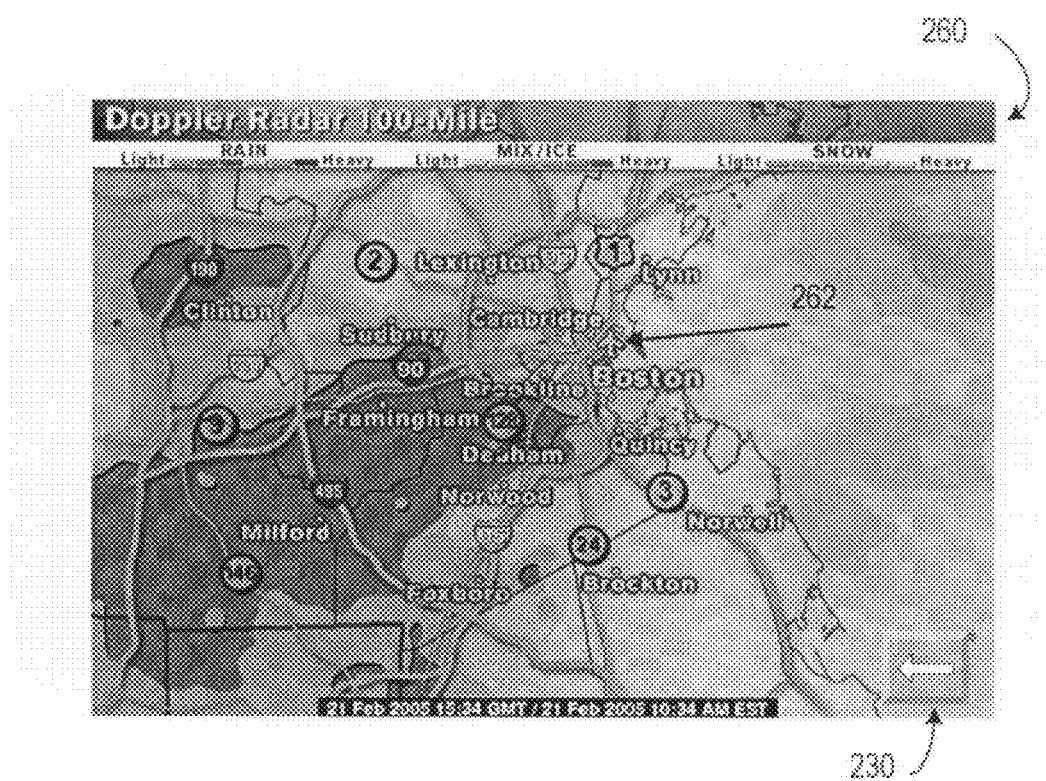
Figure 8:
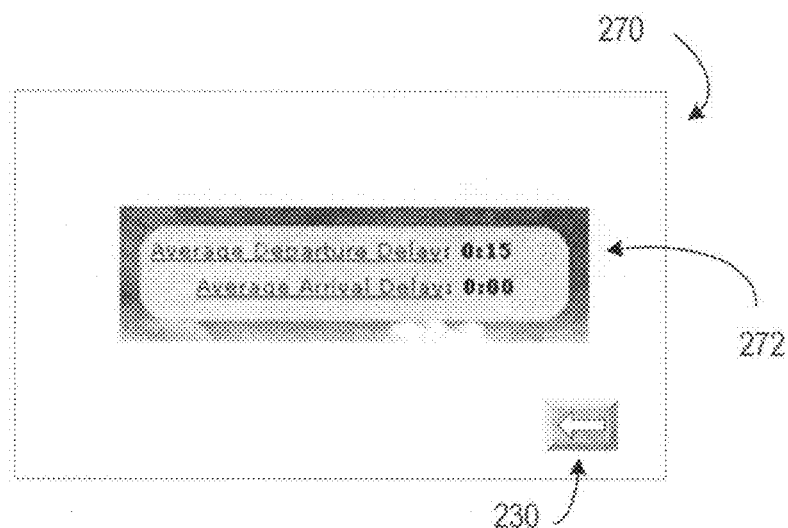

Referring again to FIG. 3, if the presenter selects marker 206 (indicating a condition of interest in the Northeast), an exemplary graphical sequence 240 (see FIG. 5), defined by the presentation element corresponding to the marker/event 206, is presented. The initial graphic to be displayed (A) highlights the condition of interest—record cold temperature. The sequence next displays a video clip (B). Such sequencing may be triggered by user interaction or be an autosequence using predetermined timing. A marker 242 is presented, which, if selected, skips the video clip (B) and advances the sequence to the tabular graphic (C) that illustrates the record cold temperatures in various cities in the Northeast. Each of the graphics in the sequence 240 includes a return button 230 that enables the presenter 102 to return the presentation to the initial graphical display 200, shown in FIG. 2. Selecting a marker 244 from the graphic (C) advances the presentation to a presentation element that provides greater detail about Boston. As shown in FIG. 6, an initial graphic 250 is provided showing the current conditions in Boston. The return button 230 in the graphic 250 will return the visualization to the graphic (C) in FIG. 5. However, selecting the "next" icon 252 advances the presentation to the graphic 260 (see FIG. 7) that shows a weather map of the greater Boston area. In FIG. 7, a marker 262 indicates that there is a condition of interest at Boston's Logan Airport. Upon a selection of the marker 262, the presentation advances to the graphic 270 (see FIG. 8) that shows airport delays 272 for Boston's airport. Selecting the return button 230 in either of graphics 260 or 270 returns the presentation to the graphic display (C) in the sequence 240 of FIG. 5.

As previously described, the intelligent broadcast system 100 can be used to enhance weather presentations through the automatic marking of events of interest, and by providing presenter 102 with the ability to access additional information through a selection process. By providing information in a hierarchical format, presenter 102 can use the intelligent broadcast system 100 to explore additional information related to current weather events. By having the additional information in a hierarchical configuration presenter 102 can explore information related to a marked event at a shallow level or can continue a discussion regarding a particular marked event by exploring the deeper levels of the hierarchy. The incorporation of historical data into the weather presentation provides presenter 102 with additional material that is potentially of interest and which may be necessary during times of "uninteresting" current weather.

FIG. 9A illustrates a representative hierarchical set of potential presentation elements related to weather (current and historical) that could be generated by a set of rules and made available to a presenter 102 during a dynamically formed presentation or broadcast. In one embodiment, a weather map contains a number of marked events or regions of interest which, upon selection, cause the generation or retrieval of presentation elements related to that event/region of interest, as described above, for example, with respect to FIG. 2). In some cases, the presenter is presented with icons or other indicators which give the presenter the ability to select additional events/regions of interest. In FIG. 9A, an event/region of interest 300 can be selected and, in addition to the presentation elements associated with event/region of interest 300, the presenter is given the opportunity to navigate to current weather conditions of interest 302 which are related to event/region of interest 300, or to select historical weather conditions of interest 312, that are also related to event/region of interest 300.

If the current weather conditions of interest 302 are selected, the presenter 102 will have the ability to go further into the hierarchy and to display information related to storm tracking 304, hazardous conditions 306, weather related news 308, and extremes 310. If historical weather conditions of interest 312 is selected, the presenter 102 will have the ability to go further into the hierarchy and to display news records 314, historic weather related news 316, or statistics and trends 318. Although a number of categories of weather related conditions, news and items of historical interest have been described with respect to FIG. 9A, other categories or types of items may be used to create materials for presentation in the weather hierarchy. Furthermore, those skilled in the art will recognize that a hierarchy generated in accordance with the intelligent broadcast system 100 need not include the hierarchical structure and presentation elements shown in FIG. 9A. That is, the particular presentation elements and hierarchy available to a presenter for display and navigation may vary greatly depending on the set of rules applied to the relevant data.

As previously discussed, the intelligent broadcast system 100 is applicable to traffic information and in particular, traffic conditions either in conjunction with a weather presentation, in the context of a stand-alone traffic presentation, or as part of another type of presentation which incorporates traffic information. For example, a presenter may discuss weather conditions in a certain metropolitan area where those weather conditions led to a traffic slowdown in that metropolitan area. In accordance with the present invention, the intelligent broadcast system 100 will have created a presentation element associated with the traffic slowdown and presented the traffic slowdown as a marked event of interest on the weather map. Upon accessing the mark corresponding to the traffic slowdown, additional information related to that traffic condition, including the cause of the slowdown, expected duration of the slowdown, and alternate routes can be displayed. As previously described, an autosequence may be utilized to present a series of traffic information presentation elements, or the presenter may manually access additional presentation elements. The traffic related presentation elements may be laterally organized or may be at different levels in the hierarchy as illustrated in FIG. 9B. As previously described, navigation rules may constrain the presenter based on a number of conditions including the number of other events, number of events previously explored by the presenter, and remaining time in the broadcast.

FIG. 9B illustrates a representative hierarchical set of presentation elements related to traffic that can be used by a presenter 102 during a dynamically formed broadcast. In one embodiment, the presenter 102 initiates the presentation with the same weather map used as the basis for the presentation of weather as previously discussed with respect to FIG. 9A. Thus, the event/region of interest 300 serves as the entry point into the hierarchy for presentation of traffic related information. Traffic conditions of interest 350 can be displayed, and the presenter 102 has the opportunity to go further into the hierarchy to access presentation elements related to items such as excessive delays 352, hazardous traffic conditions 354, and detours/closed routes 356. With respect to detours/closed routes 356, the hierarchy may continue with the ability to present material related to alternate route #1 358 as well as alternate route #2 359.

In an alternate embodiment, a separate traffic related map (not shown) is used as the basis for discussing traffic. In such a presentation, traffic related events/regions of interest are marked on the traffic map rather than on the weather map. Once entry into the hierarchy is initiated, it continues as described with respect to FIG. 9B.

FIG. 9C illustrates a navigation sequence for a hierarchy of information in which the presenter 102, upon entering the presentation hierarchy from a home display 380, traverses the presentation along a first leg 382, a second leg 384, an autosequence 386, followed by a return 388 to the home display 380. In this example, the presenter 102 navigates through first and second legs 382, 384 by choice but is guided through the autosequence 386 and the return leg 388 automatically in accordance with the navigation rules.

Figure 9D:
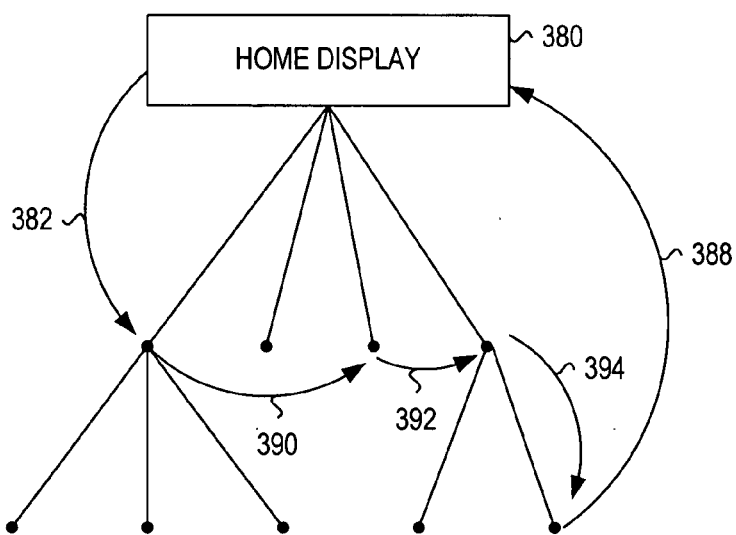

FIG. 9D illustrates an alternate navigation sequence in which the presenter 102 enters the presentation hierarchy from the home display 380, traverses the presentation along a first leg 382, and then selects a first lateral leg 390 followed by a second lateral leg 392. A third leg 394 traverses the presentation to the bottom of the hierarchy, followed by return 388 to the home display 380.

FIGS. 10A-10E illustrate class diagrams for events, presentation elements and templates, and show attributes and operations associated with each class or metaclass. The class diagrams shown in FIGS. 10A-10E are consistent with those used in UML and serve to better describe and illustrate the methods and systems associated with the intelligent broadcast system 100, but do not constrain the implementation of those methods and systems to a particular implementation or computing system, operating system, programming language, or design architecture.

FIGS. 10A-10C illustrate types of classes that can be used to index, store, organize and manipulate data associated with traffic and weather. The use of classes does not constrain the types of data to be indexed, stored, organized or manipulated, nor does it limit the mechanisms by which that data is managed. For example, in one embodiment, a relational database may be employed to store all of the weather and traffic related information, while in an alternate embodiment an object oriented database is used. By describing the particular attributes and operations which can be performed on certain types of data it is possible to create mechanisms for searching the data for events of interest, identify those events of interest, and subsequently form presentation elements which can be used to develop presentation elements, as will be described herein.

Referring to FIG. 10A a weather conditions metaclass 400 is defined which contains a number of basic attributes and operations associated with a weather condition. Classes associated with weather conditions metaclass 400 can include, but are not limited to, temperature class 402, precipitation class 404, winds class 406, and humidity class 408. For each of these classes, particular attributes and operations may be defined as are applicable to that class. For example, a direction attribute can be associated with winds class 406, but will not be applicable to temperature, precipitation, or humidity.

FIG. 10B illustrates a number of classes associated with traffic, including a traffic conditions metaclass 410, an accidents class 412, a construction class 414 and a slowdown class 416.

FIG. 10C illustrates a number of classes associated with severe weather, including a severe weather metaclass 420, a thunderstorms class 422, a snowstorms class 424 and a hurricane class 426.

FIG. 10D illustrates exemplary classes that can be defined to describe presentation elements. Presentation elements comprise aggregated information developed based on particular events and that can be readily converted into presentation materials through the use of data representations, presentation templates or by means of other code that identifies and/or generates data or other materials for display. Presentation elements or datasets need not be separately or explicitly stored data, but can be realized as a set of links or pointers to data contained within a database or other data storage structure or device. As shown in FIG. 10D, a presentation elements metaclass 430 includes records presentation elements 432, predictions presentation elements 434, storm presentation elements 436 and historical weather event presentation elements 438. As an example of the use of presentation elements, records presentation elements 432 can be utilized to obtain a record temperature or (high or low) and the corresponding time and location for the record. By storing or indexing the record location, date and type, presentation elements describing the record temperature associated with an event/region of interest can be readily formed when that material is required by the presenter, or in some instances, just prior to presentation.

FIG. 10E illustrates exemplary classes that can be used to define templates. Templates provide the basis for formatting, rendering and displaying (producing) information in the intelligent broadcast system 100. In one embodiment, the material to which the template is applied comes from a corresponding presentation element or event. In an alternate embodiment, no presentation elements are used and separate data gathering or mining is performed to access data against which the template can be applied. As shown in FIG. 10E, a templates metaclass 440 is associated with a records template class 442, a predictions template class 444, a storm data template class 446 and a historical weather event template class 448. The templates illustrated in FIG. 10E are used to create overlays, segments of video, graphics, or other materials which present the information of interest within the hierarchy of presentation elements.

The rules discussed above with respect to FIG. 1 can be used in conjunction with the classes shown in FIGS. 10A-10E to accomplish event identification, dataset formation, and generation of presentation elements, although other classes, objects, or data structures can be used to accomplish those tasks.

Exemplary operation of the intelligent broadcast system 100 is discussed with respect to the activity diagrams of FIGS. 11 and 12. As shown in FIG. 11, rules are obtained in an obtain data monitoring rule step 500 and are subsequently applied to both current and/or historical data in an apply data monitoring rules to current data step 510 and an apply data monitoring rules to historical data step 520, respectively, depending on the rule being applied. As discussed above, it is not required for both current and historical data to be referenced and/or analyzed in identifying events and/or generating presentations. Events are subsequently identified in an identify event step 530 and presentation elements can be generated in a generate presentation elements step 540.

Referring to FIG. 12, the process of presentation and navigation can be understood as beginning with a receive event selection step 550 followed by a retrieve presentation elements step 560. Based on the retrieved presentation elements, a display and navigate presentation step 570 is executed followed by an additional elements test 590 to determine if there are more items to be displayed as part of the presentation. If the end of the presentation has not been reached, an apply next navigation rule step 595 is executed and the system returns to the display and navigate presentation step 570.

Within the context of FIG. 12, the receive event selection step 550 includes receiving navigation commands including commands to advance to items further down in the hierarchy (as represented by increase level use case 112), higher up in the hierarchy (as represented by decrease level use case 114), or to return to the top level in the hierarchy (as represented by return to top level use case 116). Rules causing an automatic return to a previous level or top level will cause an automatic return not illustrated in FIG. 12.

In use, the intelligent broadcast system 100 can be operated by presenter 102, with the help of an assistant, or by the editor/producer 150 through a number of human-machine interfaces common to broadcast systems. These interfaces include, but are not limited to, remote controls including wired, wireless or optical remotes (including hand-held controls and foot pedals), on-display selection including hand tracking systems, touch sensitive displays or screens, or other mechanisms suitable for sensing the presenter's selection of an event or location.

A keyboard/mouse can be utilized by the presenter 102, an assistant, or the editor/producer 150 to select events or marked locations at the direction of presenter 102. These events may be selected from the same display/monitor 104 being utilized by presenter 102 and visible to the audience, or from a second display visible only to the assistant or editor/producer 150.

In an alternative embodiment, computer based speech recognition is used to recognize commands including key words spoken by presenter 102 and select events and navigate through the hierarchy based on the recognized commands. In this embodiment, the presenter 102 may refer to an identified event and cause its selection through the use of a voice command such as "let's take a look at this record in Florida"

which would be parsed by the system and cause the selection of a record temperature event in Florida.

In some instances is useful for presenter 102 to have feedback from intelligent broadcast system 100 regarding where they are in the hierarchy and the additional types of information that may be available. In one embodiment, the hierarchical information, as illustrated in FIGS. 9A and 9B, is presented to presenter 102 on a separate monitor, not visible to the audience.

In an alternate embodiment, presenter 102 receives feedback via audible tones communicated to them via an earpiece. In this embodiment, the position in the hierarchy can be communicated through a series of audible tones (e.g. one tone for being at the top of the hierarchy, two tones for being at the next level, three tones for being at the third level and so on, with one long tone for indicating the bottom of the hierarchy has been reached).

In one embodiment, the intelligent broadcast system 100 can be utilized to display information related to severe weather and, in particular, convective storms. Convective storms such as thunderstorms are typically monitored through the use of Doppler radar. Doppler radar images traditionally provide the basis for discussion of convective storms in a weather presentation and provide a simple visual means for recognizing the location of the storm. When incorporated into the intelligent broadcast system 100, convective storm monitoring and analysis can be performed by identifying convective storms found through Doppler radar images, performing appropriate analyses on both Doppler radar data and other traditional weather related data sources, and presenting that material as directed by the presenter. Thus, a convective storm analysis system may be utilized in conjunction with the intelligent broadcast system 100 to create convective storm related data which can serve as the basis for storm related presentation elements.

Referring to FIG. 13, a convective storm analysis system 1300 is shown which can be interfaced to intelligent broadcast system 100. Data related to convective storm analysis system 1300 is also stored in current data system 140. Convective storm analysis system 1300 receives input data, including Doppler radar data 1390, satellite data 1392, and terrestrial weather data 1394. Convective storm analysis system 1300 identifies convective weather from the Doppler radar 1390 utilizing identify convective weather use case 1340. Based on the identification of the convective weather, a description of the convective weather is generated in a develop complete storm description use case 1302. Satellite data 1392 can be analyzed using a determine storm top temperatures use case 1350. Terrestrial weather data 1394 is analyzed using a determine lightning flash rates/densities use case 1360, a determine vertical temperature profiles use case 1370, and a calculate 4-D thermodynamic fields use case 1380. Based on Doppler radar data 1390, satellite data 1392 and terrestrial weather data 1394, convective weather presentation elements can be created using a determine convective weather presentation elements use case 1310. Based on the convective weather presentation elements, a develop storm prediction use case 1320 produces a storm prediction, and the develop complete storm description use case 1302 provides analyses of the storm beyond what can be obtained from Doppler radar 1390. A publish and predict weather use case 1330 is used to generate predictions which are not directly related to the severe weather or convective storm.

Convective storm analysis system 1300 provides the ability to extend and refine radar based storm descriptions by extraction of additional and relevant information from secondary sources. Exemplary types of storm descriptors that can be derived using convective storm analysis system 1300 include: lightning flash rates and densities obtained through analysis of a lightning detection and location dataset; derivation of storm top temperatures from infrared satellite observations; storm-relative helicity along the past and future track of the storm using a 4-D windfield from a numerical weather prediction dataset; estimates of the intensity change potential from 4-D thermodynamic fields from a data assimilation system; and refined hail presence estimates using vertical temperature profiles from numerical weather prediction models.

In operation, convective storm analysis system 1300 utilizes data from Doppler radar 1390 to determine the presence of convective weather including position and movement. Based on the storm position and movement information as determined from the Doppler radar data, databases of auxiliary meteorological information can be automatically analyzed for relevant complimentary information. When utilized in conjunction with intelligent broadcast system 100, presentation elements can be formed containing the relevant storm information and made accessible to presenter 102.

One example of the application of rules used with the convective storm analysis system 1300 and the intelligent broadcast system 100 is the following:

IF Lightning(Within 50 miles of BOS, Moving toward BOS)
   OR
   IF Radar(>35 dBZ radar reflectivity within 50 miles of BOS, Moving toward BOS),
     THEN
         FORM_PRESENTATION_ELEMENT(60 minute loop of regional radar and lightning centered between lightning/35 dBZ reflectivity and BOS)
     AND
         FORM_PRESENTATION_ELEMENT(30 minute loop of forecasted regional radar centered between lightning/35 dBZ reflectivity and BOS)
     AND
         IF (Convective Storm identified for location of lightning/35 dBZ reflectivity)
     THEN
         FORM_PRESENTATION_ELEMENT(Convective Storm track overlay for 30 minute loop of forecasted regional radar)
         AND DISPLAY (When click on lightning/35 dBZ reflectivity)
     AND
         FORM_PRESENTATION_ELEMENT (Effected population table overlay for 30 minute loop of forecasted regional radar)
         AND DISPLAY (When click on Convective Storm track overlay)

In one embodiment, convective storm analysis system 1300 uses storm position and movement data from Doppler radar 1390 as the basis for analysis of the Rapid Update Cycle (RUC), a numerical model run by the National Weather Service approximately every hour and used as the basis for determining short-term forecasts and small-scale (mesoscale) weather features. In another embodiment, the Weather Research and Forecasts (WRF) model is analyzed based on the storm position and movement as determined from Doppler radar 1390. Both of these databases may be utilized to determine convective storm attributes including but not limited to: Convective Available Potential Energy (CAPE), Convective INhibition (CIN), lifted index, downdraft CAPE, Lifting Condensation Level (LCL) height, Level of Free Convection (LFC) height, sheer, storm-relative helicity, storm-relative winds, super cell probability, tornado probability, significant tornado probability, significant severe weather probability, energy-helicity index, vorticity generation potential, and storm rank along the past and projected future path of the storm Doppler radar data can also be further analyzed based on storm position and movement and tools such as the Open systems Radar Products Generator (ORPG), produced by the National Severe Storms Laboratory or other commonly known algorithms can be utilized to obtain additional storm information including storm mass, volume, storm top divergence, Vertically-Integrated Liquid (VIL) water, probability of hail, and probable hail characteristics.

When used in conjunction with intelligent broadcast system 100, the convective storm analysis system 1300 provides presenter 102 with hierarchical information about convective storms and allows presenter at 102 to retrieve convective storm related information that cannot be ascertained quantitatively from visual inspection of the Doppler radar data alone.

For example, presenter 102 may be describing series of thunderstorms located in the greater Boston area, those thunderstorms being identified on a map by markers of thunderclouds with lightning bolts. Upon selecting a desired marker or icon, a display of the current lightning rate, possibly including a graphic or chart illustrating the current lightning rate, can be displayed. If the presenter chooses to go into further into the hierarchy of presentation elements, additional information related to the thunderstorm can be presented including live video of the storm and associated lightning (when available), graphics illustrating lightning flash rates, hail probability estimates, storm severity measurements, detailed predicted path of the thunderstorm, impact of the thunderstorm on airport traffic, or other items relevant to the current thunderstorm and of potential interest to the viewer.

The methods and systems described herein with respect to the intelligent broadcast system 100 may be implemented on a number of computing platforms and may also be implemented by integrating a computing platform with one or more general purpose broadcast production systems.

In one embodiment, a computing platform based on a standard personal computer running an operating system such as Linux, Windows or UNIX is used to realize intelligent broadcast system 100 and interfaces with commercially available weather presentation tools such as Weather Producer and TrueView Interactive, both offered by the WSI Corporation of Andover, Mass.

In an alternate embodiment, intelligent broadcast system 100 is implemented on a computing platform along with the complete functionality for weather presentation production. In this embodiment the tools required for development of the weather presentation are also included within intelligent broadcast system 100.

In one embodiment, presentation elements are prepared in advance of the presentation and are created based on the selection of identified events. In this embodiment, the presentation elements are accessed when a marker corresponding to the desired, identified event is selected. At that time, the appropriate template is applied to create the final presentation materials and presentation elements associated with the event.

In an alternate embodiment, the presentation elements are not prepared until the point at which the marker corresponding to the desired event is selected. In this embodiment, only presentation elements corresponding to the identified events are prepared, and presentation element formation and the application of templates to produce the final presentation material do not occur until it is known that those materials will be required.

In another embodiment the presentation elements are prepared in advance, based on the existence of marked or identified events. In this embodiment once events are marked, data representations are formed and templates are applied to create final presentation elements and presentation materials. The final presentation elements are stored and made ready for access upon selection of the corresponding marked event.

Pre-fetch and branch prediction can also be applied to the present method and system to prepare data representations, apply templates to prepare presentation elements, or for both the creation of presentation elements and the preparation of presentation materials. Branch prediction is utilized by monitoring all possible paths in the hierarchy the presenter may explore based on the selection of a particular event, and by preparing the materials corresponding to those branches at the time the parent event is selected. Referring to FIG. 9A, if presenter 102 chooses current weather conditions of interest 302, branch prediction would be applied to prepare presentation elements related to storm tracking 304, hazardous conditions 306, weather related news 308, and extremes 310. Even though presenter 102 may not choose any of those items under current weather conditions of interest 302, the materials will have been automatically prepared and will allow instantaneous display upon selection.

In another embodiment, the presenter 102, user or viewer of the intelligent broadcast system 100 need not be presented with the identified events and/or select one or more of those events for display. That is, the intelligent broadcast system 100 may automatically (i.e., through a default condition, for example) display a presentation to the presenter 102 or user of the system (perhaps of the most relevant or highest priority event) upon identification of one or more events of interest that satisfy the rules. In such a case, the presenter 102 would not have the option of selecting the identified event for which presentation elements are displayed. In an alternative embodiment, the presenter 102 still has the ability to navigate through the sequence or hierarchy of the displayed presentation as well as select additional events within the presentation for further information or display. Those skilled in the art will recognize that a human presenter is not required in order to deliver effective storm presentations to end users since automated display sequences generated using this method are often sufficient to create display sequences adequate for delivering compelling and informative presentations.

Although the method and system described herein has been discussed in the context of weather and traffic presentations, intelligent broadcast system 100 can be utilized for the presentation of a wide variety of materials including economic and business analyses, political news, environmental monitoring, transportation and logistics, military operations, and other presentations that can be organized and presented in a hierarchical manner.

Referring to FIG. 14, in one embodiment, a weather severity and characterization system 700 collects data related to weather phenomena and other ground and atmospheric conditions at various locations including, among other systems, satellite imagery centers 704 that receive data from satellites 705, surface weather observation stations 706, lightning detection systems 708, or radar processing stations 714, 716. Such weather related data may be transferred over a variety of public and/or private wired and wireless networks 720, including the Internet, to the storm identification and characterization system 740, described in greater detail below. Subsets of these data collection apparatuses may provide particular data relevant to characterizing of one or more storms, weather phenomena, weather events or objects 702.

Previously gathered data may be present in weather databases 710, 712. Additional data may also be gathered from vehicles or mobile transmitters/receivers, including aircraft 792, ships 794 and ground transportation 796, along with information regarding their locations. Vehicles may transmit, receive, or transmit and receive to and from one of a system of transmitters and receivers 790. The system may also collect some types of data from mobile users 784 using handheld or portable devices 782 via a wireless network 780. Such data may include one or more of weather-related data, imagery, video, audio, or related position information. Data from each source may be produced in different formats. In one embodiment, one or more data sources would provide information over the network 720 to the storm identification and characterization system 740 in an extensible markup language format.

Data are collected from a variety of sources by the storm identification and characterization system 740. In one embodiment, the weather severity and characterization system 700 processes collected weather data and identifies particular storms 702 and their characteristics and parameters. In general, characteristics of a storm include descriptions of the physical or observable properties associated with a storm. For example, storm characteristics may include or reflect the degree and/or frequency of lightning, type of precipitation, amount or severity of precipitation, speed or direction of wind, direction and speed of storm movement, etc. The parameters of a storm generally form a numerical representation of storm related information. The storm identification and characterization system 740 applies forecasting and other prediction techniques, including predictive models to predict future values of parameters of the identified storms. These parameters, also referred to as storm related parameters, may include location, wind velocity, hail size, lightning flash rate, flood potential, or any other weather or storm related information, and are discussed in greater detail below. Results of the data analysis may be stored in a storm database 760. The storm database 760 may reside on a PC or server, or distributed servers. It could use commercial or open source database platforms such as Oracle, Microsoft SQL Server, MySQL, or PostgreSQL. The storm identification and characterization system 740 may provide external communication through database connections, custom interfaces, or a web application server, or any other communications medium or system generally known in the art.

Portions or all of the weather data and/or storm related parameters may also be transferred to an Internet storm data server 764. The Internet storm data server 764 may be a simple PC, a web server, a combination of separate web server, application server, and database server, or other arrangement of server resources. Either a storm data distribution system 762 or the Internet storm data server 764 could provide storm data and/or storm related parameters over the network 720 to other network systems or to PCs 766 with attached monitors 769 displaying Internet browsers operated by users 768. In another embodiment, the Internet storm data server 764 is accessed by mobile users 784 of portable devices 782 via a wireless communication network 780.

The Internet storm data server 764 could serve a web page containing both HTML and JavaScript code. The JavaScript code could periodically, or upon user interaction, obtain additional or more up-to-date weather data from the Internet storm data server 764 without reloading the web page. In one embodiment, the data is in extensible markup language form.

In one embodiment, the storm data distribution server 762 provides storm database updates to subscriber databases at broadcast studios 770 or other locations. The database transfers could be full or incremental and in one embodiment, could be accomplished using the transfer of extensible markup language (XML) data.

In another embodiment, the weather data and storm related parameters are used at the broadcast studio 770 in the production of weather-related programming. A presenter 102 may use software and hardware tools to navigate through graphical and/or textual display of the storm related parameters, weather and storm data and other weather related information supplied by the storm data distribution system 762 to the remote database 771 of the broadcast studio 770. Alternatively, the broadcast studio 770 may obtain information directly from the storm data distribution system 762 itself.

Data may also be provided by either the storm data distribution system 762 or the Internet storm data server 764 to a third-party server 774. In one embodiment, the operator of the storm identification and characterization system 740 could provide data to third-parties, who would then provide value-added analysis or repackaging of the data.

In one embodiment, data from the storm data distribution system 762 is used by third-parties to provide value-added services. For example, a search engine operator may provide recent weather data results in response to weather-related keywords. For instance, an Internet search for "thunderstorms Raleigh" could produce a near current map of active thunderstorms in the area of Raleigh. Alternately, an Internet search for "thunderstorm Raleigh" may launch an automatic presentation similar or identical to a recent on-air presentation related to weather in that area. The graphical results could be provided with regions responsive to further user input, allowing the user to trigger display of additional information about a selected storm. Similarly, a search for "weather tomorrow" could trigger access to a forecast portion of the Internet storm data server data 764 to provide forecasted weather parameters for the user's location. In each case, the search could be conducted on data transmitted to the search engine provider's database, or via calls to the Internet storm data server 764 or similar resource provided on the network 720.

In another embodiment, functionality similar to that provided to the broadcast studio 770 may also be provided to Internet or network users 768. Instead of an interface adapted for on-air presentation of weather data and forecasts, the information could be presented via a web-based interface through an Internet browser or customer application on the users' PCs 766 to allow interactive exploration of past and forecasted weather and storm data and storm related parameters. Alternatively, the Internet user 768 may be presented with an automated sequence of displays providing the same content as the on-air presentation. A user could enter the URL of an Internet storm data server 764. The server could attempt to distinguish the user's location from IP address information, from a previously stored browser cookie, or from user input. The user could also enter a different location for which he wishes to see weather data. The weather severity and characterization system 700 could then generate a sequence of displays, graphs, images or other presentation material that reflects, for example, the most severe storms in the vicinity of the user's request.

FIG. 16 shows a flow diagram for identifying and characterizing storms, weather events or objects in accordance with the weather severity and characterization system 700. Referring to FIGS. 14 and 16, weather related data is received 800 by the storm identification and characterization system 740. Weather related data is obtained from a variety of primary and secondary sources. Primary sources include one or more radar sites 714, 716. Secondary sources include satellites 705, surface weather observation stations 706, lightning detection systems 708, and any other weather data observation, measurement or collection system, method or mechanism generally known in the art. Additionally, weather data may be obtained from other secondary sources, such as one or more third party or independent weather databases 710, 712. Examples of such weather databases include the output from a Numerical Weather Prediction system (NWP), a lightning detection and location database, or consolidated, value-added weather databases such as the MADIS dataset produced by the National Weather Service, but could be any alternate source of weather related data that provides information that is used to characterize a storm. Weather related data can also be obtained from a variety of mobile devices equipped with transceivers that can send weather related data and be received by the storm identification and characterization system 740. Such mobile devices may include portable devices 782, airplanes 792, boats 794, and automobiles 796. The weather related data that is received by the storm identification and characterization system 740 may be relevant to a selected geographic location, region or other area of interest.

In one embodiment of the present invention, weather related data is received by the storm identification and characterization system 740. For a region of interest, the weather related data is analyzed to determine the presence of weather phenomena, storms, or any other identifiable weather-related objects. For simplicity, storm is used herein to denote any type of weather phenomenon, weather event, storm, or other identifiable weather related object, such as cold fronts or warm fronts. Weather phenomena include any type of storm, including convective storms, such as thunderstorms and thunderstorm systems, tornado, hurricanes, winter storms, fronts, and any other type of storm, storm system weather event, or weather system recognized by one skilled in that art. Any procedure for determining and/or identifying the presence of storms may be used. Each storm in a region of interest is identified and independently characterized with set of storm related parameters for that point in time. At a particular point in time, the storm exists in a particular state. The state of the storm encompasses the totality of information to completely describe the characteristics of the storm at a single point in time. The single point in time may be in the past, present, or future. Thus, a single storm has many associated states, including past states, present or current states, and future or predicted states. It is also possible that some of the information describing one of the states of a storm is unknown. At some time in the future, new weather related information or data may be received by the storm identification and characterization system 740. The presence of storms related to that data is again determined such that previous instances of storms are identified and associated with any previously determined storm related parameters. Additionally, new storms are identified for characterization.

Based on the received weather related data, a storm is identified 802 by the storm identification and characterization system 740. The storm identification and characterization system determines if the identified storm is an instance of a previous storm or a new storm instance 804. If a particular storm has been previously identified, the previous characterization data for that storm is retrieved 807, and may be used with the presently received weather data by the storm identification and characterization system 740 to characterize the storm with a set of storm related parameters 808. In doing so, the previously identified or calculated parameters associated with that storm may be taken into account in generating or predicting the future parameters or characteristics of the storm. If a storm is a new instance or identification 806, then a first set of storm related parameters for the storm is obtained using the received weather data and future predicted storm related parameters are determined 808. Once determined, the sets of storm related parameters may be stored 811 and/or used to display storm information and parameters in a weather related presentation 812.

In one embodiment of the present invention, a storm is characterized by a set of storm related parameters, with each storm having individualized values for the available or potential storm related parameters. In one embodiment, the set of storm related parameters used to describe a storm is time dependent. That is, the parameters may have actual values in the present and past based on observation, measurement, calculation, or derivation, and may also have predicted future values that are forecasted based on recently measured or computed parameter values or other obtained data. The predicted or forecasted future parameter values may be obtained through one or more various forecasting methods, such as the application of mathematical models and algorithms. Such models may be developed, for example, from analysis of historical storm data and parameters.

The storm related parameters of the identified storms are obtained in a number of ways. They can be observed, measured, calculated, or derived. Some of the storm related parameters are obtained from the physical weather related data that is directly observed or measured, such as meteorological data obtained from radar or satellite imagery, surface observations, lightning detection systems, or any other system or mechanism generally known in the art. Some of the storm related parameters are calculated using a suite of algorithms that ascertain basic characteristics of each storm. One group of calculated storm related parameters are calculated using data available from the radar. Some examples include location, size (volume, mass), echo top, motion, and the likely existence of an associated tornado. Such computations are a common aspect of weather analysis and forecasting systems used today and are well known to those of ordinary skill in the art. Additional types of calculated storm related parameters are obtained using information from the radar-based calculated storm related parameters and information from secondary data sources. Examples of these secondary data sources include 4D gridded analyses and forecasts of basic meteorological variables from NWP systems, and geopolitical databases. Examples of the parameters calculated using these data sources include the likelihood of the storm to contain hail, the lightning flash rate, the convective potential energy, and the total population affected by each storm. The storm identification and characterization system 740 is thus able to automatically determine storm related parameters for a storm relative to past, present and future time periods based on presently received weather related data and suite of algorithms. For example, a non-exhaustive list of storm related parameters that could be determined for an identified storm for a point in time (including future times) is shown in Table 1 below.

TABLE 1

| Storm Related Parameter | Typical Units | Range | Exemplary Range | Typical categories | Description |
|---|---|---|---|---|---|
| Storm Severity Index | dimensionless | N/A | 0-10 | weak 0-3, mod 3-6, strong 6-10 | Index describing the severity of a storm, based on the potential for tornadoes, hail, winds, lightning, and flash flooding |
| Tornado Impact | dimensionless | N/A | 0-10 | weak 0-3, mod 3-6, strong 6-10 | The tornadic potential of the storm based on some of the other storm related parameters |
| Hail Impact | dimensionless | N/A | 0-10 | weak 0-3, mod 3-6, strong 6-10 | The hail potential of the storm based on some of the other storm related parameters |
| Wind Impact | dimensionless | N/A | 0-10 | weak 0-3, mod 3-6, strong 6-10 | The damaging wind potential of the storm based on some of the other storm related parameters |
| Lightning Impact | dimensionless | N/A | 0-10 | weak 0-3, mod 3-6, strong 6-10 | The potential for deadly/damaging lighting in the storm based on some of the other storm related parameters |
| Flooding Impact | dimensionless | N/A | 0-10 | weak 0-3, mod 3-6, strong 6-10 | The flash flooding potential of the storm based on some of the other storm related parameters |
| Sfc-based CAPE | J/kg | 0 to infinity | 500-5000 | weak 0-1000, mod 1000-2500, strong 2500-5000 | A measure of general atmospheric instability |
| Mixed-layer CAPE | J/kg | 0 to infinity | 500-5000 | weak 0-1000, mod 1000-2500, strong 2500-5000 | Measure of general atmospheric instability |
| Most unstable CAPE | J/kg | 0 to infinity | 500-5000 | weak 0-1000, mod 1000-2500, strong 2500-5000 | Measure of general atmospheric instability |
| Sfc-based CIN | J/kg | 0 to infinity | 0-500 | weak 0-50, moderate 50-250, strong 250-500 | Measure of atmospheric capping, or resistance to thunderstorm initiation; larger values mean thunderstorm development is less likely |
| Mixed-layer CIN | J/kg | 0 to infinity | 0-500 | weak 0-50, moderate 50-250, strong 250-500 | Measure of atmospheric capping, or resistance to thunderstorm initiation; larger values mean thunderstorm development is less likely |
| Most unstable CIN | J/kg | 0 to infinity | 0-500 | weak 0-50, moderate 50-250, strong 250-500 | Measure of atmospheric capping, or resistance to thunderstorm initiation; larger values mean thunderstorm development is less likely |
| Sfc-based Lifted Index | degrees C. | negative infinity to infinity | −15 to 0 | weak 0 to −3, moderate −3 to −6, strong −6 to −15 | Measure of middle atmospheric instability; more negative values usually mean more intense thunderstorms |
| Mixed-layer Lifted Index | degrees C. | negative infinity to infinity | −15 to 0 | weak 0 to −3, moderate −3 to −6, strong −6 to −15 | Measure of middle atmospheric instability; more negative values usually mean more intense thunderstorms |
| Most unstable Lifted Index | degrees C. | negative infinity to infinity | −15 to 0 | weak 0 to −3, moderate −3 to −6, strong −6 to −15 | Measure of middle atmospheric instability; more negative values usually mean more intense thunderstorms |
| Downdraft CAPE | J/kg | 0 to infinity | 0-1000 | weak 0 to 100, moderate 100-500, strong 500-1000 | Measure of potential energy of thunderstorm downdrafts; can give some indication of how strong thunderstorm winds will be |
| Sfc-based LCL | mb | 0 to infinity | 700-1000 | low 900 to 1000, mod 800-900, high 700-800 | Surface Based Lifting Condensation Level; the level at which a surface-based air parcel will condense when lifted |
| Mixed-layer LCL | mb | 0 to infinity | 700-1000 | low 900 to 1000, mod 800-900, high 700-800 | Mixed-Layer Lifting Condensation Level; the level at which an air parcel representing the average conditions in the lowest 100 mb will condense when lifted |

TABLE 1-continued

| Storm Related Parameter | Typical Units | Range | Exemplary Range | Typical categories | Description |
|---|---|---|---|---|---|
| Most unstable LCL | mb | 0 to infinity | 700-1000 | low 900 to 1000, mod 800-900, high 700-800 | Most Unstable Lifting Condensation Level; the level at which an air parcel based at the most unstable point in the vertical column will condense when lifted |
| Sfc-based LFC | mb | 0 to infinity | 500-1000 | low 850 to 1000, moderate 700 to 850, high 500 to 700 | Surface Based Level of Free Convection; the level at which a condensed, surface-based air parcel will freely rise due to atmospheric instability |
| Mixed-layer LFC | mb | 0 to infinity | 500-1000 | low 850 to 1000, moderate 700 to 850, high 500 to 700 | Mixed-Layer Level of Free Convection; the level at which a condensed, mixed-layer air parcel will freely rise due to atmospheric instability |
| Most unstable LFC | mb | 0 to infinity | 500-1000 | low 850 to 1000, moderate 700 to 850, high 500 to 700 | Most Unstable Level of Free Convection; the level at which a condensed air parcel based at the most unstable point will freely rise due to atmospheric instability |
| BRN shear | meters$^2$/second$^2$ | 0 to infinity | 10-50 | weak 0 to 15, mod 15 to 30, strong 30 to 50 | Bulk Richardson Number shear |
| 0-1 km shear | meters/second | 0 to infinity | 5-25 | weak 0 to 5, mod 5 to 15, strong 15 to 25 | Vertical wind shear in the lowest 1 km of the atmosphere; higher values are associated with more organized thunderstorms and higher tornado potential |
| 0-6 km shear | meters/second | 0 to infinity | 5-50 | weak 0 to 10, mod 10-30, strong 30-50 | Vertical wind shear in the lowest 6 km of the atmosphere; higher values are associated with more organized thunderstorms |
| 0-1 km stm relative helicity | meters$^2$/second$^2$ | 0 to infinity | 0-600 | weak 0-75, mod 75-250, strong 250-600 | Storm-relative helicity in the lowest 1 km of the atmosphere; higher values are associated with higher tornado potential |
| 0-3 km stm relative helicity | meters$^2$/second$^2$ | 0 to infinity | 0-600 | weak 0-75, mod 75-250, strong 250-600 | Storm-relative helicity in the lowest 3 km of the atmosphere; higher values are associated with higher tornado potential and longer-live thunderstorms |
| Height of Wet-Bulb Zero | meters | 0 to infinity | 1500-4000 | low 1500-2000, mod 2000-3000, high 3000-4000 | Freezing level of wet-bulb temperature, an indication of hail size/potential |
| CAPE in the −20 to −40 layer | J/kg | 0 to infinity | 0-1000 | weak 0-250, mod 250-500, strong 500-1000 | Atmospheric instability in the level of the atmosphere where the temperature is between −20 and −40 C.; related to hail size/f |
| Freezing Level Height | meters | 0 to infinity | 2000-5000 | low 2000-3000, mod 3000-4000, high 4000-5000 | Height of the freezing level; related to hail occurrence/size |
| Height of −20 C. | meters | 0 to infinity | 5000-10000 | low 5000-6000, mod 6000-7500, high 7500-10000 | Height of the −20 level; related to hail occurrence/size |
| Supercell Index | dimensionless | 0 to infinity | 0-25 | weak 0-5, mod 5-10, strong 10-25 | Composite index describing the favorability for supercell development |
| Significant Tornado Index | dimensionless | 0 to infinity | 0-10 | weak 0-1, mod 1-3, strong 3-10 | Composite index describing the favorability for occurrence of significant tornadoes |
| Significant Severe Wx Index | dimensionless | 0 to infinity | 0-100 | weak 0-10, mod 10-30, strong 30-100 | Composite index describing the favorability for occurrence of significant severe weather (large hail, damaging winds, tornadoes) |
| Significant Hail Index | dimensionless | 0 to infinity | 0-5 | weak 0-1, mod 1-2, strong 2-5 | Composite index describing the favorability for occurrence of large hail |

TABLE 1-continued

| Storm Related Parameter | Typical Units | Range | Exemplary Range | Typical categories | Description |
| --- | --- | --- | --- | --- | --- |
| Energy-Helicity Index | dimensionless | 0 to infinity | 0-6 | weak 0-1, mod 1-2.5, strong 2.5-6 | Index describing the favorability or supercells/tornadoes; based on a combination of atmospheric instability and wind shear |
| Showalter Index | degrees C. | negative infinity to infinity | −12 to 3 | weak 3 to 0, moderate −0 to −6, strong −6 to −12 | Measure of middle atmospheric instability; more negative values usually mean more intense thunderstorms; more useful than Lifted Index if storms are elevated |
| K Index | degrees C. | negative infinity to infinity | 10 to 50 | weak 10-20, moderate 20-35, strong 35-50 | Index used to predict air-mass thunderstorm development |
| VIL | kg/meters$^2$ | 0 to infinity | 10-100 | weak 0-10, mod 10-30, strong 30-100 | Vertically Integrated Liquid in a storm, associated with general storm severity and hail size |
| VIL Density | grams/meters$^3$ | 0 to infinity | 0-10 | weak 0-2, mod 2-5, strong 5-10 | Vertically Integrated Liquid in a storm divided by storm height, associated with general storm severity and hail size |
| Height of Center of Mass | meters | 0 to infinity | 2000-10000 | low 2000-4000, mod 4000-6000, high 6000-10000 | Height of center of storm mass, typically associated with storm intensity and hail production/size |
| Height of Max dbZ | meters | 0 to infinity | 2000-10000 | low 2000-4000, mod 4000-6000, high 6000-10000 | Height of largest reflectivity value, typically associated with storm intensity and hail production/size |
| Height of 50 dbZ | meters | 0 to infinity | 2000-10000 | low 2000-4000, mod 4000-6000, high 6000-10000 | Height of 50 dBZ value, typically associated with storm intensity and hail production/size |
| Height of 50 dbZ above 0 isotherm | meters | negative infinity to infinity | 0-7000 | low 0-1000, mod 1000-3000, high 3000-7000 | Height of 50 dBZ value above the freezing level, typically associated with storm intensity and hail production/size |
| Height of 50 dbZ above −20 isotherm | meters | negative infinity to infinity | −2000 to 5000 | low −2000 to −1000, mod −1000 to 1000, high 1000-5000 | Height of 50 dBZ value above the −20 C. level, typically associated with storm intensity and hail production/size |
| Reflectivity at 0 isotherm | dBZ | negative infinity to infinity | 20-70 | weak 20-40, mod 40-50, strong 50-70 | Reflectivity at the freezing level, typically associated with storm intensity and hail production/size |
| Reflectivity at −20 isotherm | dBZ | negative infinity to infinity | 20-70 | weak 20-30, mod 30-40, strong 40-70 | Reflectivity at the −20 C. level, typically associated with storm intensity and hail production/size |
| Max dbZ | dBZ | negative infinity to infinity | 40-70 | weak 20-40, mod 40-50, strong 50-70 | Highest reflectivity in storm, general indication of storm intensity |
| Max Hail Size | inches | 0-unlimited | 0-4 | small 0-0.5, medium 0.5-1.5, large 1.5-4 | Maximum expected hail size |
| Prob of Severe Hail | percentage | 0-100 | 0-100 | weak 0-20, mod 20-60, strong 60-100 | Probability of severe hail (>0.75") |
| Prob of Hail | percentage | 0-100 | 0-100 | weak 0-20, mod 20-60, strong 60-100 | Probability of hail |
| Precip Rate | mm/hr | 0 to infinity | 0-100 | light 0-10, mod 10-30, heavy 30-60 | Max precipitation rate in a storm |
| Storm Top | km | 0 to infinity | 5-20 | low 5-10, mod 10-15, high 15-20 | Highest instance of an 18 dBZ echo |
| Deviant Storm Motion | degrees | −180 to 180 | −45 to 90 | weak −45 to 0, mod 0-20, strong 20-90 | Rightward deviation of storm in degrees relative to mean storm motion; indicative of storm rotation and intensity |

TABLE 1-continued

| Storm Related Parameter | Typical Units | Range | Exemplary Range | Typical categories | Description |
|---|---|---|---|---|---|
| Deviant Storm Speed | percentage | 0 to infinity | 25 to 200 | 200, weak 120-200, mod 90-120, strong 25 to 90 | Ratio of storm speed to mean storm speed; a storm that slows down is usually intensifying |
| Storm Age | minutes | 0 to infinity | 0 to 240 | young 0-20, mature 20-100, old 100-240 | Age of storm |
| Storm Mass | kg * $10^8$ | 0 to infinity | 0-15000 | small 0-3000, mod 3000-9000, large 9000-15000 | Storm water mass, effectively VIL multiplied by storm footprint |
| Storm Volume | $km^3$ | 0 to infinity | 0-1500 | small 0-250, mod 250-750, large 750-1500 | Storm volume (size) |
| Storm Footprint | $km^2$ | 0 to infinity | 0-500 | small 0-100, mod 100-200, large 200-500 | Projection of the storm on the Earth's surface |
| Maximum Radial Velocity | m/s | 0 to infinity | 0-75 | weak 0-15, mod 15-30, strong 30-75 | Maximum detected wind speed in storm |
| Cyclonic Shear Mass | /100 s | 0 to infinity | 0-20 | weak 0-5, mod 5-10, strong 10-20 | Cyclonic shear integrated over the entire storm |
| Cyclonic Shear Mass Density | /100 s * 1000 $km^3$ | 0 to infinity | 0-10 | weak 0-3, mod 3-6, strong 6-10 | Integrated cyclonic shear divided by storm volume |
| Anticyclonic Shear Mass | /100 s | 0 to infinity | 0-10 | weak 0-3, mod 3-6, strong 6-10 | Anticyclonic shear integrated over the entire storm |
| Anticyclonic Shear Mass Density | /100 s * 1000 $km^3$ | 0 to infinity | 0-5 | weak 0-1, mod 1-3, strong 3-5 | Integrated anticyclonic shear divided by storm volume |
| Total Shear Mass | /100 s | 0 to infinity | 0-30 | weak 0-10, mod 10-20, strong 20-30 | Total (Anticyclonic + Cyclonic) shear integrated over the entire storm |
| Total Shear Mass Density | /100 s * 1000 $km^3$ | 0 to infinity | 0-10 | weak 0-3, mod 3-6, strong 6-10 | Integrated total shear divided by storm volume |
| Meso Base | km | 0 to infinity | 0-10 | strong 0-2, moderate 2-4, weak 4-10 | Height of mesocyclone base - lower bases are more dangerous |
| Meso Depth | km | 0 to infinity | 0-10 | shallow 0-2, moderate 2-4, deep 4-10 | Depth of mesocyclone |
| Meso Low-Level Rotational Velocity | m/s | 0 to infinity | 0-50 | weak 0-10, moderate 10-25, strong 25-50 | Rotational velocity at lowest tilt of mesocyclone |
| Meso Max Rotational Velocity | m/s | 0 to infinity | 0-50 | weak 0-10, moderate 10-25, strong 25-50 | Max rotational velocity of mesocyclone |
| Meso Max Shear | /s | 0 to infinity | 0-0.1 | weak 0-0.02, moderate 0.02-0.05, strong 0.05-0.1 | Max shear of mesocyclone |
| Meso Max gate-to-gate shear | /s | 0 to infinity | 0-0.1 | weak 0-0.02, moderate 0.02-0.05, strong 0.05-0.1 | Max gate-to-gate shear of mesocyclone |
| Meso Low-Level Diameter | km | 0 to infinity | 0-20 | small 0-5, moderate 5-15, large 15-20 | Low-level diameter (perpendicular to radar beam) of mesocyclone |
| TVS Base | km | 0 to infinity | 0-10 | strong 0-2, moderate 2-4, weak 4-10 | Height of TVS base - lower bases are more dangerous |
| TVS Depth | km | 0 to infinity | 0-10 | shallow 0-2, moderate 2-4, deep 4-10 | Depth of TVS base |

TABLE 1-continued

| Storm Related Parameter | Typical Units | Range | Exemplary Range | Typical categories | Description |
|---|---|---|---|---|---|
| TVS Low-Level gate-to-gate shear | /s | 0 to infinity | 0-0.1 | weak 0-0.01, moderate 0.01-0.03, strong 0.03-0.1 | Gate-to-gate shear at lowest tilt of TVS detection |
| TVS Max gate-to-gate shear | /s | 0 to infinity | 0-0.1 | weak 0-0.01, moderate 0.01-0.03, strong 0.03-0.1 | Max gate-to-gate shear of TVS |
| CG Lightning Density | /min * 100 km$^2$ | 0 to infinity | 0-10 | weak 0-2, moderate 2-4, strong 4-10 | Total lightning strikes per storm per minute per 100 km$^2$ |
| Total CG Lightning Strikes | /min | 0 to infinity | 0-10 | weak 0-2, moderate 2-4, strong 4-10 | Total lightning strikes per storm per minute |
| Positive CG Lightning Ratio | percentage | 0-100 | 0-100 | weak 0-20, moderate 20-40, strong 40-100 | Ratio of positive to negative lightning strikes in the last minute |
| Total CG Positive Current | kA/min | 0 to infinity | 0-10 | weak 0-2, moderate 2-4, strong 4-10 | Sum of current from all positive lightning strikes per minute in the storm |
| Positive CG Current Density | kA/min * 100 km$^2$ | 0 to infinity | 0-200 | weak 0-40, moderate 40-80, strong 80- | Sum of current from all positive lightning strikes per minute in the storm per 100 km$^2$ |
| Total CG Negative Current | kA/min | 0 to infinity | 0-10 | weak 0-2, moderate 2-4, strong 4-10 | Sum of current from all negative lightning strikes per minute in the storm |
| Negative CG Current Density | kA/min * 100 km$^2$ | 0 to infinity | 0-200 | weak 0-40, moderate 40-80, strong 200 | Sum of current from all negative lightning strikes per minute in the storm per 100 km$^2$ |

As shown in the first six rows of Table 1, some of the storm related parameters calculated by the storm identification and characterization system 740 are an impact number, or severity index, that has been derived from the other storm related parameters and which are relevant to a particular types of storm features or characteristics. The terms impact number and severity index may be used interchangeably to describe embodiments of the present invention. Each impact number is a simple-to-understand metric that represents the relative or normalized level of a feature, characteristic or threat imposed by that storm or weather phenomenon. These severity indices include a flood threat impact index, a lightning threat impact index, a hail threat impact index, a tornado threat impact index, and wind threat impact index, and are derived using information from a combination of the of the observed, measured, and calculated and parameters described above. Those skilled in the art will recognize that other or additional types of indices may be utilized to represent other types of characteristics or features of weather phenomena, depending on the desired characteristics to be viewed. An additional index is a composite severity index which is an aggregate or composite of one or more of the individual indices for a weather phenomenon. Examples of metrics that can be used to represent the impact numbers or severity indices are a range of numbers (e.g., 1-10, or 0-5), a set of well-known or human language oriented descriptive phrases (e.g., pea, golf ball, baseball, for example, to convey a relative size of hail), color coded bars, varying length bars, a set of symbols, or even some combination of the preceding examples. A useful feature of these severity indices is that they are a normalized scale that allows for a quick comparison of the potential impact to population and property for separate weather phenomena. Each of the severity indices is an aggregated representation of the observed, measured, and derived information about a storm contained in at least two of the storm related parameters, which one skilled in the art will recognize as an improvement to other well known meteorological indices conveying the damage potential of weather phenomenon, such as the Saffir-Simpson scale for categorizing hurricanes and the Fujita and Enhanced Futija Scales for categorizing tornadoes. As another example, one or more of the storm related parameters or severity indices may be used in conjunction with a display of traffic data or traffic information, including display on a roadmap and/or with other geographic features.

FIG. 17 shows an example of the movement of two storms 822, 824 in a region of interest 820. The position of these storms is changing in time as represented by the series of circles and arrows for storm 822 and storm 824. The increments of time are arbitrary (typically minutes to days) and are determined, for example, based on characteristics of the storms and the observation data from which storm detections are made. In one embodiment, as shown in FIG. 17, the exemplary time increments between the storm positions are in minutes, such that the present time is represented by t=0 826, with t=−10 828 indicating a time ten minutes in the past, and t=10 827 indicating a time ten minutes in the future. At any point in time, there exists a set of storm related parameters, described above, that are used to characterize a storm. For the present time, the storm related parameters are actual storm related parameters obtained through a number of means including observation, measurement, calculation, or derivation as described above. Similarly, such storm related parameters may be determined for times in the past, where actual storm related parameters exist for a storm at intervals extending back to the time the instance of that storm was first detected. For times in the future where t>0, sets of storm related parameters also exist, with a distinction being that they are predicted or forecasted based on a variety of factors, including the actual storm related parameters for that storm in the present and in the past.

For example, when a storm is first detected, a first set of storm related parameters for t=0 is obtained as previously described. Associated sets of storm related parameters for t=5, t=10, etc., are predicted based upon the initial storm related parameters. If new weather-related data is obtained at a time that is five minutes later for the same storm by the storm identification and characterization system 740, a second set of actual storm related parameters is obtained describing the present characteristics of the storm. This second set of storm related parameters is now associated with the present time (t=0), and the initial set of actual storm related parameters is now labeled t=−5. It is the same set of storm related parameters that was initially obtained for the first detection of the storm, but this set of parameters is now associated with a time in the past. The predicted future storm related parameters associated with t=5 at the initial storm prediction, are stored in an archive and then replaced with actual storm related parameters determined by the storm identification and characterization system for the present time. New sets of predicted storm related parameters are determined for time intervals into the future. This process can continue for as long as the storm is detected or identified. If, after a second interval of 5 minutes, a third set of storm related parameters is obtained for the new t=0, then the initial set of storm related parameters is associated with t=−10 and the second set of storm related parameters is associated with t=−5, the current set of storm related parameters with t=0, and new storm related parameters are predicted for the future. In this way, the set of storm related parameters with the association of t=0 describes the present characteristics of the storm. For each successive iteration of this process of determining the storm related parameters, the past parameters are retained, and predicted parameters are updated based on appropriate forecasting or predictive methods that may now account for the most currently available weather related data for that storm.

In one embodiment of the invention, the sets of storm related parameters for the present, and past and future are used to display weather information, and specifically weather information related to a particular storm. For example, one or more storms in a region of interest can be located in the present, tracked in the past, and projected into the future as well as presented with any combination of past, current and predicted storm related parameters associated with that storm that would provide valuable information to a viewer. Presentation of storm related parameters is described in greater detail below.

In one embodiment of the present invention, the storm related parameters are stored in a multidimensional storm database 760. FIG. 18 shows a three dimensional data table 830 representing of a portion of the storm database 760. Storm instances are on a first axis 832. Storm related parameters for each storm instance are on a second axis 834. Time relative to the present time of the storm is on a third axis 836. Thus, for any storm instance, the sets of storm related parameters for past 838, present 837 and future 839 are contained in the table. In this exemplary table, one hundred storm related parameters are shown for a first storm instance at five time intervals. As new storm instances are detected they are added to the table 830. It is therefore possible that all the fields in the table for any given time are not populated. For example, the newest storm instances will have no storm related parameters for the past time values since such parameters may be determined based on actual observation, measurement, calculation or derivation only once the storm has been detected. The data table 830 could be considered to be a snapshot of all the actual past, actual present, and predicted future storm related parameters as they exist for all the storm instances in the table at a single point in time.

The storm database 760 is created as shown in FIG. 19 from a plurality of the data tables 830, such that the storm database is 5-dimensional. Each data table 830 contains three dimensions showing storm instance, storm related parameters, and storm relative time as described above. A fourth dimension of absolute time is added along the horizontal axis 844. Those skilled in the art will recognize that the absolute time axis 844 is not the same as the storm relative time axis 836 in the data table 830 of FIG. 18. That is, in a data table 830, time is relative to the present time of the storms in only that particular table. Thus, each table 830 will have a different present time (t=0) relative to the absolute time measured on the axis 844 in FIG. 19. This dimension allows previous versions of tables 830 to be stored in order to preserve the previously predicted future storm related parameters and to compare those predicted values with actual values or predicted values previously or subsequently calculated. The differences in the predicted and actual values of the parameters might be used, for example, to refine the predictive models used to make predictions about the storm or could be used for other data analysis purposes generally known in the art. The slice of data 840 represents all the storm related parameters, past, present and future, for a single storm instance at a particular absolute time. The data slice 860 (at an absolute time in the future) represents all the storm related parameters for the same storm instance utilizing revised predicted storm parameters.

A fifth dimension of the storm database represents specific elements of the storm detection dataset and may represent specific radars, individual satellites and/or other suitable source data instances suitable for detecting storms. In one embodiment, the fifth dimension of the storm database 760 is shown in FIG. 19 on the vertical axis 846 as storm observation platform instance. Each table 830 in the storm database 760 represents a snapshot at an absolute time of all the storm related parameters for storms identified within the effective vicinity of or as obtained from data from a single observation platform. In one embodiment of the invention, each table 830 is built from the past, present, and predicted future set of storm related parameters for the number of detected storms within the vicinity of a single radar site. Since the effective vicinity of adjacent radars can overlap, it is possible that a single storm can be detected by multiple radars as that storm moves from the effective vicinity of one radar site into the effective area(s) of an adjacent radar site. FIG. 20 shows a storm 850 inside the effective vicinity 856 of radar 852 and also within the effective vicinity 858 of radar 854. Independent recognition of the storm 850 by both radars 852, 854 may result in the creation of a first multidimensional table 832 and a second multidimensional table 835 where different storm instance numbers may be generated for the same storm in each table. For example, in table 832, storm 850 is storm instance 1, but in table 835 the same storm 850 is storm instance 5.

In an alternate embodiment of the invention, the dimensionality of the storm database 760 is reduced to four by removing the storm observation platform instance axis. All storms tracked by all observation platforms are be combined into a single table 830, with recognition and reconciliation of duplicate storm instances detected by more than one observation platform. As an example, where a single storm is identified by two separate radar sites 852, 854, such as shown in FIG. 20, the storm identification and characterization system 740 detects that storm instance 1 from radar 852 is the same storm 850 as storm instance 5 from radar 854. Accordingly only one set of storm related parameters for storm 850 is included in a combined observation platform table 830 in storm database 760.

In one embodiment of the invention, the storm related parameters are transmitted by the storm data distribution system 762 directly from the storm identification and characterization system 740 to a remote site for display or storage. All or some combination of the past, present, and future storm related parameters for a storm at a time of interest are bundled and transmitted. Update information about a storm is bundled and transmitted as new information is provided by the storm identification and characterization system 740. Updated information about a different storm is bundled and transmitted separately. In this way each bundle of information only contains past present and future storm related data about a single storm at one point in time. In an alternative embodiment of the present invention, the storm related parameters can be retrieved from the storm database 760, bundled, and transmitted. Referring to FIG. 19, the region 840 contains all the past, present, and predicted storm related parameters for a storm at a point in time. This data can be retrieved from the database, bundled, and transmitted to a remote site. Alternatively, the data for each storm in a table 830 can be independently retrieved and bundled. These bundles can be sequentially assembled into a composite bundle for transmission.

Referring to FIGS. 14 and 21-30, the weather related data and storm related parameters, including the various storm impact indices generated by the weather severity and characterization system 700 for any definable or identifiable storm, weather event or object are available for display to an operator, presenter 102, consumer or viewer. As previously described, the person or entity to which display of the weather severity and characterization parameters are made available may be a local or network broadcaster, reporter or meteorologist, weather supplier, program viewer (e.g., broadcast, cable or satellite television), Internet or other network user, computer system or network or any combination thereof.

In one embodiment, the display of the storm related parameters described above with reference to FIGS. 14-20 is organized in such a manner so as to allow a meteorologist, reporter, presenter 102, or automated display presentation system during a live video production to describe the characteristics of, for example, convective storms (e.g., thunderstorms) in a broad and temporal manner, such that the display of the weather severity parameters account for past, current and predicted (i.e., future) aspects of the storm or weather event. That is, since the displayed storm related parameters and weather data incorporate (in some instances with some degree of specificity) characteristics of the storm over time (including the future) as well as future positional information, the display of such storm related parameters (including the impact indices) permits the display of future, predicted or forecasted weather severity characteristics with respect to the current or predicted location for each particular identified storm or weather event and how those parameters (and thus the storm) will change over the course of the predicted positions at the future times (or vise versa).

Additionally, the presenter 102 or viewer has the ability to control or navigate the presentation of the weather severity parameters in an intelligent manner similar to that described above with reference to sequenced and/or hierarchal presentations of the intelligent broadcast system 100 (see, for example FIGS. 9A-9D). Stated differently, the display or presentation of storm related parameters in the weather severity and characterization system 700 may include the use and application of user-defined data monitoring and/or navigation/presentation rules to establish, for example, an automatic or prompted sequence of storm related parameters for a particular weather event or group of events, described in greater detail below.

Alternatively, the weather severity and characterization system 700 may employ pre-defined data monitoring and/or navigation/presentation rules, such that the presenter 102 or viewer has limited control over the type and manner of the sequencing available in presenting the severity parameters. That is, the weather severity and characterization system 700 may include an implicit display of storm related parameters based on the identified weather, storms or events. For example, upon identification of a particular class of weather data (e.g., a thunderstorm), the presentation aspect of the weather severity and characterization system 700 will display a set number of aspects about that thunderstorm in a set manner should the presenter or viewer select that thunderstorm.

In one embodiment of the weather severity and characterization system 700, weather data related to a geographic region of interest is obtained. Referring to FIG. 21, for example, the display 900 includes radar data 904 that is obtained for a particular radar site (not shown) relevant to a desired geographic region 902. Alternatively, other types of weather data generally known to those skilled in the art may be obtained.

The relevant weather data may be obtained from any weather data source or combination of sources, including as described above with reference to FIGS. 14-20. Alternatively, the weather data may be obtained from the storm related parameters and/or the storm database 760 described above.

In one embodiment, the presentation aspect of the weather severity and characterization system 700 displays one or more representations of weather events, objects or storms that have been identified from or associated with the weather data in the geographic region 902. Thus, for example, if the relevant weather data and/or storm related parameters have identified thunderstorms within the region 902, for example, through the storm identification and characterization system 740 and/or storm database 760 described above, the identified thunderstorms may be displayed to the presenter 102 or viewer on a display device 104 such as a computer of video monitor, such that the presenter or viewer is able to more clearly determine or visualize the presence and/or location of such thunderstorms than if the presenter had been looking only at the unaided weather data (e.g., radar data 904) in the geographic region 902 without additional conditioning or markings. Stated differently, the past, current and/or predicted storm related parameters or characteristics of a particular storm may be graphically displayed to the presenter 102 or viewer using some display scheme or mechanism.

Referring to FIG. 22, in one embodiment, the identified weather events or storms are identified or marked on the display 900 for the presenter using icons 906. In the example of FIG. 22, at least some of the thunderstorms visually identifiable to those skilled in the art based on the radar data in FIG. 21 have been specifically identified or marked with icons 906. The icons employed by the presentation aspect of the weather severity and characterization system 700 need not be specifically related to or associated with commonly used weather symbols. Rather, the icons may be any marking or symbol that would be recognizable by the presenter or viewer as identifying a storm or an aspect of that storm. The icons need not be any particular shape, color or size and the use of visible icons of other storm markers is not a necessary aspect for subsequent aspects of the presentation system described below.

In an alternative embodiment, different types of icons may be used to denote different features and/or storms. In the example of FIG. 22, a circle icon indicates the presence (and location) of a storm generally, a diamond icon indicates that hail is present in or around a storm (see FIG. 27), a square (see FIGS. 28, 31-33) indicates the presence of a mesocyclone (e.g., a rotating storm), and a triangle indicates that a tornado is likely in or around that storm (see FIG. 34). In short, the type of icon or a variation of an icon may be used to represent a particular historical, existing or predicted state and/or intensity of a storm. For example, referring to FIGS. 33 and 34, which shows a display 900 for a storm represented by icon 906 at two different times 990, the square icon 906 in FIG. 33 indicating the presence of a mesocyclone has been replaced by a triangular icon 906 in FIG. 34 indicating the presence of tornadic activity in or around the storm. In one embodiment, the weather severity and characterization system 700 automatically places the icons 906 on the display 900 according to the relevant location of the storm and automatically selects the icon type and variety according to the storm related parameters and impact indices of the storm. As shown in FIG. 22, icons 906 relevant to an identified storm may be layered on top of one another if multiple icons could be used to designate the same storm.

In one embodiment, the icons may be animated, blinking, change color and/or change shape to denote features or storm related parameters of one or more of the identified storms.

In another embodiment, the presentation aspect of the weather severity and characterization system 700 employs numbers and/or letters to mark the identified storms. Those skilled in the art will recognize that any similar marking mechanism may be used to denote identified storms within the region of interest.

In another embodiment, no icons or markings are placed on the display 900, such that the presenter 102 visually recognizes the identified storms through, for example, displayed radar data. In such an instance, the presenter 102 may rely on memory or skill to identify the storm of interest to obtain further information about the storm.

In one embodiment, the presenter is able to select one of the identified storms (i.e., a storm that the presenter has an interest in) to obtain further information (e.g., storm related parameters) about the storm. Such selection may be accomplished by clicking on or touching one of the icons, making a gesture at the display screen 900 or another sensor associated with the display screen or speaking audible predefined terminology or natural language voice commands. Other methods of initiating an on-screen selection generally known to those skilled in the art may be used without departing from the spirit and scope of the weather severity and characterization system 700. Identified storms may be selected from the display 900 or other presentation device 104 irrespective of the type of icon or identifying mark (or absence of such mark) being used.

Upon selection of an icon or identified storm, the presentation aspect of the weather severity and characterization system 700 displays storm related parameters related to the selected storm or event. The display of the storm related parameters(s) may be a one or a combination of a variety of different formats. The presentation aspect of the weather severity and characterization system 700 displays the storm related parameters for identified weather events or storms in any known tabular, graphical, text, video, audio format(s), any other format generally known to those skilled in the art, or any combination thereof. For example, referring to FIG. 23, the thunderstorm denoted by the icon 910 has been selected. A graphical text box 912 is displayed, and includes the storm related parameters, and in particular impact indices, of wind impact 920, tornado impact 922, lightning impact 924, flooding impact 926 and the composite severity index 930. In the graphical text box 912, the rating for each of these indices is shown in numerical format (e.g., the composite severity index 930 is 6 and labeled as "Storm Severity Index" as chosen by the system operator). The storm related parameters or indices displayed corresponding to the selected storm may include any combination of past, present and/or predicted future values of that parameter.

Alternatively or in addition, one or more of the storm related parameters and/or impact indices are shown on the display 900 in the form of a line graph (see FIG. 24) or bar graph (not shown). Referring to FIG. 24, the composite severity index 930 for the selected storm corresponding to icon 910 is shown in a line graph 914 on the display 900. Furthermore, the line graph 914 includes the predicted future value of the composite severity index 930. That is, in the example of FIG. 24, if the current time is 2:05 PM, the line graph 914 includes the past half hour of composite severity index 930, the current value (approximately 6) and the predicted values of the composite severity index 930 for the next one hour for the selected storm 910. Similarly, in FIG. 25, again assuming that the current time is 2:05 PM, the display 900 includes a line graph 916 showing past, current and predicted future values of the hail impact index 928 over time for the selected storm.

In one embodiment, the display of storm related parameters related to the selected storm includes a historical and/or predicted future path or track of the selected storm. Similar to the use of icons 906 to display the presence or location of an identified storm, the historical or predicted future paths may be shown on the display 900 using one or a combination of symbols, icons or other markings, and may include different shapes, sizes and variations thereof. For example, as shown in FIG. 26, the display 900 includes the graphical text box 912 corresponding to the selected storm, but also shows the predicted path 908 for each of the storms identified with icon(s) 906. FIG. 27 shows a display 900 of multiple icons 906 denoting identified storms and their historical paths 909. Similarly, FIG. 28 shows a display 900 that includes icons 906 corresponding to multiple identified storms, the historical paths 909 as well as their predicted future paths 908. The display 900 in FIG. 28 further includes a graphical text box 912 indicating impact indices for the selected storm.

In one embodiment, upon selection of a storm or icon 906, in addition to displaying storm related parameters or severity or impact information, the weather severity and characterization system 700 also provides an enlarged (i.e., localized zoom) view of the selected storm. For example, referring to FIG. 29, the display 900 includes weather data (e.g., zoomed-in radar), the composite severity parameter 930 in the form of a line graph 914 and the historical and predicted paths 909, 908 for the selected storm. FIG. 31 shows a display 900 with an alternate graphical representation for projected path 908, along with a line graph 914 for the composite severity index 930. Similarly, FIG. 32 shows a display with the alternate graphical representation for the projected path 908, and a graphical text box 912 with the six impact indices. The graphical text box 912 also includes the position 992 and velocity 994 data for the storm.

Referring generally to FIGS. 35 and 37, the parameters displayed to the viewer in the localized zoom view may be changed depending on the severity of the storm or the specific threat associated with the storm. For example, for a storm where the threat of damaging hail is forecast, the viewer may be interested in knowing the maximum hail size. The parameter can be displayed along with the impact indices as shown in FIG. 35. In FIG. 35, the display 900 for a relatively strong storm represented by icon 906 and projected path 908 includes a graphical text box 912 that includes the storm severity index 930, the tornado impact 922, the hail impact 928, and the maximum hail size 984. In FIG. 37, for a much weaker storm, only the storm severity index 930, the tornado impact 922, the hail impact 928 are listed.

In another embodiment, upon selection of a storm or icon 906, the icons 906 or markings are animated, such that the icon 906 moves along the historical and/or predicted future paths 909, 908 of the selected storm.

In another embodiment, the icon 906 for a particular storm not only changes location according to the storm parameters and/or severity indices, but also changes its characteristics according to the historical and/or predicted future storm related parameters and/or impact indices. For example, if a particular storm if predicted to change from a tornadic-type storm (e.g., a triangle icon) to a hail-type storm (e.g., a diamond icon), the display 900 could show a change in the icon type and/or other visual indicators (e.g., intensity) about the storm at the predicted time and/or location at which such change is predicted to occur.

In another embodiment, the display aspect of the weather severity and characterization system 700 includes the assessing the impact of the identified storm(s) on people and property based on the historical, current or predicted parameters of the storms, including location, severity and other characteristics. The general concepts of assessing the impact of weather on people and property is discussed in detail in co-pending U.S. Pat. No. 7,181,346, entitled System and Method for Assessing The People and Property Impact of Weather, filed Mar. 31, 2005, the entire disclosure of which is incorporated herein by reference. The concepts discussed therein are applicable to the weather severity and characterization system 700 in that a more accurate assessment and/or display of the potential impact to people and property may be obtained by incorporating the storm related parameters and impact indices discussed herein.

The storm related display obtained through the weather severity and characterization system 700 may include one or a combination of the available storm related parameters or impact indices. That is, depending on the display type and configuration, all of the impact indices may be displayed. Alternatively, only some subset of the impact indices may be displayed (e.g., those indices specifically related to the type of identified storm). In an alternative embodiment, one or more of the storm related parameters (e.g., hail size, lightning flash rate, convective energy, etc.) may also be displayed.

In one embodiment, the icon or marking denoting the selected storm is highlighted or otherwise altered (not shown) to indicate that that particular storm has been selected and that the present severity parameters correspond to that storm.

In one embodiment, the weather severity and characterization system 700 navigates through a sequence of identified storms based on the storm related parameters and/or the impact indices. That is the display 900 may show, for example, a set number of the most severe storms (as measured by the composite severity index 930) within a geographic region of interest 902. The weather severity and characterization system 700 may then automatically or by presenter or viewer initiated input (e.g., a virtual "button" or link on the display 900) sequence through the designated storms in an order defined by the weather severity and characterization system 700. For example, the display 900 may include the five most severe storms in a region and proceed to highlight each of the identified storms (and display corresponding storm related parameters and impact indices) in an order of decreasing composite severity index 930, such that the most severe storm in the region is displayed first.

In one embodiment, in conjunction with a sequencing feature of the display of the weather severity and characterization system 700, the display 900 automatically highlights and displays relevant storm related parameters and impact indices related to the identified storms, while automatically zooming-in on a particular storm for a period of time or until another actuation by the presenter or viewer. The display 900 then automatically zooms-out, pans and selects the next relevant storm in the category and again zooms-in and displays the relevant storm related parameters and impact information.

In another embodiment, the display 900 includes multiple buttons, links or other selection options (not shown), that may be actuated by the presenter or viewer. For example, the display may include selection options for each of the potential impact indices. Selection of one of such options initiates the display of identified storms relevant to the selected category. For example, the display 900 may include a "Hail Storm Impact" button (not shown). Actuation of such button would initiate the display of a pre-set number of the identified storms that have the greatest past, current and/or predicted future hail impact as measured by the hail severity index 928.

Those skilled it the art will recognize that any combination of the previously described display options or possibilities may be employed in conjunction with the user-defined, pre-set and/or automatic sequencing features of the weather severity and characterization system 700.

In one embodiment, the display of the impact indices and/or storm related parameters is configurable by the presenter. That is, as described above, the presenter may be able to select (or un-select) which impact indices and/or in which format(s) the presenter desires for display. Such configuration selections may be made pre- or post-selection of the storm of choice. Alternatively, the displayed impact indices and format may be predetermined through the use of user-defined or pre-set rules, similar to the navigation/presentation rules discussed above with respect to the intelligent broadcast system 100.

In one embodiment, the presenter or viewer interacts with the display aspect of the weather severity and characterization system 700 through a graphical user interface ("GUI") 950, examples of which is shown in FIGS. 30 and 36. The GUI 950 includes a layer menu 952 that enables the presenter or viewer to add different sets or aspects of data, or layers, to the display 900. For example, referring to FIG. 30, the presenter may desire to look at radar data, the associated storm icons 906 and associated storm tracks 908 identified by such radar data, which would involve adding three layers of information to the display 900. The layer controls 954 allow the presenter to control particular aspects of a selected layer. An output window 956 shows the present output or display 900 as selected in the layer menu 952. A wide view window 958 shows the relevant weather data over an area of interest that is larger than the geographic region of interest 902 shown in the display 900 or the output window 956. In FIG. 30, for example, the wide view window 958 shows radar data over a large region. The red rectangle 959 depicts the area currently displayed on the display 900. A view control window 960 allows the user to specify the general domain or region of interest (e.g., eastern USA or western USA, etc.). An animation control window 962 includes one or more buttons allowing the user to run animations of the most recent data, customized to meet the users' needs or preferences (e.g., animation speed, resolution, etc.). An off-air query window 964 permits the presenter or user to view or analyze the raw data associated with data aspects received as a result of the selections made in the layer menu 952 without showing such data or analysis on the display 900.

Referring to FIG. 36, the off air query window 964 displays past, present, and future time values for some of the storm related parameters for the storm represented by the storm icon 906. Also, in FIG. 36, the graphical text box 912 in the GUI 950 may display storm related parameters or other raw data, such as Sfc-based CAPE 980, or Height of 50 dbZ 982, instead of the severity indices which would normally be presented to a viewer in an on-air or Internet presentation. Thus, the weather severity and characterization system 700 allows the end-user (e.g. the presenter, user or operator) to view the complete set of data in a way not intended for, or visible to, public presentation or display, thereby enabling, for example, an expert (e.g., meteorologist) with access to the storm related parameters and impact indices for off-camera or "behind the scenes" meteorological analysis.

In one embodiment, the display of audio or visual data in the presentation is permitted. For instance, the presenter 102 could select a particular storm 702 from the display 900. The general location of the storm and the time of the weather data observations could be retrieved from the storm database 760. The presentation system could then search the storm database 760 for corresponding images. These images may have been uploaded to the storm identification and characterization system 740 by mobile users 784 using their hand-held or portable devices 782 and the wireless network 780. Thus, the presenter may be able to display images or videos taken at the scene by eyewitnesses as a part of his timely weather presentation.

FIG. 15 is a use case diagram of one embodiment of the weather severity and characterization system 700. The weather severity and characterization system 700 includes a retrieve data use case 882 through which the presenter 102 may initiate the retrieval of data and/or identify a particular area or geographic region of interest for which to obtain storm related parameters or other weather information. Presenter or user interaction with the retrieve data use case 882 includes graphical and/or text input or interaction. For example, the presenter 1021 may specify a geographic region of interest by highlighting or selecting such a region on a map or other display in a manner generally known in the art. Alternatively, such a selection may be made by identifying (through text, graphical, touch-screen, verbal or other methods) a particular radar site or sites, or a particular geographic area or point and a radius with respect thereto. Those skilled in the art will recognize that there are other manners in which the presenter 102 could identify a desired geographic region. The retrieve data use case 882 includes access to and retrieves relevant weather data from a variety or combination of sources described above, including Doppler radar data 1390, satellite data 1392, terrestrial weather data 1394 and historical weather data 130.

An identify storm use case 884 identifies relevant storms within the retrieved data as previously described. A generate storm parameters use case 886 determines the relevant storm related parameters discussed above for the storms identified by the identify storm use case 884 using the retrieved data. Additionally, the generate storm parameters use case 886 may access the convective storm analysis system 1300 and/or the storm parameters database 760 to generate the relevant storm related parameters. The storm related parameters may be stored in the storm parameters database 760.

An assemble storm parameters use case 890 obtains relevant storm related parameters from the storm parameters data base 760 (or the generate storm parameters use case 886) and interacts with the display/monitor 104. As described above, the assemble storm parameters use case 890 may automatically present the identified storms on the display/monitor 104 to the presenter 102 for selection thereof (e.g. in accordance with default rules), or may require additional input from the presenter 102 or other system (not shown) to determine which of the identified storms should be displayed for selection and/or retrieval of additional information, for example, through the set display options use case 894.

The presenter 102 also interacts with the weather severity and characterization system 700 via the select storm use case 892 to select one or more of the storms identified by the identify storms use case 884 and for which storm related parameters may have been generated or assembled. Selection of such storms may be accomplished by clicking, highlighting or otherwise selecting an icon 906 described above or via any other selection mechanism generally known in the art. For example, the presenter 102 need not actually be presented with a list or graphical identifier of the identified storms, but rather my select a storm by gesturing at a particular area of the desired radar or weather data. Upon selection of a storm, the assemble storm parameters use case 890 obtains the relevant storm related parameters corresponding to the selected storm(s). The storm related parameters may be displayed to the presenter 102 on the display/monitor 104 in any of the manners previously described, including according to display options set or selected through the set display options use case 894, to for a presentation of weather information. The weather severity and characterization system 700 includes a select storm sequence use case 896 through which the presenter 102 may determine which type (e.g., which storms and criteria) and initiate a sequenced storm presentation, as described above.

The concepts described herein can be applied to a number of types of data and presentations including, but not limited to, traffic reporting and integrated weather and traffic reports, business, technical and economic presentations, and other displays of data.

The present invention may be implemented with any combination of hardware and software. If implemented as a computer-implemented apparatus, the present invention is implemented using means for performing all of the steps and functions described above.

The present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

Although the description above contains many specific examples, these should not be construed as limiting the scope of the invention but as merely providing illustrations of some of the presently preferred embodiments of this invention. Thus, the scope of the invention should be determined by the appended claims and their legal equivalents, rather than by the examples given.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the embodiments of the present invention.

We claim:

1. A method of presenting weather phenomenon information, the method comprising:
   (a) receiving weather data;
   (b) identifying at least one weather phenomenon represented by the weather data;
   (c) determining a plurality of current parameters related to the current state of the at least one weather phenomenon;
   (d) associating with the current state of the at least one weather phenomenon a plurality of historical parameters corresponding to one or more previous states of the at least one weather phenomenon if at least one previous state of the at least one weather phenomenon has been identified;
   (e) calculating a plurality of forecasted parameters corresponding to at least one future state of the at least one weather phenomenon;
   (f) preparing a presentation sequence based on a set of severity indices corresponding to the at least one weather phenomenon; and
   (g) displaying, in the presentation sequence, characteristics of the at least one weather phenomenon using an icon that changes during the presentation sequence in response to a change in the characteristics, and at least one of the severity indices corresponding to the at least one weather phenomenon.

2. The method of claim 1, further comprising:
   (g) transmitting a subset of the plurality of historical, current, and forecasted parameters to an entity, the entity using the subset of parameters to provide a presentation of the weather phenomenon to an end user.

3. The method of claim 1, wherein a subset of the forecasted parameters are calculated based at least in part on the historical and current parameters.

4. The method of claim 1, wherein the forecasted parameters correspond to one or more projected states of the at least one weather phenomenon.

5. The method of claim 1, wherein the at least one weather phenomenon is a convective storm.

6. The method of claim 5, wherein the convective storm is a thunderstorm.

7. The method of claim 1, wherein the at least one weather phenomenon is a convective storm system.

8. The method of claim 1, wherein the at least one weather phenomenon includes at least one of hurricanes, cold fronts, warm fronts, winter storms, and tornados.

9. The method of claim 1, wherein the state of the at least one weather phenomenon represents at least the spatial extent of the weather phenomenon.

10. The method of claim 1, wherein the weather data is obtained from at least one primary source and at least one secondary source.

11. The method of claim 10, wherein the at least one primary source provides weather radar data and the at least one secondary source provides non-radar weather data, and wherein a subset of the future parameters of the at least one weather phenomenon are determined by synthesizing the data obtained from the at least one primary source and the at least one secondary source.

12. The method of claim 11, wherein the data obtained from the at least one secondary source includes future predicted data related to the at least one weather phenomenon.

13. The method of claim 11, wherein the at least one weather phenomenon includes a convective storm.

14. The method of claim 11, wherein the data provided by the at least one secondary source includes 4D gridded Numerical Weather Prediction output comprising at least one of an initialization grid and one or more forecast grids.

15. The method of claim 11, wherein the data provided by the at least one secondary source includes output from a lightning detection system.

16. The method of claim 11, wherein the data provided by the at least one secondary source includes imaging data from a satellite system.

17. The method of claim 11, wherein the data provided by at least one the secondary source includes at least one of damage reports, photographs, and economic effects.

18. The method of claim 10, wherein at least a subset of the current parameters are based on non-radar weather data supplied by the at least one secondary source.

19. The method of claim 1, wherein the plurality of future parameters includes a subset of the severity indices, the subset generated by analyzing a subset of the plurality of current and future parameters.

20. The method of claim 1, wherein the plurality of current parameters includes a subset of the severity indices, the subset generated by analyzing a subset of the plurality of current and future parameters.

21. The method of claim 20, wherein the set of severity indices represents a potential impact to people or population from different threats associated with the at least one weather phenomenon.

22. The method of claim 21, wherein the set of severity indices includes a composite severity index.

23. The method of claim 22, wherein the composite severity index represents an aggregate representation of at least two of the severity indices.

24. The method of claim 22, wherein the composite severity index is determined for each of the present state and future states of the at least one weather phenomenon.

25. The method of claim 20, wherein at least one severity index in the set of severity indices represents lightning severity of the at least one weather phenomenon.

26. The method of claim 20, wherein at least one severity index in the set of severity indices represents tornado severity of the at least one weather phenomenon.

27. The method of claim 20, wherein at least one severity index in the set of severity indices represents flooding severity of the at least one weather phenomenon.

28. The method of claim 20, wherein at least one severity index in the set of severity indices represents hail severity of the at least one weather phenomenon.

29. The method of claim 20, wherein at least one severity index in the set of severity indices represents wind severity of the at least one weather phenomenon.

30. The method of claim 1, wherein the presentation sequence includes a graphic representation of the time variation of at least one of the set of severity indices corresponding to a selection of one of the at least one weather phenomenon.

31. The method of claim 1, wherein the icon changes over time in response to a change in the severity of the one or more states of the at least one weather phenomenon determined from the set of severity indices.

32. The method of claim 1, wherein each severity index is an aggregate normalized metric representing observed, measured, and derived information about different threats associated with the at least one weather phenomenon, providing a relative comparative indicator for assessing threat levels between weather phenomena.

* * * * *